United States Patent
Punj et al.

(10) Patent No.: US 7,773,581 B2
(45) Date of Patent: *Aug. 10, 2010

(54) METHOD AND APPARATUS FOR CONFERENCING WITH BANDWIDTH CONTROL

(75) Inventors: Arun Punj, Cranberry Township, PA (US); Richard E. Huber, Harmony, PA (US)

(73) Assignee: Ericsson AB, Stockholm (SE)

( * ) Notice: Subject to any disclaimer, the term of this patent is extended or adjusted under 35 U.S.C. 154(b) by 1342 days.

This patent is subject to a terminal disclaimer.

(21) Appl. No.: 11/078,738

(22) Filed: Mar. 11, 2005

(65) Prior Publication Data

US 2005/0237952 A1 Oct. 27, 2005

Related U.S. Application Data

(60) Provisional application No. 60/555,025, filed on Mar. 19, 2004.

(51) Int. Cl.
*H04L 12/66* (2006.01)
*H04N 7/14* (2006.01)

(52) U.S. Cl. .................................... 370/352; 348/14.01
(58) Field of Classification Search ........................ None
See application file for complete search history.

(56) References Cited

U.S. PATENT DOCUMENTS

| | | | |
|---|---|---|---|
| 6,128,649 A * | 10/2000 | Smith et al. | 709/217 |
| 6,981,263 B1 * | 12/2005 | Zhang et al. | 719/310 |
| 7,404,001 B2 * | 7/2008 | Campbell et al. | 709/231 |
| 2002/0120749 A1 * | 8/2002 | Widegren et al. | 709/227 |
| 2003/0147390 A1 * | 8/2003 | Rizzo et al. | 370/390 |
| 2004/0057405 A1 * | 3/2004 | Black | 370/335 |
| 2004/0057412 A1 * | 3/2004 | Curcio et al. | 370/341 |
| 2004/0205213 A1 * | 10/2004 | Paz et al. | 709/231 |
| 2004/0257433 A1 * | 12/2004 | Lia et al. | 348/14.09 |
| 2004/0263636 A1 * | 12/2004 | Cutler et al. | 348/211.12 |
| 2005/0078171 A1 * | 4/2005 | Firestone et al. | 348/14.08 |
| 2005/0146606 A1 * | 7/2005 | Karsenty et al. | 348/143 |
| 2007/0005804 A1 * | 1/2007 | Rideout | 709/246 |

* cited by examiner

Primary Examiner—Hong Cho
Assistant Examiner—Eunsook Choi

(57) ABSTRACT

A telecommunications system for conferencing including a network. The system comprises N nodes in communication with each other through the network, where N is greater than or equal to three and is an integer. Each node of the N nodes able to produce a unique corresponding video stream having a bandwidth and a unique corresponding audio stream having a bandwidth for transmission over the network to other nodes of the N nodes, with each stream's bandwidth from each node being dynamically controlled and set at predetermined levels. A method for conferencing in a telecommunications system. A bandwidth manager. A method for controlling bandwidth in a telecommunications network. A telecommunications system for conferencing. Including a network. The system comprises N nodes in communication with each other through the network, where N is greater than or equal to three and is an integer. Each node able to produce at least one unique corresponding video stream and a unique corresponding audio stream for transmission over the network to other nodes of the N nodes. Each node able to selectively receive any stream from any of the other nodes. A videophone. A method for a video call.

41 Claims, 24 Drawing Sheets

BANDWIDTH MANAGER IMPLEMENTED AS A BACK-TO-BACK USER AGENT

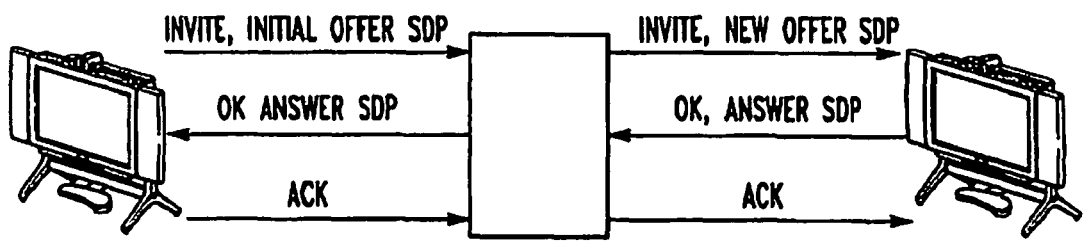
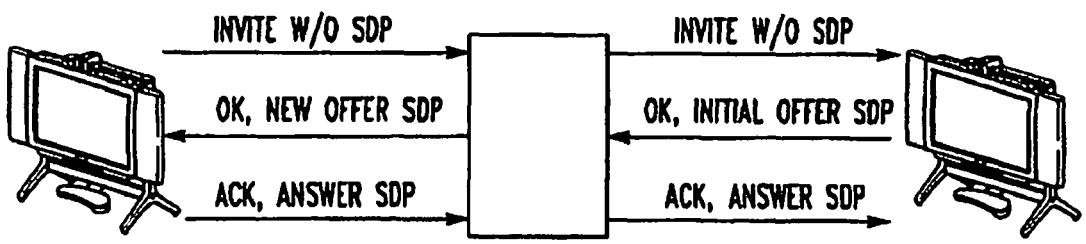
BANDWIDTH MANAGER IMPLEMENTED IN SIP PROXY
FIG.1

BANDWIDTH MANAGER IMPLEMENTED AS A BACK-TO-BACK USER AGENT

BANDWIDTH MANAGER NETWORK AND LINK DEFINITIONS

FAILOVER DESIGN OF BANDWIDTH MANAGER

```
v=0
o=Vipr 1 1 IN IP4 127.0.0.1
s=-
i="a"<sip:a@192.168.1.25>
e=NOEmail@NOEmail.com
a=X_app:ViPr 3 ViPrTerminal
t=0 0
```

AUDIO MEDIA DESCRIPTION:
```
m=audio 50934 RTP/AVP 11 9 0
c=IN IP4 192.168.1.45
b=AS:256
a=rtpmap:11 L16/16000/1
a=rtpmap:9 G722
a=rtpmap:0 PCMC/8000
a=sendrecv
a=X_app:ViPr 3 ViPrTerminal
```

VIDEO MEDIA DESCRIPTION:
```
m=video 30934 RTP/AVP 32 31
c=IN IP4 192.168.1.45
b=AS:6000
a=rtpmap:32 MPEG/90000
a=rtpmap:31 H261/90000
a=sendrecv
a=X_app:ViPr 3 ViPrTerminal
```

Annotations:
- CODEC OPTIONS, CORRESPOND TO "a=rtpmap" ENTRIES FURTHER IN MEDIA BLOCK
- IP ADDRESS OF MEDIA STREAMS LISTENER
- BANDWIDTH SPECIFIER
- UDP PORT TO WHICH RTP STREAM MUST BE SENT BY REMOTE SIDE
- DIRECTION OF MEDIA STREAM. OPTIONS ARE: SENDRECV, SENDONLY, RECVONLY AND INACTIVE SAMPLE ANNOTATED SDP OFFER FROM A ViPr TERMINAL

FIG. 7

B2BUA REQUEST/RESPONSE PROCESSING

HUB-AND-SPOKE CONFERENCING

INVITE sip:a@192.168.2.165:5060 SIP/2.0 →DESTINATION HOST/IP AND PORT
From:" a"<sip:a@192.168.1.25:5060>;ltag=0-13c4-3f058b58-100c2a3-4e6db66
To:<sip:a@192.168.1.30:5060>
Call-ID:0-13c4-3f058b58-100c2a3-6b68079a-81fb208
Via: SIP/2.0/UDP 192.168.1.30:5060;branch=176a1 fce5d5a1479a12b73498lae0152.2
Via: SIP/2.0/UDP 192.168.230:5060
CSeq: 1 INVITE
Max-FORWARDS:69
Record-Route:<sip:a@192.168.1.30:5060;maddr=192.168.1.30:5060>,<sip:a@192.168.1.30:5060;maddr=192.168.130>
Contact:<sip:a@192.168.2.30:5060>                    ↑
Content-Type:application/sdp            SOURCE IPs AND PORTS, TOP IS MOST RECENT HOP
Content-Lenght:524

SAMPLE SIP INVITE

*FIG. 9*

```
o=X_GUID:CONFCALL_A  ←── UNIQUE PER
m=audio...                CONFERENCE CELL
i=VHost
b=0                  ⎫
m=video..            ⎬ FIRST TWO MEDIA BLOCKS
i=VHost              ⎭ REPRESENT CONFERENCE
b=0                            HOST
m=audio port...      ⎫
c=IN IP4 multicast_group_IP
i=vipr1
b=64                 ⎬ ViPe 1 STREAMS
m=video port...
c=IN IP4 multicast_group_IP
i=vipr1
b=3000               ⎭
m=audio port...      ⎫
c=IN IP4 multicast_group_IP
i=vipr2
b=64                 ⎬ ViPe 2 STREAMS
m=video port...
c=IN IP4 multicast_group_IP
i=vipr2
b=3000               ⎭
m=audio port...      ⎫
c=IN IP4 multicast_group_IP
i=vipr3
b=64                 ⎬ ViPe 3 STREAMS
m=video port...
c=IN IP4 multicast_group_IP
i=vipr3
b=3000               ⎭
```

OFFER SDP ARRIVING AT BANDWIDTH
MANAGER TO ViPr 4 FOR
EXAMPLE SCENARIO

FIG.11

```
o=X_GUID:CONFCALL_A
m=audio...
i=VHost
b=64
m=video..
i=VHost
b=2000
m=audio port...
c=IN IP4 multicast_group_IP
i=vipr1
b=64
m=video port...
c=IN IP4 multicast_group_IP
i=vipr1
b=2000
m=audio port...
c=IN IP4 multicast_group_IP
i=vipr2
b=64
m=video port...
c=IN IP4 multicast_group_IP
i=vipr2
b=2000
m=audio port...
c=IN IP4 multicast_group_IP
i=vipr3
b=64
m=video port...
c=IN IP4 multicast_group_IP
i=vipr3
b=2000
```

OFFER SDP FROM BANDWIDTH
MANAGER TO ViPr 4 FOR
EXAMPLE SCENARIO

FIG.12

```
o=X_GUID:CONFCALL_A
m=audio...
i=VHost
b=64
m=video..
i=VHost
b=2000
m=audio port...
c=IN IP4 multicast_group_IP
i=vipr1
b=64
m=video port...
c=IN IP4 multicast_group_IP
i=vipr1
b=2000
m=audio port...
c=IN IP4 multicast_group_IP
i=vipr2
b=64
m=video port...
c=IN IP4 multicast_group_IP
i=vipr2
b=2000
m=audio port...
c=IN IP4 multicast_group_IP
i=vipr3
b=64
m=video port...
c=IN IP4 multicast_group_IP
i=vipr3
b=2000
m=audio port...
c=IN IP4 multicast_group_IP
i=vipr4
b=64                    NEW AUDIO/VIDEO STREAMS FOR ViPr 4
m=video port...
c=IN IP4 multicast_group_IP
i=vipr4
b=2000
```

ViPr 4 RESPONSE FOR CASE 1

*FIG.13*

```
SDP FROM ViPr4 to BWM              SDP FROM BWM to CONFERENCE HOST
  o=X_GUID:CONFCALL_A                 o=X_GUID:CONFCALL_A
  m=audio...                          m=audio...
  i=VHost                             i=VHost
  b=64                                b=64
  m=video..                           m=video..
  i=VHost                             i=VHost
  b=2000                              b=2000
  m=audio port...                     m=audio port...
  c=IN IP4 multicast_group_IP         c=IN IP4 multicast_group_IP
  i=vipr1                             i=vipr1
  b=64                                b=64
  m=video port...                     m=video port...
  c=IN IP4 multicast_group_IP         c=IN IP4 multicast_group_IP
  i=vipr1                             i=vipr1
  b=2000                              b=3000
  m=audio port...                     m=audio port...
  c=IN IP4 multicast_group_IP         c=IN IP4 multicast_group_IP
  i=vipr2                             i=vipr2
  b=64                                b=64
  m=video port...                     m=video port...
  c=IN IP4 multicast_group_IP         c=IN IP4 multicast_group_IP
  i=vipr2                             i=vipr2
  b=2000                              b=3000
  m=audio port...                     m=audio port...
  c=IN IP4 multicast_group_IP         c=IN IP4 multicast_group_IP
  i=vipr3                             i=vipr3
  b=64                                b=64
  m=video port...                     m=video port...
  c=IN IP4 multicast_group_IP         c=IN IP4 multicast_group_IP
  i=vipr3                             i=vipr3
  b=2000                              b=3000
  m=audio port...                     m=audio port...
  c=IN IP4 multicast_group_IP         c=IN IP4 multicast_group_IP
  i=vipr4                             i=vipr4
  b=64                                b=64
  m=video 0...                        m=video 0...
  c=IN IP4 multicast_group_IP         c=IN IP4 multicast_group_IP
  i=vipr4                             i=vipr4
  b=0                                 b=0
```

SDP FROM ViPr 4 AND BANDWIDTH MANAGER FOR CASE 2

*FIG.14*

SAMPLE MEDIUM CONFERENCE SCENARIO

```
o=X_GUID:CONFCALL_A                          m=audio port...
m=audio...                                   o=X-Party_ID:3
o=X-Party_ID:0                               c=IN IP4 multicast_group_IP
i=VHost         PROPOSED BIG                 i=vipr3
b=0              VIDEO FOR                   b=64
m=video...      NEW PARTICIPANT              m=video port...
i=VHost                                      c=IN IP4 multicast_group_IP
b=0                                          i=vipr3
o=X-Party_list|1,2,3|                        b=3000
m=LR-video..                                 o=X-Party_list|1,2,4|
i=VHost                                      m=LR-video..
b=0                                          i=vipr3
m=audio port...                              b=350
c=IN IP4 multicast_group_IP                  m=audio port...
i=vipr1                                      o=X-Party_ID:4
o=X-Party_ID:1                               c=IN IP4 multicast_group_IP
b=64                                         i=vipr4
m=video port...                              b=64
c=IN IP4 multicast_group_IP                  m=video port...
i=vipr1                                      c=IN IP4 multicast_group_IP
b=3000                                       i=vipr4
o=X-Party_list|2,3,4|                        b=3000
m=LR-Video                                   o=X-Party_list|1,2,3|
i=vipr2                                      m=LR-Video
b=350                                        i=vipr4
m=audio port...                              b=350
o=X-Party_ID:2                               m=audio port...
c=IN IP4 multicast_group_IP                  o=X-Party_ID:5
i=vipr2                                      c=IN IP4 multicast_group_IP
b=64                                         i=vipr5
m=video port...                              b=64
c=IN IP4 multicast_group_IP                  m=video port...
i=vipr2                                      c=IN IP4 multicast_group_IP
b=3000                                       i=vipr5
o=X-Party_list|1,3,4|                        b=3000
m=LR-video                                   o=X-Party_list|1,2,3|
i=vipr2                                      m=LR-video
b=350                                        i=vipr5
                                             b=350
```

FIG.16  SAMPLE SDP SHOWING RELEVANTS PARTS FOR BANDWIDTH MANAGER

```
o=X_GUID:CONFCALL_A
m=audio...
a=X-Party_ID:0
i=VHost
b=64
m=video...
i=VHost
b=0
a=X-Party_list|1,2,3|
m=LR-video..
i=VHost
b=350
m=audio port...
c=IN IP4 multicast_group_IP
i=vipr1
a=X-Party_ID:1
b=64
m=video port...
c=IN IP4 multicast_group_IP
i=vipr1
b=2000
a=X-Party_list|2,3,4|
m=LR-Video
i=vipr1
b=350
m=audio port...
a=X-Party_ID:2
c=IN IP4 multicast_group_IP
i=vipr2
b=64
m=video port...
c=IN IP4 multicast_group_IP
i=vipr2
b=2000
a=X-Party_list|1,3,4|
m=LR-video
i=vipr2
b=350
```

```
m=audio port...
a=X-Party_ID:3
c=IN IP4 multicast_group_IP
i=vipr3
b=64
m=video port...
c=IN IP4 multicast_group_IP
i=vipr3
b=2000
a=X-Party_list|1,2,4|
m=LR-video..
i=vipr3
b=350
m=audio port...
a=X-Party_ID:4
c=IN IP4 multicast_group_IP
i=vipr4
b=64
m=video port...
c=IN IP4 multicast_group_IP
i=vipr4
b=3000
a=X-Party_list|1,2,3|
m=LR-Video
i=vipr4
b=350
m=audio port...
a=X-Party_ID:5
c=IN IP4 multicast_group_IP
i=vipr5
b=64
m=video port...
c=IN IP4 multicast_group_IP
i=vipr5
b=3000
a=X-Party_list|1,2,3|
m=LR-video
i=vipr5
b=350
```

FIG.17  SAMPLE MODIFIED OFFER SDP FROM BANDWIDTH MANAGER TO ViPr5

```
o=X_GUID:CONFCALL_A      m=audio port...              m=audio port...
m=audio...               o=X-Party_ID:3               o=X-Party_ID:6
o=X-Party_ID:0           c=IN IP4 multicast_group_IP  i=vipr6
i=VHost                  i=vipr3                      b=64
b=64                     b=64                         m=video port...
m=video...               m=video port...              i=vipr6
i=VHost                  c=IN IP4 multicast_group_IP  b=3000
b=0                      i=vipr3                      o=X-Party_list|1,2,3|
o=X-Party_list|1,2,3|    b=2000                       m=LR-video
m=LR-video..             o=X-Party_list|1,2,4|        i=vipr6
i=VHost                  m=LR-video..                 b=350
b=350                    i=vipr3
m=audio port...          b=350                           AS PROPOSED BY
c=IN IP4 multicast_group_IP  m=audio port...             CONFERENCE HOST
i=vipr1                  o=X-Party_ID:4
o=X-Party_ID:1           c=IN IP4 multicast_group_IP
b=64                     i=vipr4
m=video port...          b=64
c=IN IP4 multicast_group_IP  m=video port...
i=vipr1                  c=IN IP4 multicast_group_IP
b=2000                   i=vipr4
o=X-Party_list|2,3,4|    b=3000
m=LR-Video               o=X-Party_list|1,2,3|
i=vipr1                  m=LR-Video
b=350                    i=vipr4
m=audio port...          b=350
o=X-Party_ID:2           m=audio port...
c=IN IP4 multicast_group_IP  o=X-Party_ID:5
i=vipr2                  c=IN IP4 multicast_group_IP
b=64                     i=vipr5
m=video port...          b=64
c=IN IP4 multicast_group_IP  m=video port...
i=vipr2                  c=IN IP4 multicast_group_IP
b=2000                   i=vipr5
o=X-Party_list|1,3,4|    b=3000
m=LR-video               o=X-Party_list|1,2,3|        SAMPLE ANSWER SDP
i=vipr2                  m=LR-video                     FROM Vipr5
b=350                    i=vipr5
                         b=350                              FIG.18
```

```
a=X_GUID:CONFCALL_A          m=audio port...              m=audio port...
m=audio...                   a=X-Party_ID:3               a=X-Party_ID:6
a=X-Party_ID:0               c=IN IP4 multicast_group_IP  i=vipr6
i=VHost                      i=vipr3                      b=64
b=64                         b=64                         m=video port...
m=video...                   m=video port...              i=vipr6
i=VHost                      c=IN IP4 multicast_group_IP  b=3000
b=0                          i=vipr3                      a=X-Party_list|1,2,4|
a=X-Party_list|1,2,3|        b=2000                       m=LR-video
m=LR-video..                 a=X-Party_list|1,2,4|        i=vipr6
i=VHost                      m=LR-video..                 b=350
b=350                        i=vipr3
m=audio port...              b=350
c=IN IP4 multicast_group_IP  m=audio port...
i=vipr1                      a=X-Party_ID:4
a=X-Party_ID:1               c=IN IP4 multicast_group_IP
b=64                         i=vipr4
m=video port...              b=64
c=IN IP4 multicast_group_IP  m=video port...
i=vipr1                      c=IN IP4 multicast_group_IP
b=2000                       i=vipr4
a=X-Party_list|2,3,4|        b=3000
m=LR-Video                   a=X-Party_list|1,2,3|
i=vipr1                      m=LR-Video
b=350                        i=vipr4
m=audio port...              b=350
a=X-Party_ID:2               m=audio port...
c=IN IP4 multicast_group_IP  a=X-Party_ID:5
i=vipr2                      c=IN IP4 multicast_group_IP
b=64                         i=vipr5
m=video port...              b=64
c=IN IP4 multicast_group_IP  m=video port...
i=vipr2                      c=IN IP4 multicast_group_IP
b=2000                       i=vipr5
a=X-Party_list|1,3,4|        b=3000
m=LR-video                   a=X-Party_list|1,2,3|
i=vipr2                      m=LR-video
b=350                        i=vipr5
                             b=350
```

ViPr5 CHANGES BIG VIDEO VIEWING PREFERENCE (CASE1)

FIG.19

```
o=X_GUID:CONFCALL_A        m=audio port...            m=audio port...
m=audio...                 a=X-Party_ID:3             a=X-Party_ID:6
a=X-Party_ID:0             c=IN IP4 multicast_group_IP i=vipr6
i=VHost                    i=vipr3                    b=64
b=64                       b=64                       m=video port...
m=video...                 m=video port...            i=vipr6
i=VHost                    c=IN IP4 multicast_group_IP b=3000
b=0                        i=vipr3                    a=X-Party_list|1,2,4|
a=X-Party_list|1,2,3|      b=2000                     m=LR-video
m=LR-video..               a=X-Party_list|1,2,4|      i=vipr6
i=VHost                    m=LR-video..               b=350
b=350                      i=vipr3
m=audio port...            b=350
c=IN IP4 multicast_group_IP m=audio port...
i=vipr1                    a=X-Party_ID:4
a=X-Party_ID:1             c=IN IP4 multicast_group_IP
b=64                       i=vipr4
m=video port...            b=64
c=IN IP4 multicast_group_IP m=video port...
i=vipr1                    c=IN IP4 multicast_group_IP
b=1000                     i=vipr4
a=X-Party_list|2,3,4|      b=1000
m=LR-Video                 a=X-Party_list|1,2,3|
i=vipr1                    m=LR-Video                 BWM MODIFIES PARTY 1,2 AT
b=350                      i=vipr4                    4 BANDWIDTH (CASE 1c)
m=audio port...            b=350
a=X-Party_ID:2             m=audio port...
c=IN IP4 multicast_group_IP a=X-Party_ID:5
i=vipr2                    c=IN IP4 multicast_group_IP
b=64                       i=vipr5
m=video port...            b=64
c=IN IP4 multicast_group_IP m=video port...
i=vipr2                    c=IN IP4 multicast_group_IP
b=1000                     i=vipr5
a=X-Party_list|1,3,4|      b=3000
m=LR-video                 a=X-Party_list|1,2,3|
i=vipr2                    m=LR-video
b=350                      i=vipr5
                           b=350
```

*FIG.20*

```
o=X_GUID:CONFCALL_A          m=audio port...              m=audio port...
m=audio...                   o=X-Party_ID:3               o=X-Party_ID:6
o=X-Party_ID:0               c=IN IP4 multicast_group_IP  i=vipr6
i=VHost                      i=vipr3                      b=64
b=64                         b=64                         m=video port...
m=video...                   m=video port...              i=vipr6
i=VHost                      c=IN IP4 multicast_group_IP  b=3000
b=0                          i=vipr3                      o=X-Party_list|1,2,4|
o=X-Party_list|1,2,3|        b=2000                       m=LR-video
m=LR-video..                 o=X-Party_list|1,2,4|        i=vipr6
i=VHost                      m=LR-video..                 b=350
b=350                        i=vipr3
m=audio port...              b=350
c=IN IP4 multicast_group_IP  m=audio port...
i=vipr1                      o=X-Party_ID:4
o=X-Party_ID:1               c=IN IP4 multicast_group_IP
b=64                         i=vipr4
m=video port...              b=64
c=IN IP4 multicast_group_IP  m=video port...
i=vipr1                      c=IN IP4 multicast_group_IP
b=2000                       i=vipr4
o=X-Party_list|2,3,4|        b=3000
m=LR-Video                   o=X-Party_list|1,2,3|
i=vipr1                      m=LR-Video
b=350                        i=vipr4
m=audio port...              b=350
o=X-Party_ID:2               m=audio port...
c=IN IP4 multicast_group_IP  o=X-Party_ID:5
i=vipr2                      c=IN IP4 multicast_group_IP
b=64                         i=vipr5
m=video port...              b=64
c=IN IP4 multicast_group_IP  m=video port...
i=vipr2                      c=IN IP4 multicast_group_IP
b=2000                       i=vipr5
o=X-Party_list|1,3,4|        b=3000
m=LR-video                   o=X-Party_list|1,2,3|
i=vipr2                      m=LR-video
b=350                        i=vipr5
                             b=350
```

BWM REMOVES 4 FROM ViPr
REQUEST (CASE 1b)

*FIG.21*

METHOD AND APPARATUS FOR CONFERENCING WITH BANDWIDTH CONTROL

This application claims the benefit of U.S. Provisional Application No.:

APPLICATION NO. FILING DATE
60/555,025 Mar. 19, 2004

FIELD OF THE INVENTION

The present invention is related to video and audio conferences. More specifically, the present invention is related to video and audio conferences where each node of a network is able to selectively choose the video or audio streams it desires, and where the bandwidth of the streams are dynamically controlled and set at predetermined levels.

BACKGROUND OF THE INVENTION

To enable high quality conference calls over networks with following types of constraints:
  Limited Bandwidth
  Administrative constraints like [access, priority, moderator, policy]

There needs to exist the ability to deal with such constraints. The present invention pro-actively adjusts the quality of a conference call to match the current network conditions and configuration. The present invention can also react to changes in the network configurations and constraints.

In addition, in conference calls having many participants, each participant could be overwhelmed with audio and video streams from the other participants. Each participant should have the ability to select which stream is to be seen or heard to control this possible data overload. The present invention provides each participant of a conference with the ability to select any stream from any other participant of the conference.

SUMMARY OF THE INVENTION

The present invention pertains to a telecommunications system for conferencing. The system comprises a network. The system comprises N nodes in communication with each other through the network, where N is greater than or equal to three and is an integer. Each node of the N nodes able to produce a unique corresponding video stream having a bandwidth and a unique corresponding audio stream having a bandwidth for transmission over the network to other nodes of the N nodes, with each stream's bandwidth from each node being dynamically controlled and set at predetermined levels. Preferably, the system includes a bandwidth manager in communication with the N nodes through the network which controls the bandwidth of each stream from each node.

The present invention pertains to a method for conferencing in a telecommunications system. The method comprises the steps of producing a unique corresponding video stream having a bandwidth and a unique corresponding audio stream having a bandwidth for transmission over a network by each of N nodes in communication with each other through the network, where N is greater than or equal to three and is an integer, to other nodes of the N nodes. There is the step of controlling and setting dynamically at predetermined levels each stream's bandwidth from each node.

The present invention pertains to a bandwidth manager. The manager comprises means for communicating with a network having N nodes, where N is greater than or equal to three and is an integer. Each node of the N nodes able to produce a unique corresponding video stream having a bandwidth and a unique corresponding audio stream having a bandwidth for transmission over the network to other nodes of the N nodes. The manager comprises means for dynamically controlling and setting each stream's bandwidth from each node at predetermined levels.

The present invention pertains to a method for controlling bandwidth in a telecommunications network. The method comprises the steps of communicating from a bandwidth manager with a network having N nodes, where N is greater than or equal to three and is an integer. Each node of the N nodes able to produce a unique corresponding video stream having a bandwidth and a unique corresponding audio stream having a bandwidth for transmission over the network to other nodes of the N nodes. There is the step of dynamically controlling and setting each stream's bandwidth from each node at predetermined levels with the bandwidth manager.

The present invention pertains to a telecommunications system for conferencing. The system comprises a network. The system comprises N nodes in communication with each other through the network, where N is greater than or equal to three and is an integer. Each node able to produce at least one unique corresponding video stream and a unique corresponding audio stream for transmission over the network to other nodes of the N nodes. Each node able to selectively receive any stream from any of the other nodes.

The present invention pertains to a method for conferencing in a telecommunications system. The method comprises the steps of producing with each node of N nodes in communication with each other through a network, where N is greater than or equal to three and is an integer, at least one unique corresponding video stream and a unique corresponding audio stream for transmission over the network to other nodes of the N nodes. There is the step of selectively receiving by each node any stream from any of the other nodes.

The present invention pertains to a videophone. The videophone comprises means for selectively receiving any stream from a plurality of video streams and audio streams of different scenes from a network. The videophone comprises means for displaying the selected video streams and listening to the selective audio streams.

The present invention pertains to a method for a video call. The method comprises the steps of selectively receiving at a videophone any stream from a plurality of video streams and audio streams of different scenes from a network. There is the step of displaying the selected video streams and listening to the selective audio streams.

BRIEF DESCRIPTION OF THE DRAWINGS

In the accompanying drawings, the preferred embodiment of the invention and preferred methods of practicing the invention are illustrated in which:

FIG. 1: bandwidth manager implemented in SIP proxy.

FIG. 7: sample annotated SDP offer from a ViPr terminal.

FIG. 9: sample SIP INVITE.

FIG. 11: offer SDP arriving at bandwidth manager for example scenario.

FIG. 12: offer SDP from bandwidth manager to ViPr 4 for example scenario.

FIG. 13: ViPr 4 response for case 1.

FIG. 14: SDP from ViPr 4 and bandwidth manager for case 2.

FIG. 16: sample SDP showing relevant parts for bandwidth manager.

FIG. 17: sample modified offer SDP from bandwidth manager to ViPr 5.

FIG. 18: sample answer SDP from ViPr 5.

FIG. 19: ViPr 5 changes big video viewing preference (case 1).

FIG. 20: BWM modifies party 1, 2 and 4 bandwidth (case 1c).

FIG. 21: BWM removes 4 from ViPr 5's request (case 1d).

DETAILED DESCRIPTION

Figure 22:
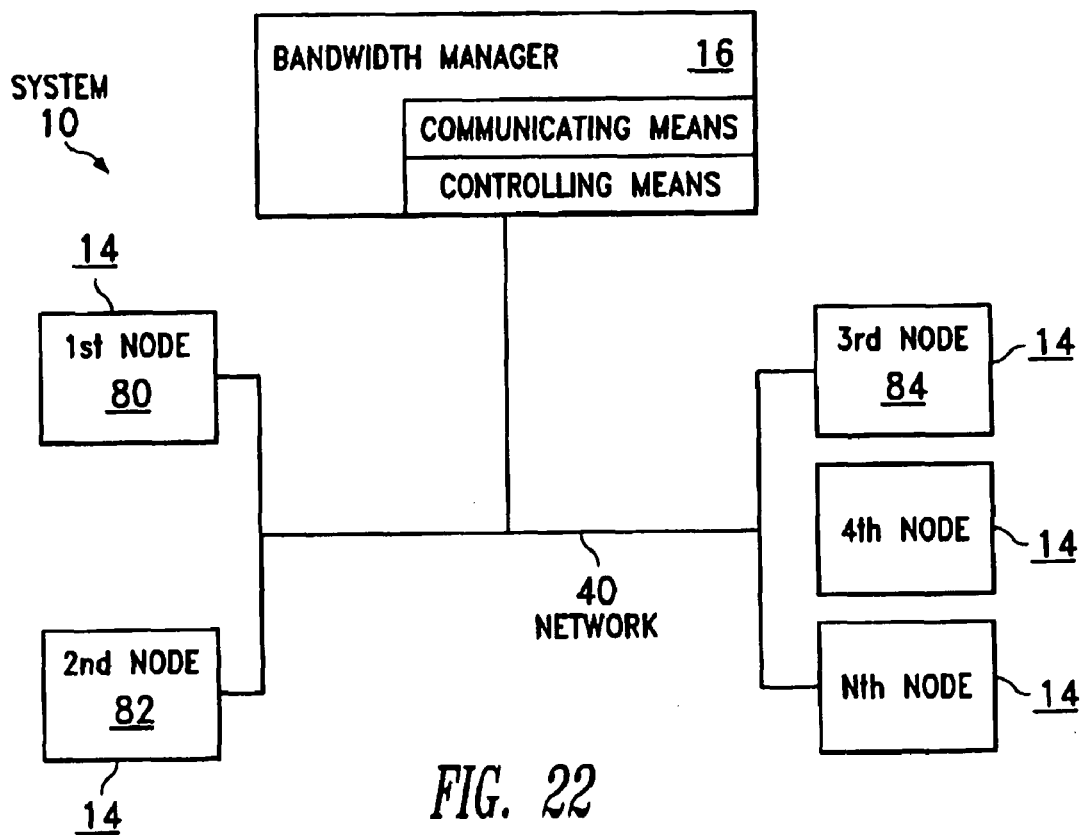
FIG. 22 is a schematic representation of a telecommunications system of the present invention.

Referring now to the drawings wherein like reference numerals refer to similar or identical parts throughout the several views, and more specifically to FIG. 22 thereof, there is shown a telecommunications system for conferencing. The system 10 comprises a network 40. The system comprises N nodes 14 in communication with each other through the network 40, where N is greater than or equal to three and is an integer. Each node of the N nodes 14 able to produce a unique corresponding video stream having a bandwidth and a unique corresponding audio stream having a bandwidth for transmission over the network 40 to other nodes of the N nodes 14, with each stream's bandwidth from each node being dynamically controlled and set at predetermined levels. Preferably, the system 10 includes a bandwidth manager 16 in communication with the N nodes 14 through the network 40 which controls the bandwidth of each stream from each node.

The present invention pertains to a method for conferencing in a telecommunications system. The method comprises the steps of producing a unique corresponding video stream having a bandwidth and a unique corresponding audio stream having a bandwidth for transmission over a network 40 by each of N nodes in communication with each other through the network 40, where N is greater than or equal to three and is an integer, to other nodes of the N nodes. There is the step of controlling and setting dynamically at predetermined levels each stream's bandwidth from each node.

The present invention pertains to a bandwidth manager 16. The manager comprises means for communicating with a network 40 having N nodes, where N is greater than or equal to three and is an integer. Each node of the N nodes able to produce a unique corresponding video stream having a bandwidth and a unique corresponding audio stream having a bandwidth for transmission over the network 40 to other nodes of the N nodes. The manager comprises means for dynamically controlling and setting each stream's bandwidth from each node at predetermined levels.

The present invention pertains to a method for controlling bandwidth in a telecommunications network 40. The method comprises the steps of communicating from a bandwidth manager 16 with a network 40 having N nodes, where N is greater than or equal to three and is an integer. Each node of the N nodes able to produce a unique corresponding video stream having a bandwidth and a unique corresponding audio stream having a bandwidth for transmission over the network 40 to other nodes of the N nodes. There is the step of dynamically controlling and setting each stream's bandwidth from each node at predetermined levels with the bandwidth manager 16.

The present invention pertains to a telecommunications system for conferencing, as shown in FIG. 22, although the bandwidth manager 16 is not necessary for this embodiment. The system comprises a network 40. The system comprises N nodes in communication with each other through the network 40, where N is greater than or equal to three and is an integer. Each node able to produce at least one unique corresponding video stream and a unique corresponding audio stream for transmission over the network 40 to other nodes of the N nodes. Each node able to selectively receive any stream from any of the other nodes.

The present invention pertains to a method for conferencing in a telecommunications system. The method comprises the steps of producing with each node of N nodes in communication with each other through a network 40, where N is greater than or equal to three and is an integer, at least one unique corresponding video stream and a unique corresponding audio stream for transmission over the network 40 to other nodes of the N nodes. There is the step of selectively receiving by each node any stream from any of the other nodes.

Figure 23:
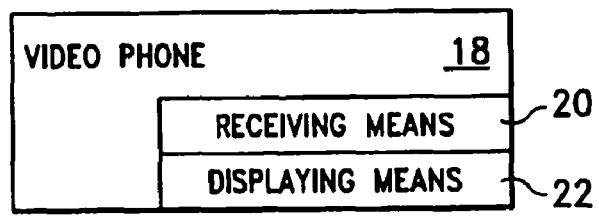
FIG. 23 is a block diagram of a videoph9one of the present invention.

The present invention pertains to a videophone 18, as shown in FIG. 23. The videophone 18 comprises means 20 for selectively receiving any stream from a plurality of video streams and audio streams of different scenes from a network 40. The videophone 18 comprises means 22 for displaying the selected video streams and listening to the selective audio streams.

The present invention pertains to a method for a video call. The method comprises the steps of selectively receiving at a videophone 18 any stream from a plurality of video streams and audio streams of different scenes from a network 40. There is the step of displaying the selected video streams and listening to the selective audio streams.

The system 10 preferably comprises a first node 80, a second node 82, and at least a third node 84 of the N nodes in communication with each other through the network 40. The first node 80 sends a first video stream of a scene at the first node 80, a second video stream of the scene at the first node 80 and an audio stream of the scene at the first node 80 to the second and third nodes 82, 84. The second and third nodes 82, 84 playing the audio stream and either the first video stream or the second video stream.

Preferably, the first video stream has a frame rate greater than 25 frames per second and the second video stream has a frame rate less than 25 frames per second. Preferably, the first video stream has a bit rate greater than or equal to 1.5 Mbits per second and the second video stream has a bit rate less than 1.5 Mbits per second. The second and third nodes 82, 84 preferably have a display screen and when the second or third nodes 82, 84 display the first video stream, they display the first video stream as a large image across an area of greater than or equal to 20% of the screen, and when the second and third nodes 82, 84 display the second video stream, they display the second video stream as a small image across an area of less than 20% of the screen. Preferably, the system 10 includes a fourth node in communication with the first, second and third nodes 80, 82, 84 through the network 40, which sends a television video stream of a television channel to the first, second and third nodes 80, 82, 84. The first, second and third nodes 80, 82, 84 are able to display the television video stream on the screen alongside the first video stream.

The second node 82 preferably sends a first video stream of a scene at the second node 82, a second video stream of the scene at the second node 82 and an audio stream of the scene to the third node 84; and wherein the third node 84 has a display controller 52 which controls the image that appears on the screen and which plays each first video stream from each node alongside each other on the screen of a third node 84. Preferably, the network 40 is an Ethernet or ATM network 40. The first and second video streams and the audio streams of the first and second nodes 80, 82 are preferably sent over the network 40 for a video conference call, with no conferencing bridge or multipoint control unit (MCU) used for the video conference call. Preferably, each node uses ATM point to multipoint streams for the video conference call.

The third node 84 preferably predetermines which of the first or second video streams from the first or second nodes 80, 82 to display. Preferably, the third node 84 chooses to display the first video stream from the first or second nodes 80, 82 if a user in the respective scene at the first or second nodes 80, 82 is talking, or the third node 84 has predetermined to display the first video stream of the first or second nodes 80, 82. The first video stream of the first and second nodes 80, 82 is preferably in a desired format, such as MPEG-2 format, when it is sent over the network 40. Preferably, the first and second nodes 80, 82 use continuous P to place the first video stream of the first and second nodes 82 in the MPEG-2 format. The first and second nodes 82 preferably clip the first video streams of the scene of the first and second nodes 80, 82, respectively.

Preferably, the first and second nodes 80, 82 clip the first video stream of their respective scenes by removing a portion of the first video stream that is associated with a location of the respective scene that has no user. The first and second nodes 80, 82 preferably only send an audio stream of the scene of the first and second nodes 80, 82, respectively, if there is a noise above a predetermined threshold at the respective scene. Preferably, the first node 80 has an automatic presence sensor which determines whether a user is present at the scene at the first node 80, and produces a presence indicator of whether the user is at the first node 80, the first node 80 sends the presence indicator to the second and third nodes 82, 84. The first node 80 preferably produces an alert signal to alert any user in the scene at the first node 80 that the presence indicator is going to be formed in a predetermined time.

Preferably, the first node 80 includes an imaging means for taking a video picture of the first scene and producing the first video stream. The system 10 preferably includes an encoder 36 in communication with the imaging means which compresses and encodes the first video stream into MPEG-2 format without frame buffering. Preferably, the first node 80 includes a Field Programmable Gate Array 38 in communication with the encoder 36, which packetizes the first video stream, and also receives the first video stream from the imaging means and produces the second video stream of the first node 80 and packetizes the second video stream. The first node 80 preferably includes a network interface 42 in communication with the Field Programmable Gate Array 38 and the network 40 and transfers the first video stream of the first node 80 to the network 40, and receives the first video stream from the second node 82 and sends it to the Field Programmable Gate Array 38.

Preferably, the first node 80 includes microphone means for receiving sound from the first scene and producing the audio stream of the first node 80. The first node 80 preferably includes speaker means in communication with the network interface 42 for playing the audio stream from the second node 82. Preferably, the first node 80 includes a DSP 62 which packetizes the audio stream of the first node 80 and provides the audio stream to the Field Programmable Gate Array 38 which transfers the audio stream of the first node 80 to the network interface 42 which transfers the audio stream of the first node 80 to the network 40, and receives the audio stream of the second node 82 from the Field Programmable Gate Array 38. The first node 80 preferably includes an audio interface 60 which receives the audio stream of the first node 80 from the microphone means and digitizes it and provides it to the DSP 62, and converts the audio stream from the second node 82 that it receives from the DSP 62 to an analog form for the speaker means to play.

Preferably, the network interface 42 time stamps packets of the audio stream and the video stream of the first node 80 before they are sent to the network 40, and aligns the packets of the video stream and audio stream of the second node 82 that the first node 80 receives by time stamp so when the video stream and audio stream of the second node 82 are played by the first node 80, the associated sound with the image of the scene of the second node 82 is played. The system 10 preferably includes a receive memory in which the first video stream from the second node 82 is received and stored, and a main controller 50 connected to the network interface 42, the encoder 36, the Field Programmable Gate Array 38 and the DSP 62 to control them, the main controller 50 instructing the network interface 42 to choose the first video stream of the second node 82 and send it to the receive memory, the main controller 50 decodes and expands the first video stream of the second node 82 stored in the receive memory and sends it to the display controller 52.

Preferably, the first node 80 includes an LCD controller connected to the display controller 52, and the display screen includes a panel display connected to the LCD controller, the LCD controller receives the first video stream of the second node 82 from the display controller 52 and prepares the first video stream of the second node 82 for display on the panel. The system 10 preferably includes a touch screen on which buttons associated with functions appear, and a touch screen controller connected to the touch screen and the main controller 50 for transferring information regarding buttons which have been touched on the touch screen by a user to the main controller 50. Preferably, the first node 80 includes a decoder 34 for converting the first video stream from the imaging means of the scene of the first node 80 to digital form and providing it to the encoder 36 and the Field Programmable Gate Array 38, the decoder 34 connected to the Field Programmable Gate Array 38 and the encoder 36, the decoder 34 also receiving the television video stream and other analog form video streams and converting them to digital form.

The camera means preferably includes an analog video camera which is in communication with the decoder 34, a digital video camera which is in communication with the encoder 36 and the Field Programmable Gate Array 38, or a fire wire camera in communication with the Field Programmable Gate Array 38, the Field Programmable Gate Array 38 providing any video stream it receives from the fire wire camera to the encoder 36. Preferably, the DSP 62 provides for stereo echo cancellation of the audio stream of the scene of the first node 80, the encoder 36 provides for the first video stream of the first node 80 to have a resolution of at least 720 by 640 pixels, and the microphone means and the speaker means are full duplex. The DSP 62 preferably monitors the microphone means for the noise level produced by the speaker means and adjusts the speaker means to maintain a desired noise level. Preferably, the main controller 50 recognizes a command by the user to automatically call another user for a video conference, and use the command to announce to the other users that the other user is being requested for the video conference.

The first node 80 preferably has video mail when the first node 80 is not able to accept a video call. Preferably, the system 10 includes a server 66 that is in communication with the network 40 and the first node 80, which receives the video call for the first node 80 when the first node 80 does not receive the video call, stores a video message associated with the video call that the first node 80 does not receive, and sends a video call waiting message to the first node 80 that there is a video message waiting to be shown to the first node 80. The first node 80 preferably has a plurality of display panels connected to the display controller 52, with the images of the first video streams from different nodes being displayed on the panels alongside each other as though the plurality of panels is one continuous panel. Preferably, the first node 80 includes a second imaging means for producing the first video stream of the first node 80 having a different view of the scene at the first node 80 than the imaging means. The main controller 50 preferably sends the second video stream of the first node 80 from the Field Programmable Gate Array 38 to the display controller 52 to be displayed on the panel so the user of the first node 80 can see the scene of the first node 80 on the display panel. Preferably, the first node 80, second node 82 and the third node 84 include a videophone 15. The first node 80, second node 82 and the third node 84 can include a PC 68 in communication with the videophone 15.

In the operation of the invention:

Overview

Scope

The bandwidth manager 16 is a part of the ViPr 2 server system designed to limit bandwidth usage by SIP [J. Rosenberg, H. Schulzrinne et. al., RFC3261: Session Initiation Protocol, 2002, incorporated by reference herein] User Agents (e.g. ViPr terminal) by controlling RTP/AVP media flow across physical and logical network boundaries and types. The bandwidth manager 16 is not directly in the path of the media flow between endpoints, but instead is involved in the Session Initial Protocol (SIP) signaling call setup path. The source and destination networks are determined from the SIP requests, while the bandwidth usage is determined from the Session Description Protocol (SDP [M. Handley, V. Jacobson, RFC2327:, 1998, incorporated by reference herein]) contained in the SIP requests.

Architecture

There are two major options to be considered for the bandwidth manager 16 implementation, namely whether to implement it as part of the SIP proxy, or whether to implement it as a back-to-back SIP User Agent (B2BUA). It was decided that the B2BUA option was more advantageous, but the various advantages and disadvantages of the two options leading to this decision are discussed below. The major difference between a proxy and a B2BUA is that a B2BUA establishes a new call, whereas the proxy just forwards the INVITE transaction. The current instance of bandwidth manager 16 uses a B2BUA architecture.

B2BUA Implementation

RFC3261 [J. Rosenberg, H. Schulzrinne et. al., RFC3261: Session Initiation Protocol, 2002, incorporated by reference herein] defines a B2BUA as follows:

Back-to-Back User Agent: A back-to-back user agent (B2BUA) is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established. Since it is a concatenation of a UAC and UAS, no explicit definitions are needed for its behavior.

The interaction of a B2BUA with the client (UAC) and server sides (UAS) of two normal UAs can be summarized as follows (B2BUA in underlined bold typeface):

UAC--->UAS(b2b)===[application logic]===UAC(b2b)--->UAS

The "application logic" of a B2BUA is limited only by ingenuity, as long as the B2BUA still fulfills all the RFC3261 requirements of a UAS and UAC.

A B2BUA can more easily renegotiate/drop calls than a proxy because of the fact that it is call stateful. Essentially, the B2BUA establishes a new call, copying much of the information from the original request (e.g. Request-URI, From URI, To URI etc.).

It is assumed that all SIP entities interacting with the bandwidth manager 16 are fully compliant with the following standards:

RFC3261—Session Initiation Protocol
RFC2327—Session Description Protocol

SIP entities interacting with the bandwidth manager 16 include SIP Proxy servers and SIP User Agents.

Deviations from these standards may negatively impact the bandwidth manager 16. Whilst every attempt will be made to make a robust implementation, entities with incorrect SIP or SDP or behavior could result in any number of error conditions, for example:

Call setup failure
Incorrect detection of bandwidth.

External Breakdown

Figure 2:
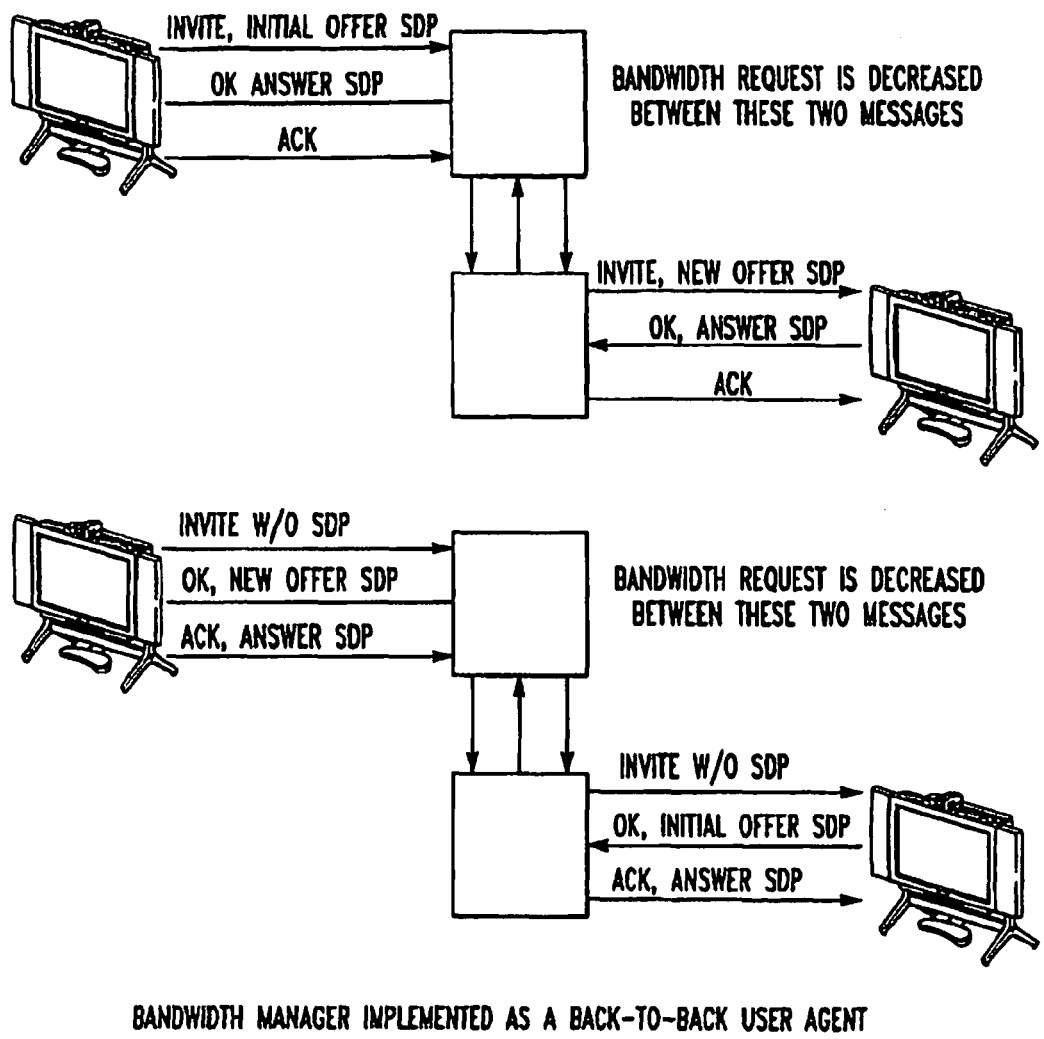
FIG. 2: bandwidth manager implemented as back-to-back user agent.
Figure 3:
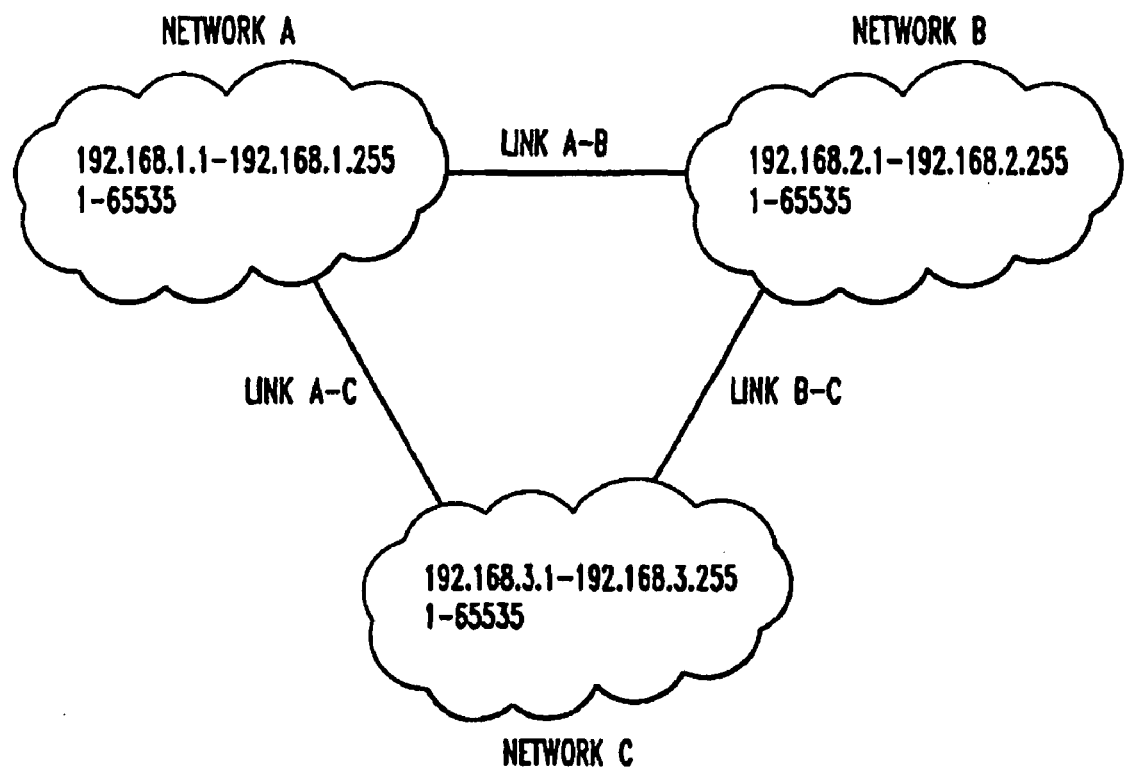
FIG. 3: bandwidth manager network and link definitions.

FIG. 3 shows the basis of the bandwidth manager 16 rule definition. Two or more networks are defined in terms of IP and port ranges. These networks will be matched to SIP requests by matching the Request-URI host/port for the destination, and matching the Via header/s IP/ports for the source network. Links are defined between networks, and bandwidth management is performed when a source and destination network are matched to a SIP request, and a link is defined between the networks.

Figure 4:
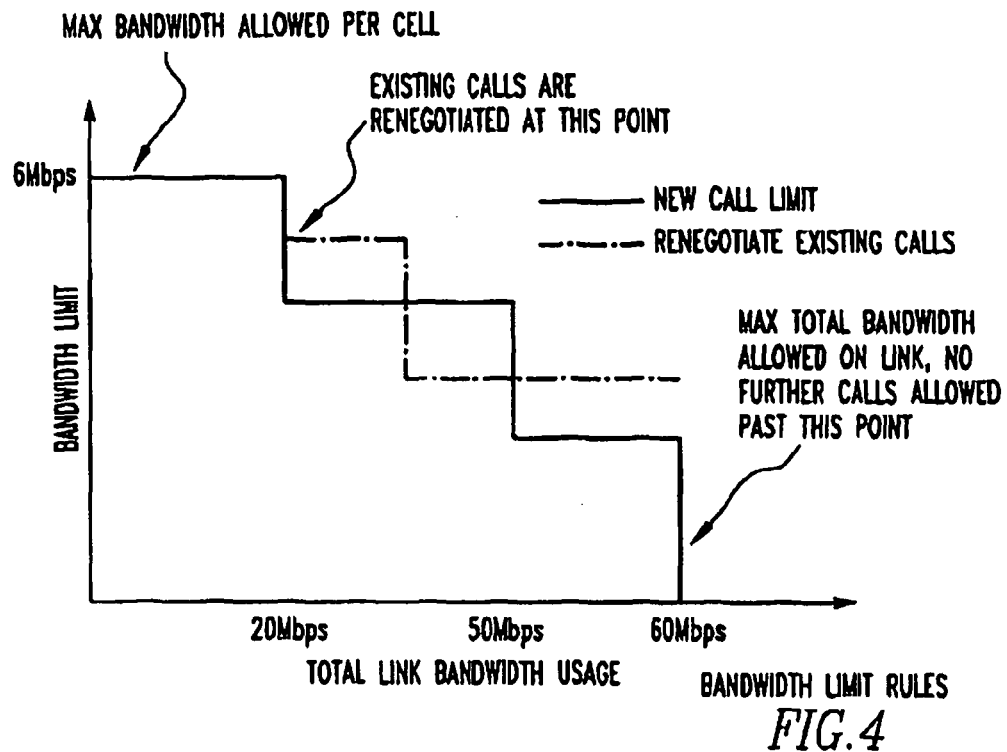
FIG. 4: bandwidth limit rules.
Figure 5:
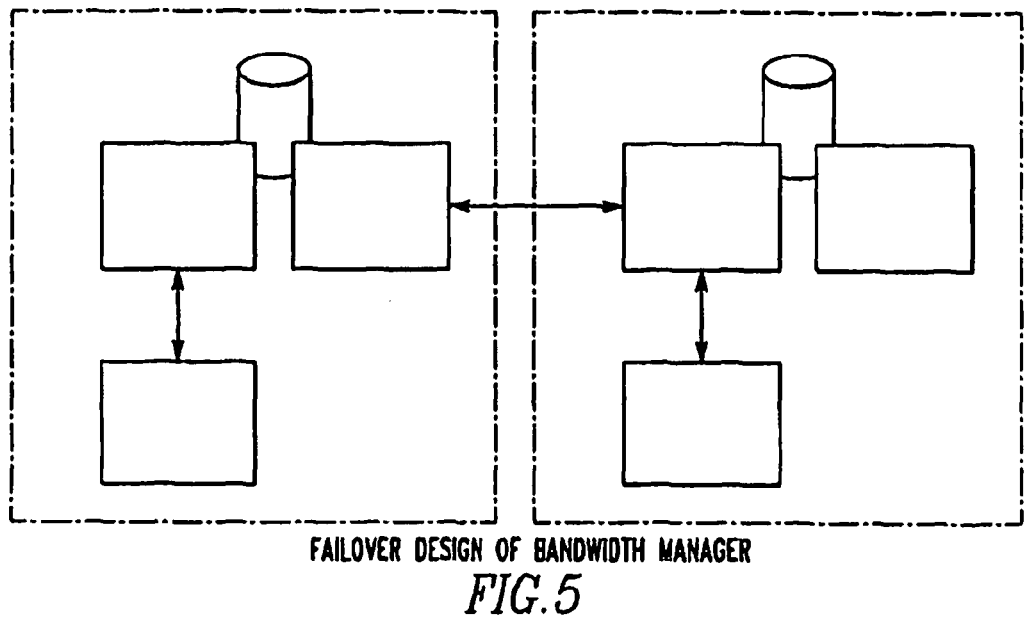
FIG. 5: failover design of bandwidth manager.

The links are defined with bandwidth constraints, and it is the job of the bandwidth manager 16 to ensure that calls across these links fall within those constraints. FIG. 4 shows an example of the constraints defined for a link. A policy exists for limiting the allowed bandwidth of new calls, and for renegotiating existing calls at certain link usage thresholds. Separate policies may exist for different types of streams, that is different policies may be defined for video, audio and data or any other types of streams. (e.g. It might be more desirable to have low bandwidth video and low bandwidth audio available on a call than to have no video and high bandwidth audio available). In this release of bandwidth manager 16, policies on a link are bi-directional, therefore, separate policies are not defined in different directions along a link, although bandwidth usage is accounted and policed separately on the two directions along a link (e.g. In a conference call there could well be more participants on one side of a link than the other side). There is no requirement that the bandwidth of the link be symmetrical. Also, the design allows for defining asymmetric policies.

New calls are adjusted to meet the maximum bandwidth per call (based on the current link usage) by modifying the offer SDP in two ways:

Reducing the value of the b=bandwidth specifier for video streams of ViPrs

Removing higher bandwidth audio codecs.

In the case where the offer SDP cannot be modified to fit within the constraints (e.g. when the constraints specify 0 bandwidth beyond a certain usage threshold), the call is rejected.

B2BUA SIP Message Forwarding

Figure 6:
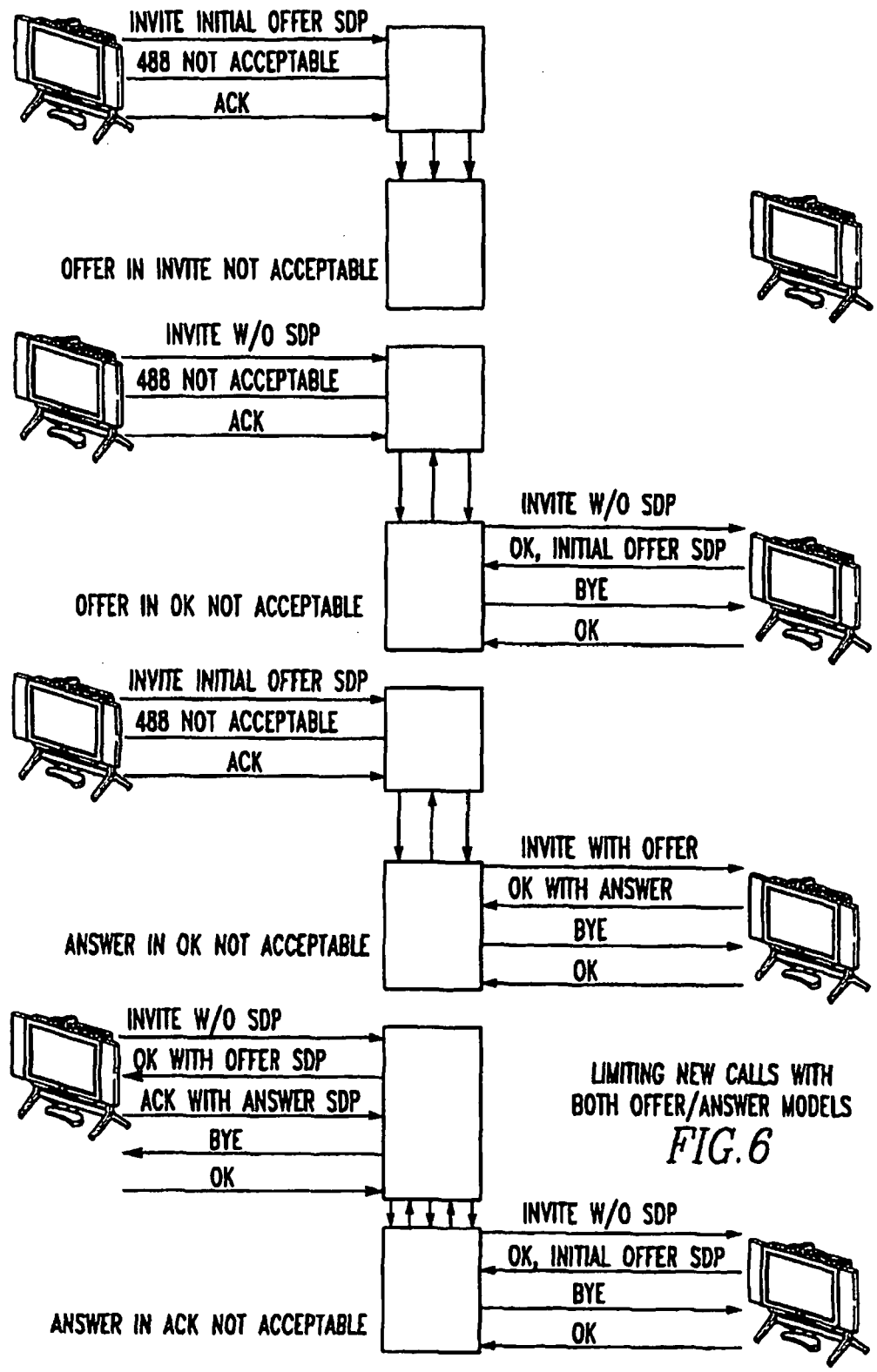
FIG. 6: limiting new calls with both offer/answer models.

The bandwidth manager 16 only ever changes the "offer" SDP, it only views the answer SDP as part of its bandwidth accounting process. FIG. 6 summarizes what happens in the SIP world when the bandwidth manager 16 participates in a call where the offer or answer goes outside the limits of the link for a new call.

The "488 Not Acceptable" SIP response message contains a Warning header field, which can be set to (from RFC3261):

370 Insufficient bandwidth: The bandwidth specified in the session description or defined by the media exceeds that known to be available.

It is up to SIP User Agents whether this Warning header field is displayed or not upon receiving a SIP error response code. It would enhance the user experience if the ViPr terminal (optionally, perhaps press of an additional button) displays extended error information (based on the SIP response code and the optional Warning header) upon receiving SIP error responses. During the bandwidth manager 16 B2BUA call setup, there are certain request header fields which must be "propagated" from the UAS to the UAC initiating the new call. These header fields include:

From

To

Request-URI

Expires

Require

Cannot just pass this through transparently, the B2BUA MUST actually conform to the requirement in the Require (as mandated by RFC3261 anyway since it MUST conform to the UAS specification)

Further "evidence" seen on SIP mailing list (wrt to passing Require through a B2BUA): No. As emphatically as possible: NO. This is completely wrong, and it appears to be a growing—and dangerous—misconception. A B2BUA cannot transparently pass Require though, it must understand and invoke the extension indicated.

Jonathan Rosenberg: Lets say my b2bua is a proxy in all ways, BUT it happens to muck with SDP to enable firewall traversal. Surely then it can ignore Require, right? WRONG. Let's say I define extension foo, which means "the content of this SDP is not what it seems—look at this header to instead find the real port/address for media". This extension needs a Require (because only a UA ever looks at bodies), but not a Proxy-Require, because proxies don't. Thus, your almost-a-proxy will fail in odd ways because it has ignored Require when it shouldn't have.

SDP (depending on BW constraints)

The SDP may be changed by the bandwidth manager 16 in the "offer" direction. Changes include reducing the value of b=lines, modifying the receive party list and omitting higher bandwidth codec types from the offer. These headers include Content-Type, Content-Length, Content-Disposition, Content-Language and Content-Encoding.

MaxForwards—similar "copy-and-decrement or create" logic as for a proxy to prevent loops through the bandwidth manager 16. If the request arriving on the UAS side does not have a Max-Forwards header, the new INVITE on the UAC side is created with a Max-Forwards header defaulting to a value of 70. If the Max-Forwards header did exist, and has a value of zero, the call setup is rejected with a 483 Too Many Hops response, otherwise the value is copied and decremented to be used in the new INVITE on the UAC side.

There are also certain fields which are not be propagated, these fields include:

Contact

This header indicates the address of an endpoint, and for the B2BUA should reflect the address where the UAC and UAS side may be reached, i.e. the Contact header in the new INVITE on the UAC side should reflect the address where the UAC may be reached, and the Contact header in the first final response on the UAS side should reflect the address where the UAS may be reached. These two addresses will probably be the same. This needs to be done to ensure that further requests (e.g. REFER, BYE, etc) within the dialog contexts are correctly routed through the bandwidth manager 16.

Call-ID and To/From tags

These will be generated in the new call on the UAC side, and will have no relation to the corresponding headers in the call on the UAS side.

Via list

Record-Route

Route

It may be desirable to inspect the Route headers in the original INVITE on the UAS side for loose routing, which may be used to construct a route set for the new INVITE on the UAC side.

Cseq

It is possible that certain other proprietary fields may exist which are important end-to-end, so it is highly desirable to implement the B2BUA in such a way that all header fields are copied from the original message, and only headers that are known to need replacing are stripped and replaced before sending the new message (for requests and responses).

Data Description

Codec Lookup Table

Bandwidth usage is inferred from the optional b=specifier in each media block. In the case where this specifier is not present, the bandwidth manager 16 must estimate the bandwidth usage based on each codec type specified. To aid with this, a lookup table will be defined with many known codec types. Each codec type will have a specified bandwidth usage in kbps, as well as optional additive and multiplicative modifiers to account for overhead (e.g. UDP/IP, ATM, RTP/AVP etc.).

Session Description Protocol [M. Handley, V. Jacobson, RFC2327:, 1998, incorporated by reference herein]

The Session Description Protocol (SDP) is used in SIP to describe the properties of the media streams to be established. The properties include transport parameters (e.g. IP address and port), codec options (e.g. GSM, PCMU, MPEG etc.) for each media type (only video and audio media types are addressed by the bandwidth manager 16) and bandwidth specifications for each media type.

FIG. 7 shows an annotated SDP sample highlighting the parts that are important for bandwidth management. From [M. Handley, V. Jacobson, RFC2327:, 1998, incorporated by reference herein]:

An announcement consists of a session-level section followed by zero or more media-level sections. The session-level part starts with a 'v=' line and continues to the first media-level section. The media description starts with an 'm=' line and continues to the next media description or end of the whole session description. In general, session-level values are the default for all media unless overridden by an equivalent media-level value.

Each media description starts with a media type, only "audio" and "video" media types will be considered in this document. The next sub-field is the transport port to which media streams are to be delivered. This port is not important for bandwidth management except that if this port value is set to 0, that particular media stream is discontinued for the duration of the session.

The "c=" lines contain connection information in the form "c=<network type><address type><connection address>". Multicast connection addresses MUST include a TTL value after the address, e.g. 224.2.1.1/127, but the /TTL syntax is illegal for unicast addresses.

Optional "b=" lines (b=<modifier>:<bandwidth-value>) specify the proposed bandwidth to be used by the session or media. The <bandwidth-value> is specified in kilobits per second. The <modifier> is a single alphanumeric word giving the meaning of the bandwidth figure, and can be set to CT (conference total), AS (application specific) or can be extended in a proprietary fashion using a modifier starting with "X-". According to [M. Handley, V. Jacobson, RFC2327:, 1998, incorporated by reference herein]:

Note that CT gives a total bandwidth figure for all the media at all sites. AS gives a bandwidth figure for a single media at a single site, although there may be many sites sending simultaneously.

A value of zero is allowed, but discouraged. It indicates that no media should be sent. In the case of RTP, it would also disable all RTCP.

There are various mandatory fields on session level in the SDP that will not be considered important for bandwidth management. These fields include "v=" (protocol version), "o=" (owner/creator and identifier), "s=" (session name) and "t=" (session time, the offer/answer RFC3264 [J. Rosenberg, H. Schulzrinne, RFC3264: An Offer/Answer Model with the Session Description Protocol (SDP), 2002, incorporated by reference herein] specifies that "t=" SHOULD be set "0 0" for SDP included in SIP).

The "a=" attribute lines denote either a property attribute (a=<flag>), or a value attribute (a=<attribute>:<value>). The relevant property flags which are important are recvonly, sendrecv, sendonly and inactive, and these denote the direction of media flow.

Allowable characters for <attribute>according to ABNF defined in [M. Handley, V. Jacobson, RFC2327:, 1998, incorporated by reference herein] are digits 0-9 and upper and lowercase alphabet, although further back in the specification it is stated that "attribute names must be in the US-ASCII subset of ISO-10646/UTF-8". User defined <attribute>names should start with "X-", although the ViPr also uses "X_" for its user defined attribute names. One of the pre-defined value attributes that are useful to this discussion, is the "a=type:<conference type>", which is usually set to "a=type:meeting" at session level for a conference call.

The offer/answer RFC [J. Rosenberg, H. Schulzrinne, RFC3264: An Offer/Answer Model with the Session Description Protocol (SDP), 2002, incorporated by reference herein] contains further information pertaining to SDP specifically as it applies to usage in SIP. A SIP session is initiated by the exchange of INVITE/OK/ACK between two parties, and there are two offer/answer model for SDP contained in SIP:

INVITE contains offer SDP, OK contains answer SDP
INVITE contains no SDP, OK contains offer SDP, and ACK contains answer SDP.

From [J. Rosenberg, H. Schulzrinne, RFC3264: An Offer/Answer Model with the Session Description Protocol (SDP), 2002, incorporated by reference herein]:

For each "m=" line in the offer, there MUST be a corresponding "m=" line in the answer. The answer MUST contain exactly the same number of "m=" lines as the offer. This allows for streams to be matched up based on their order. This implies that if the offer contained zero "m=" lines, the answer MUST contain zero "m=" lines.

An offered stream MAY be rejected in the answer, for any reason. If a stream is rejected, the offerer and answerer MUST NOT generate media (or RTCP packets) for that stream. To reject an offered stream, the port number in the corresponding stream in the answer MUST be set to zero.

Any media formats listed are ignored. At least one MUST be present, as specified by SDP.

If multiple media streams of the same type are present in an offer, it means that the offerer wishes to send (and/or receive) multiple streams of that type at the same time [ . . . ] When a user has a single source for a particular media type, only one policy makes sense: the source is sent to each stream of the same type [ . . . ] the intent of receiving multiple streams of the same type is that they should all be presented in parallel, rather than choosing just one.

The offer/answer RFC contains some differences for unicast and multicast:

1. Unicast

If a stream is offered as sendonly, the corresponding stream MUST be marked as recvonly or inactive in the answer. If a media stream is listed as recvonly in the offer, the answer MUST be marked as sendonly or inactive in the answer. If an offered media stream is listed as sendrecv (or if there is no direction attribute at the media or session level, in which case the stream is sendrecv by default), the corresponding stream in the answer MAY be marked as sendonly, recvonly, sendrecv, or inactive. If an offered media stream is listed as inactive, it MUST be marked as inactive in the answer.

Putting calls "on hold" is achieved by setting all sendrecv streams to sendonly, and all recvonly streams to inactive. The older 2534 SIP RFC specified using an IP connection value of 0.0.0.0, but this is NOT recommended by the offer/answer RFC.

2. Multicast

If a session description contains a multicast media stream which is listed as receive (send) only, it means that the participants, including the offerer and answerer, can only receive (send) on that stream. This differs from the unicast view, where the directionality refers to the flow of media between offerer and answerer.

Unlike unicast, where there is a two-sided view of the stream, there is only a single view of the stream for multicast. As such, generating an answer to a multicast offer generally involves modifying a limited set of aspects of the stream.

If a multicast stream is accepted, the address and port information in the answer MUST match that of the offer. Similarly, the directionality information in the answer (sendonly, recvonly, or sendrecv) MUST equal that of the offer.

Logic Description

UAS and UAC Call States

The B2BUA will attempt to keep the call states of the UAS and UAC side in synchronization by performing corresponding actions on each dialog based on events, e.g. if the UAS receives an INVITE, the UAC will generate an INVITE, and if the UAC receives a response, a similar response will usually be sent on the UAS. This is shown schematically in FIG. 8. There are some exceptions to this:

- 100 TRYING must be sent by the UAS as soon as it receives an INVITE to comply with the UAS specification of RFC3261. 100 TRYING messages received on the UAC side are not resent on the UAS side.
- Certain operations (e.g. dropping of existing calls) are bandwidth manager 16 initiated.

Network Matching Based on Initial SIP INVITE

The initial SIP INVITE message needs to be inspected by the location lookup in the SIP proxy to determine whether bandwidth management needs to be invoked for the call. The bandwidth management rules essentially consist of network definitions, which need to be matched to the source and destination of a SIP INVITE. If two networks are matched to the source and destination of the SIP INVITE, AND a link is defined between those networks, bandwidth management is invoked (i.e. the INVITE is routed through the B2BUA).

Destination Network Match

The Request-URI is matched against all the network definitions to see if a match can be made. If the Request-URI is a hostname, a DNS lookup is performed (possibly using a simplistic localmemory caching DNS lookup function for performance) to determine the IP address. The downside to this is that RFC3261 mandates that one MUST NOT replace the Request-URI host with its DNS IP address, so the SIP stack will later do another DNS lookup just prior to sending the message.

Source Network Match

The Via headers in the SIP INVITE provide a trace of the patch the SIP message has taken, so there are several options for determining the source network from the SIP INVITE:

1. Use only the top Via
   The topmost Via indicates the previous hop
2. Use only the bottom Via
   The bottom Via should show the originator of the SIP INVITE
3. Use all Vias
   This option could result in multiple matches, so the question then becomes which network match takes priority?
   1. "most recent" network? That is, the network matching the Via closest to the top
   2. "most original" network? That is, the network matching the Via closest to the bottom.

Option 3 with "most recent" will be used by the bandwidth manager 16. The bottom Via showing the originator could be an IP address "hidden" behind a proxy server, which might be meaningless by the time it gets processed by the rules of the current proxy server.

Re-INVITE Handling

SIP supports changing the session parameters (e.g. media streams) during a call with ReINVITEs. These are INVITE messages within a dialog context (i.e. To: and From: header tags both exist), and the failure of a reINVITE MUST NOT alter the call state. Therefore, a make-before-break approach will be used by the bandwidth manager 16 when handling reINVITE messages.

Bandwidth Management Logic

This section describes the logic used by the bandwidth manager 16 for point-to-point and conference calls. Certain high-level inputs are required by the decision making process, and these inputs in turn provide access to further information required when deciding what to do with a new call. These inputs are:

1. Link on which call takes place
   a. Current link usage in both directions
   b. Policy to apply on this link
2. Direction of call on link, and which SDP offer/answer model is used (Invite offer-OK answer or OK offer-ACK answer)
   a. Direction of link of which SDP offer takes place
   b. Direction of link on which SDP answer is expected
3. SDP offer
   a. Type of call leg: point-to-point, small/medium/large conference
1. Other conference call legs in this conference going through bandwidth manager 16
2. Offered bandwidth per stream (audio/video per participant)

Based on this information the bandwidth manager 16 applies the following decision making process for each call type:

Point-to-point Calls

These calls are the simplest to manage. The RTP/AVP streams referred to in the SDP are unique on the link, so each call is independent of all other calls. The bandwidth manager 16 consults the policy (see FIG. 4) and decides on a maximum bandwidth cap for the audio and video streams in the offer based on the total link usage in the offer direction. If these caps are less than the offered bandwidth in each stream, the streams' "b=" parameters are modified accordingly. If a particular "b=" is set to 0, the port parameter in that media block is also set to zero to disable that stream. If the offered streams' bandwidth is added to the current usage and the total would exceed the link capacity, the video stream bandwidth is reduced to the next lower step (valid options are: 4000, 2000, 1000, 500, 0) to try and accommodate the new call. If the offer is still acceptable after all the above, an assumption is made that the answer will have the same bandwidth as the offer, and the usage in the answer direction is consulted. If necessary, the offer bandwidth is further reduced based on this. If the offer still has greater than zero bandwidth in one of its streams, the call on the 2nd side of the B2BUA is established with the modified SDP, otherwise, the call is rejected outright.

The bandwidth per stream for a call is only counted on the link once the call has been established. Each stream bandwidth is also only counted if the offer attribute line (sendonly, recvonly or sendrecv) contains "send" and the corresponding answer also contains "recv." The opposite direction bandwidth is also only counted if the offer contains "recv" and the answer contains "send." These checks are necessary to accommodate call holding and video or audio mute. In a later phase, multi-level priority and pre-emption will also be implemented, if there is insufficient bandwidth for a new call, the bandwidth manager 16 will see if there are any lower priority calls which it can drop to make capacity available for the new call.

Also in a later phase, existing call re-negotiation will be implemented. Based on the policy, when the usage reaches certain thresholds, existing calls using more than a certain bandwidth will be renegotiated down to make more capacity available for new calls.

Small Conference Model (3 or 4 Participants)

In this type of conference call each participant sends multicast (or point-to-multipoint for ATM) data for each media stream (video and audio), and all other participants can listen on the media streams that they are interested in. A conference host SIP UA runs on the ViPr that initiated the conference (i.e.

by inviting a third participant when in a call with someone), and SIP call legs (dialogs) exists between each participant and the conference host. There are therefore not multiple call legs between all the parties involved, this is a hub-and-spoke model.

The individual "spokes" of the conference obviously do not all need to go through the bandwidth manager 16.

Example Scenario

Figure 10:
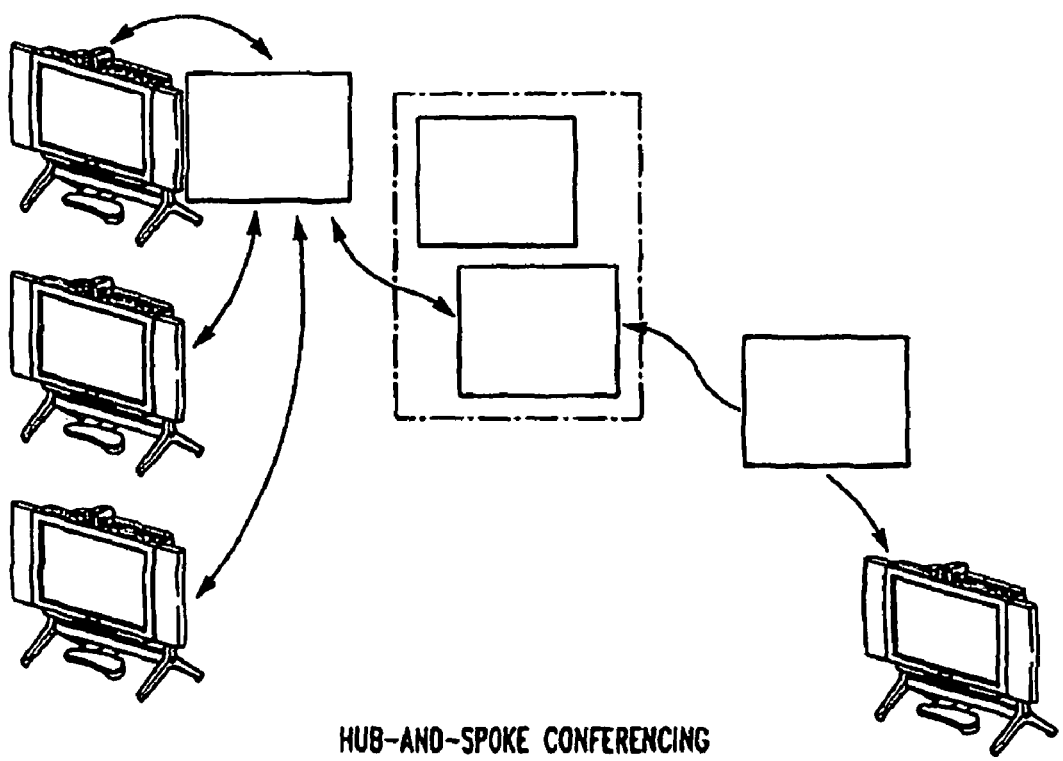
FIG. 10: hub-and-spoke conferencing.
Figure 15:
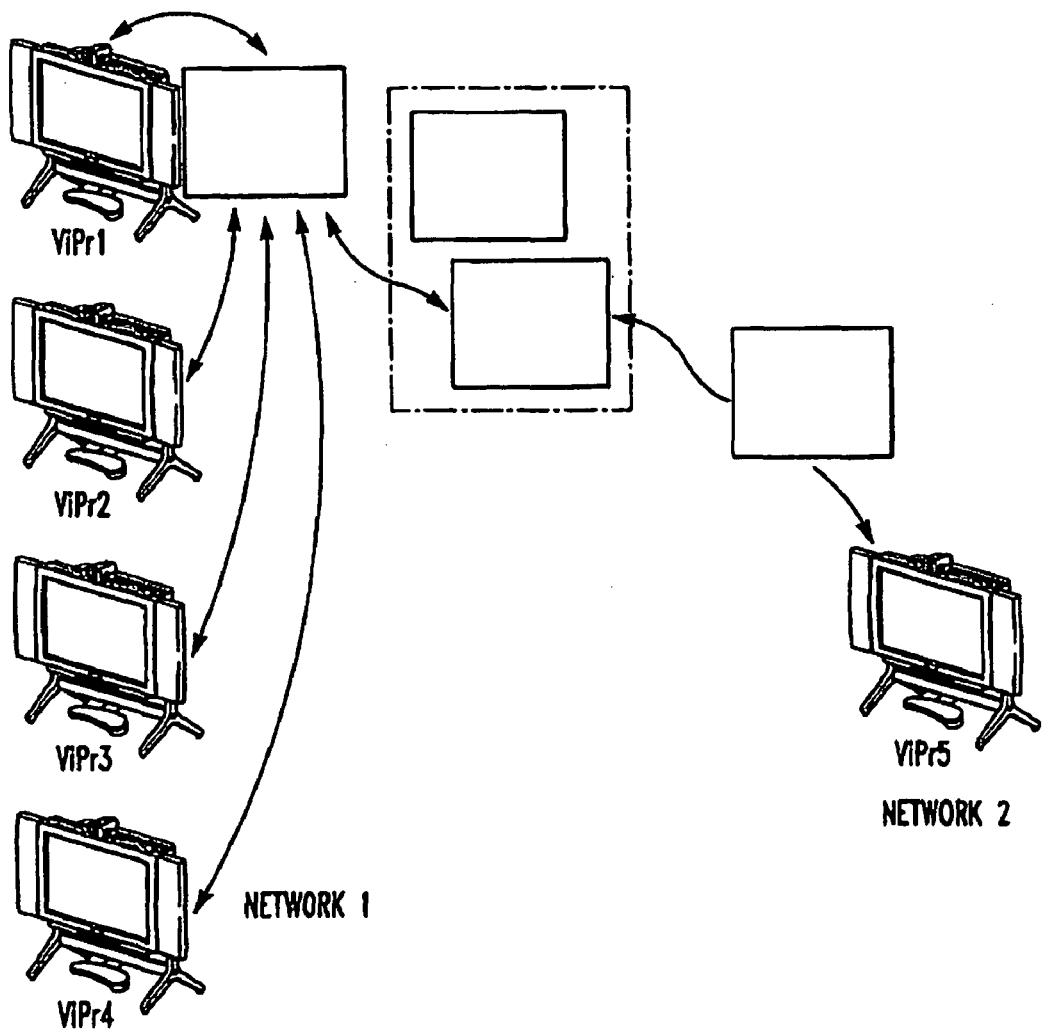
FIG. 15: sample medium conference scenario.

Three ViPr terminals could be in a conference on the local LAN, and then a 4th ViPr is invited across a limited capacity link defined in the bandwidth manager 16. In this case, only the 4th call leg will go through the bandwidth manager 16, the other call legs will be established directly between the conference host and each ViPr terminal. FIG. 10 shows the resultant five SIP call legs that are established for this example scenario. The multicast media streams are not shown here, it is assumed that the network routing element takes care of the necessary IGMP multicast packet forwarding to ensure the streams of ViPrs 1, 2 and 3 reach ViPr 4, and the streams of ViPr 4 reach ViPrs 1, 2 and 3.

To further elucidate this scenario, FIG. 11 shows the relevant parts of the offer SDP arriving at the bandwidth manager 16 when ViPr 4 is invited. The combination of conference call identifier (seen in a=X_GUID line), port number and multicast group IP is assumed to be unique on a link, so other legs of the same conference call going through the bandwidth manager 16 could refer to the same streams. The bandwidth used across the link for these streams must only be counted once, even though multiple call legs refer to them, since that accurately reflects what is happening with multicast.

The bandwidth manager 16 in this case does not yet know of the existence of these streams on the link, and therefore assumes them all to be new streams being offered over this link for the first time. Consulting the policy and the current link usage in that direction, the bandwidth manager 16 could for example see that the maximum new per stream bandwidth for video is 2000 kbps, and the offer wanted 3000 kbps per video stream. The offer is changed, and the total new bandwidth for the offered SDP is now (6000+192) kbps. If this would exceed the link capacity, the video bandwidth per stream is further reduced to the next lower valid value (4000, 2000, 1000 or 500) until the new offer falls within acceptable limits. The available bandwidth in the answer direction is also consulted, and the max allowable per stream rates are inserted into the placeholder VHost streams. ViPr 4 will look at these values to determine if it needs to adjust its default transmit rate. The offer SDP in the "new" call from the bandwidth manager 16 to ViPr 4 is shown in FIG. 12. If no bandwidth for video is available in the offer direction, the VHost placeholder is set to b=0, signaling to ViPr 4 that it cannot participate in video. In this case the BWM must "remember" to not modify the b=video lines when it eventually sends an answer back to the conference host.

When ViPr 4 receives this SDP, it knows to expect 2000 kbps video streams from ViPrs 1, 2 and 3, and it knows (from the placeholder VHost streams) that it may transmit video at 2000 kbps. Several cases present themselves based on what ViPr 4 replies in the SDP.

Case 1: ViPr 4 Responds with Audio and Video Call

ViPr 4 accepts the audio and video bandwidth caps in the VHost section, and responds with the SDP in FIG. 13. Note that the changed b=lines in the VHost media section is kept like this by the bandwidth manager 16 to show the conference host that the bandwidth manager 16 was involved.

ViPr 4 wishes to only participate in audio for the conference call. The video stream is disabled with a port number of 0 and a b=0 line. The bandwidth manager 16 needs to recognize that as a result of this no video will be sent to ViPr 4 either (i.e. ViPr 4 will not join the multicast video streams of the other ViPrs), and as a result:
1. any resultant video bandwidth for these streams reserved/allocated in the offer direction of the link must be freed
2. the modified b=lines for ViPrs 1,2 and 3 must be restored to their previous values to prevent triggering unnecessary reINVITEs for all the ViPrs from the conference host.

This is in accordance with the ViPr policy of providing and preserving the best possible audio/video experience. Since the video from ViPrs 1, 2 and 3 does not need to go across the limited capacity link, ViPrs 1, 2 and 3 may still send/receive high quality video to/from each other.

FIG. 14 shows the SDP answer from ViPr 4 to the bandwidth manager 16, and from the bandwidth manager 16 to the conference host.

Medium Conference Model (5 to 12 Participants)

The biggest difference between the medium conference model and the small conference model is that each participant additionally multicasts a thumbnail size video stream (350 kb/s ???), and each participant listens to only 3 other "large" video streams, with the result that some participants do not need to multicast large video at all if nobody is interested in seeing their large video (if this were not the case, this conference model would become impractical very quickly due to the large amount of wasted bandwidth).

Additional proprietary fields are included in the media blocks of the SDP by the conference host to identify which streams belong to which parties, and to show each party's big video selections. The party identifier field is added by the conference host for each party in the audio media block, and has the format a=X-Party_ID:<identifier>. Each video media block has an attribute line to indicate the 3 large video streams that party is interested in viewing, these refer to the party identifiers described earlier and has the following format: a=x-party_list [<id1>,<id2>,<id3>]. Each participant also has a thumbnail video stream (low bitrate video), identified by m=LR-Video. The audio and LR-Video media blocks do not contain xparty_list attributes normally, indicating that "those" terminals would like to receive all other audio and LR-Video streams.

When a conference host invites a new participant (any of the terminals in the conference can invite a new participant by sending a REFER to the conference host), the VHost media block contains a x-party_list attribute containing the initial big video streams to be used by the new participant. FIG. 16 shows the relevant parts of a sample SDP body in an INVITE reaching the bandwidth manager 16 from the conference host. ViPr 5 is being added to a medium conference across a limited capacity link.

Note that the participants in the party list attribute are not ordered according to position in the SDP since the conference host has separate call legs with each participant, the ordering can thus be completely different. As an example of the information which can be gleaned from this, the media streams of ViPr1 indicate the following:
   It is interested in receiving "big" video from parties 2, 3 and 4, which correspond in this case with ViPrs 2, 3 and 4.
   It is interested in receiving audio streams and lr-video streams from all parties in the conference call.

The bandwidth manager 16 upon receiving this SDP in a new call offer needs to modify the bandwidth in the streams if appropriate based on the link usage. Additionally, it knows for an initial invite that ViPr5 cannot be in anybody else's big video selection to begin with, so no bandwidth will initially be needed in the answer direction. The bandwidth manager 16 will then follow this logic:

- Audio streams are higher priority that LR video streams, LR video streams are higher priority than big video streams
- Big video from ViPrs 1, 2 and 3 will initially be received by ViPr 5 (bandwidth allowing)
    - Assume for this example that max per stream bandwidth is set to 2000 kbps.
    - The bandwidth manager 16 can modify only these 3 big video streams' bandwidth to have any effect on reducing the bandwidth required for this call leg.

The following table summarizes the bandwidth requirements in each direction for this call leg:

| Stream | Offer direction | Answer direction |
| --- | --- | --- |
| Audio | 5 * 64 = 320 | 1 * 64 = 64 |
| LR Video | 5 * 350 = 1750 | 1 * 350 = 350 |
| Video | 3 * 2000 = 6000 | 0 * 2000 = 0 |
| Total | 8070 kbps | 414 kbps |

FIG. 17 shows the SDP as modified by the bandwidth manager 16 before being sent to ViPr 5. As in the case with the small conference model, ViPr 5 could reply back with no video, in which case the bandwidth allocated/reserved for its LR video would be released, and the modified streams for the first three parties would be restored to their original values. In the more likely case, however, ViPr 5 would accept the call with audio and video and send a SIP OK with the SDP as shown in FIG. 18.

The bandwidth manager 16 would forward this OK to the conference host (with the changed bandwidths for the first three parties since ViPr 5 indicated that it is partaking in video). The conference host would reINVITE all the other parties as usual to inform them of the new participant, and the first 3 parties would adjust their multicast send rate as appropriate. Some cases of interest to the bandwidth manager 16 logic are described below. These cases involve participants changing their big video viewing preference.

Case 1—ViPr 5 Decides to View ViPr 4 Instead of ViPr 3

To indicate this, ViPr 5 sends a reINVITE through the bandwidth manager 16 with a changed party list attribute, as seen in FIG. 19.

The bandwidth manager 16, upon receiving this message, observes that ViPr 5 is no longer interested in viewing ViPr 3's big video. If no other participants on this side of the link (Network 2) are interested in ViPr3's video, the bandwidth manager 16 can release the associated bandwidth on the link in the direction Network1 to Network2. The bandwidth manager 16 also observes that ViPr 5 wishes to view ViPr 4. Taking into account the available link (Network 1 to Network 2) bandwidth and the current bitrate at which ViPr 4 is transmitting big video, the bandwidth manager 16 can take one of the following decisions:

Case 1a: the BWM supports the bitrate at which ViPr 4 is transmitting.

Case 1b: the BWM cannot support the current ViPr 4 bitrate, but can support a lower bitrate.

Case 1c: the BWM cannot support big video from ViPr 4 even at a lower bitrate without lowering the bitrate associated with other large video streams from N1 to N2 in this conference call, in this example ViPr 1 and ViPr 2 streams.

Case 1d: the BWM cannot support video from ViPr 4 at all.

Case 1a

In this instance, the bandwidth manager 16 does not need to modify the SDP, and merely passes it on to the conference host.

Cases 1b and 1c

Cases 1b and 1c are the same in terms of protocol behavior and message flow, the only differences being the bandwidth manager 16 decision/allocation process. For the first phase bandwidth manager 16, only case 1b will be considered, i.e. the BWM will not modify bandwidth associated with big video connections to accommodate a new big video request. This should not affect the medium scale protocol mechanism if it changes in future though. Since case 1c is slightly more complex, it is used for this example. The BWM decides to lower the transmit bandwidth of ViPr 1 and 2 big video to support transmission from ViPr 4 across this link. The bandwidth it chooses for ViPrs 1, 2 and 4 is 1000 kbps, and the modified SDP from the BWM to the conference host can be seen in FIG. 20. The conference host receives the reINVITE and sends the information to all the relevant parties. In this case, ViPrs 1, 2 and 4 will adjust their large video transmit rate, ViPr 3 will remove ViPr 5 from its list of listeners, and ViPr 4 will add ViPr 5 to its list of listeners. The conference hosts sends an OK back to the BWM which will send it on to ViPr 5.

Case 1d

In this case, the BWM decides that it cannot support big video from ViPr 4 to ViPr 5 at all. The BWM modifies the SDP to indicate to the conference host that ViPr 5 was asking for big video from ViPr 4, but was denied this request because of a lack of bandwidth. The way in which this is indicated is by setting the appropriate entry in the party list to a negative value. The xparty_list is changed from [1,2,4] to [1,2,−4]. The bandwidth field is not modified, since it is unnecessary. The modified SDP can be seen in FIG. 21. The conference host will realize that ViPr 5 is asking for big video from ViPr 4, but is being denied by BWM. The conference host will reply the same SDP in an OK to the BWM, which will in turn forward it back to ViPr 5. ViPr 5 will recognize that its attempt to add ViPr 4 has failed, and further behavior is up to the terminal, e.g. it can auto retry later, or warn the user, or try to get ViPr 3 video back etc.

In this document the conference with up to 4 participants is referred to as Small Conference [SConf]. The conference with 4-12 participants is called Medium Conference [MConf] and with greater than 12 participants is called large conference [LConf].

The ViPr conferencing model is a hub and spoke conferencing model. The hub of the conference is VHost. Each participant of this call is a Spoke. The hub spoke model will continue to be used for medium and large conference calls.

Small Conference

The ViPr conferences follow a hub and spoke conferencing model. Where each party in a conference call establishes a SIP call[spoke] with the conference host[hub], also called VHost. Conference host typically runs on the ViPr, which initiates the conference.

A conference call with participant P1 [on ViPr V1], P2 [on V2], P3[On V3] consists of 3 SIP calls.

SIP Call between VHost and V1
SIP Call between VHost and V2
SIP Call between VHost and V3.

The role of VHost is to distribute conference-streaming information from each participant to every other participant.

In a small conference each party can send two media streams—Audio, Video.

When conference call is on hold, the audio and video stream both are not transmitted When camera is turned off. The Video Stream is not transmitted Further more following constrains are placed for all participants. When a ViPr has camera turned off, it also prevented from receiving Video. When a ViPr is on hold, its prevented from receiving Audio/Video.

Further as per an implied policy, all the ViPr that are transmitting a stream of Type X [either Audio or Video] are also automatically interpreted as being interested in listening to that type of stream. Thus, if a participant has audio transmit enabled, every other party interprets it as a sign of this party's interest to receive audio. This can be paraphrased as rule "transmit enabled means receive desired".

For example, consider a conference with parties P1, P2, P3, and p4:

Table 1 shows the stream information for each party. Where Video Tx=On, implies that the party has its transmit enabled for Video. It does not imply the party is actually transmitting video. A party starts transmitting only when it sees that another party has its Video Tx=On.

TABLE 1

P1 [Audio Tx = On, Video Tx = On]
P2 [Audio Tx = On, Video Tx = On]
P3 [Audio Tx = On, Video Tx = Off - Camera off]
P4 [Audio Tx = Ooff, Video Tx = Off - party on hold]
Table 1

To construct this table, each party sends it transmit information to VHost. And VHost relays this information back to other parties. Thus each party learns the transmit states of the other parties.

Let us see how P1, P2, P3, P4 interpret it, this table.

At P1

P1, sees P2 has transmit enabled/on for Audio. This is interpreted by P1 as a indication that P2 also wants to receive from P1. Thus the transmitted state is implicitly linked to receive state. Similarly P1 interprets P2 as being interested in Video too. Thus P1 adds P2 as a listener for Audio/Video streams.

P1 sees P3 as being interested only in Audio. Accordingly, it just adds P3 as a listener/receiver for audio.

P4 is not added as a listener by P1 for either Audio or Video.

Similarly P2, P3 and P4 discern which parties are interested in receiving audio/video from them by looking at the transmit state of their respective streams.

SIP Details

The table 1 which captures the transmit state of each party is encoded as SDP and sent to each party by/through the VHost. Whenever, any party changes its stream transmit state, it updates the table sends it to VHost. The VHost then sends the updated table to all other parties. Thus, the VHost acts as maintainer and reflector of current table state information.

How is this table populated and represented in SDP?

To understand this, let us consider the same conference with participants P1, P2, P3 and P4. P1 initiates the conference. It sends an INVITE to VHost, with its stream information included in SDP attached to SDP. The SDP represents just one line of table 1 at this point [table 2]. Please note this not the actual SDP format/syntax, but rather logical representation of SDP content. Please refer table 4 to understand how this table is actually encoded in terms of attribute lines.

TABLE 2

P1 [Audio Tx = On, Video Tx = On]

At this point, P1 is not transmitting either Audio/Video. It is just indicating transmit is enabled. As mentioned before, P1 will not start transmitting its streams till it sees another party with transmit enabled for its corresponding stream.

Also, as per the rule "transmit enabled means receive desired" it also indicates its interest in receiving audio/video from other parties.

As a next step, P1 invites P2 into conference, by sending a SIP REFER to VHost. The VHost on receiving REFER from P1 for P2, ends an INVITE to P2 with SDP in table 2. P2 acknowledges this by adding its own stream to table 2, the updated stream information is represented by table 3.

TABLE 3

P1 [Audio Tx = On, Video Tx = On]
P2 [Audio Tx = On, Video Tx = On]

VHost sends this updated back to P1, who thus gets to know the presence of P1 and its streaming information.

P1 adds P3 and P4 into the conference call in a similar fashion.

Representation of Table in SDP

Each party adds a party-block of information in the SDP. A party-block of information consists of three media blocks of information. One blocks each for audio, video and thumbnail video.

An Audio media block is represented as follows:

TABLE 4

| Line | Description |
|---|---|
| m = audio 48017 RTP/AVP 11 | Indicates the stream is audio and can be received on port 48017 as RTP/AVP as codec type 11. |
| i = Party_P1 | Carries ID of party to which the stream belongs. |
| c = IN IP4 239.194.50.201 | Stream is being sent on IPV4 address 239.194.50.201 |
| a = X_c: ATM NSAP <NSAP_ADDRESS> | This stream is being multicast from ATM NSAP <NSAP_ADDRESS> |
| b = AS: 256 | This stream uses a bandwidth of 256 kbps |
| a = rtpmap: 11 PCM16 | Codec 11 is actually PCM16 |
| a = sendonly | This stream is a sendonly. This field is set to inactive to indicate that sender is currently not transmitting this stream. This field is set to inactive for audio when call is placed on hold. And is set to inactive for video when either the camera is turned off or when call is placed on hold. |
| a = X_app: ViPr 2 ViPrTerminal | The originator of this stream is a ViPr terminal which uses version 2 of ViPr conferencing. |

Video and LR Video are represented in a similar manner. Each party thus has set of blocks [as table 4] present in the SDP.

Implementation Details on UAC/UAS

The UAC and UAS for this scenario are ViPr terminal class devices. The software on these devices is conceptually divided into following sub-modules:

Sip UA: This module implements the SIP functionality. It is responsible for interaction with bandwidth manager 16 to request and allocate required bandwidth for the media streams.

Audio/Video/data subsystem: This subsystem is responsible for generating audio, video and data streams for transmission across the network to other network nodes part of a conference. This subsystem also plays back the audio, video and data streams received from other nodes.

Network modules: This module programs the network sockets for sending and receiving media packets from/to a conference peer.

Medium Conference Model

Medium conferences differ from a small conference in terms of its size and also layout on the display. A medium scale conference is a conference with between 1-12 parties. It follows a 3 big video participants and 12 thumbnail participant layout on the display.

A small conference with 4 participants is auto-magically converted to a medium conference when 5 party is added.

A conference can also be started off as a medium conference. Every medium conference is uniquely identified by a URI.

A medium scale conference is different from the small conference in following respects.

1. Medium scale conference participants can transmit up to 3 streams.
    a. An audio stream.
    b. A big video stream.
    c. A small thumbnail stream.

When a participant has camera on. Its transmitter is enabled for both big video and thumb nail video.

2. In a medium scale conference when a participant indicates its transmitter for video and thumbnail video is on, It does not necessarily imply that it wants to receive big video and thumbnail video from other parties. This means that the model used for small conference "transmit enable means receive desired" is not valid any longer.

This creates a slight problem, as unlike in small scale conference now each party must use some other mechanism to indicate the streams it is interested in receiving.

Problem: So How to indicate the set of streams each party is interested in receiving?

Let us consider a medium scale conference with parties P1 through P5. All the parties have their video/audio transmit enabled.

Each party is capable of:
Displaying 3 big videos
12 thumbnail videos
12 audio streams.

Thus, each party has to select 3 out of 4 parties to be displayed in 3 big videos. Let us say P1 wishes to view P3, P4, and P5 as big.

Thus, P1 must indicate to P3, p4 and P5 of its interest in their big video. One of the ways it can be done is by updating the table of SDPs/Media attributes to explicitly have a receive_party_list field. Thus, for example, table 1 could be modified as following [table5]:

Table 5 also shows selection of other parties.

TABLE 5

P1
[
   Audio Tx             = On + Listening to p2, p3, p4, p5
   Thumbnail Video Tx = On + Listening to p2, p3, p4, p5
   Big Video Tx        = On + Listening to p3, p4, p5
]
P2
[
   Audio Tx             = On + Listening to p1, p3, p4, p5
   Thumbnail Video Tx = On + Listening to p1, p3, p4, p5
   Big Video Tx        = On + Listening to p1, p4, p5
]
p3
[
   Audio Tx             = On + Listening to p1, p2, p4, p5
   Thumbnail Video Tx = On + Listening to p1, p2, p4, p5
   Big Video Tx        = On + Listening to p1, p4, p5
]
P4
[
   Audio Tx             = On + Listening to p1, p2, p3, p5
   Thumbnail Video Tx = On + Listening to p1, p2, p3, p5
   Big Video Tx        = On + Listening to p1, p2, p5
]
P5
[
   Audio Tx             = On + Listening to p1, p2, p3, p4
   Thumbnail Video Tx = On + Listening to p1, p2, p3, p4
   Big Video Tx        = On + Listening to p1, p2, p4
]

It is clear from this table that the protocol mechanisms for carrying stream information must be changed to accommodate carrying information relating to list of parties each participant wants to listen to.

One of the ways to do this is to reuse the mechanisms from small conference to encode the complete table of current stream information in the SDP. This SDP essentially carries the receive and transmit information for all the other parties. For example, P1 could encode its part of the SDP as follows:

```
// Audio
m = Audio 5004
i = Party_P1
c = in IPV4 239.192.50.50
a = X_c: NSAP
a = sendonly
a = X_parties: P2, P3, P4, P5
// TN Video
m = Video 10000
i = Party_P1
c = in IPV4 239.192.50.50
a = X_c: NSAP
a = sendonly
a = X_parties: P2, P3, P4, P5
// TN Video
m = Video 14000
i = Party_P1
c = in IPV4 239.192.50.50
a = X_c: NSAP
a = sendonly
a = X_listening_to:    P3, P4, P5
```

Again, the conference can start pretty much the same way as before, with each party being added one by one.

For the first pass, this is the approach we are taking. Each party would indicate in the SDP the parties it is interested in listening to by appending a new line in the SDP.

Implementation Details

The software for implementing medium conference calls is divided into following sub-modules:

Sip UA: This module implements the SIP functionality. It is responsible for interaction with bandwidth manager 16 to request and allocate required bandwidth for the media streams.

Audio/Video/data subsystem: This subsystem is responsible for generating audio, video and data streams for transmission across the network to other network nodes part of a conference. This subsystem also plays back the audio, video and data streams received from other nodes.

Network modules: This module programs the network sockets for sending and receiving media packets from/to a conference peer.

How is a small conference converted to medium conference? How is a medium conference started?

As mentioned earlier, a small conference with four parties is converted into a medium conference call when fifth party is added. A conference call may also be started as a medium conference call.

Approach 1

In this approach, there is no basic difference between a small conference and a medium conference, in so far, as the protocol mechanisms are concerned.

In this approach, each party sends its transmit information for audio/video and LR video to all other parties. However, any party does not transmit the LR video stream, till that party receives indication that some other party has started viewing its stream. In this method, the decision to change the layout from small conference to medium conference is entirely up to the individual party.

Let us understand how this approach would work with following example. In this example, P1 initiates the conference call by adding P2, P3, P3 and P5 into the conference call.

1. P1 starts the conference by inviting Host into the conference. It sends an INVITE to Host with information shown in table 6a.

TABLE 6a

| Party | Audio Stream | Video Stream | LR Video Stream |
|---|---|---|---|
| 1 | Tx = On, Rx From = <empty> | Tx = On, Rx From = <empty>> | Tx = On, Rx From = <empty> |

2. P1 Refers P2 and P3 to Host to add them into this conference.
3. Host sends the INVITE with SDP containing stream information of P1 to P2.
4. P2 observes that P1 is the only party on the call. It sees that the number of parties is less than 4, and hence it requests to receive video/audio from P1. But it does not send a request to receive P1's LR video stream.

The table of SDP now looks as shown in Table 6b.

TABLE 6b

| Party | Audio Stream | Video Stream | LR Video Stream |
|---|---|---|---|
| P1 | Tx = On, Rx From = <empty> | Tx = On, Rx From = <empty>> | Tx = On, Rx From = <empty> |
| P2 | Tx = On, Rx From = P1 | Tx = On, Rx From = P1 | Tx = On, Rx From = <empty> |

5. Host sends an INVITE to P3 with table 6b as SDP.
6. P3 sees there are three parties [including itself] in the conference. Thus it decides to not receive LR video stream from P1 and P2. It requests only video and audio from P1 and P2. It also includes its transmit information in the SDP.

The table of SDP now looks as shown in table 6c.

TABLE 6c

| Party | Audio Stream | Video Stream | LR Video Stream |
|---|---|---|---|
| P1 | Tx = On, Rx From = <empty> | Tx = On, Rx From = <empty>> | Tx = On, Rx From = <empty> |
| P2 | Tx = On, Rx From = P1 | Tx = On, Rx From = P1 | Tx = On, Rx From = <empty> |
| P3 | Tx = On, Rx From = P1, P2 | Tx = On, Rx From = P1, P2 | Tx = On, Rx From = <empty> |

7. Host sends table 6c to P1 and P2. P1 notices that P2 and P3 have joined the call. It then sends updates the table 6c to table 6d, and sends it to Host. The table 6d indicates that P1 wants to receive audio/video but no LR video from P2 and P3. Also P2 sees that P3 has joined the call since it joined the call, it updates table 6c to 6e, and sends it to Host.

TABLE 6d

| Party | Audio Stream | Video Stream | LR Video Stream |
|---|---|---|---|
| P1 | Tx = On, Rx From = P2, P3 | Tx = On, Rx From = P2, P3 | Tx = On, Rx From = <empty> |
| P2 | Tx = On, Rx From = P1 | Tx = On, Rx From = P1 | Tx = On, Rx From = <empty> |
| P3 | Tx = On, Rx From = P1, P2 | Tx = On, Rx From = P1, P2 | Tx = On, Rx From = <empty> |

TABLE 6e

| Party | Audio Stream | Video Stream | LR Video Stream |
|---|---|---|---|
| P1 | Tx = On, Rx From = <empty> | Tx = On, Rx From = <empty> | Tx = On, Rx From = <empty> |
| P2 | Tx = On, Rx From = P1, P2 | Tx = On, Rx From = P1, P2 | Tx = On, Rx From = <empty> |
| P3 | Tx = On, Rx From = P1, P2 | Tx = On, Rx From = P1, P2 | Tx = On, Rx From = <empty> |

8. Host merges table 6d and 6e and constructs table 6f. The table 6f is then sent to all the parties.

TABLE 6f

| Party | Audio Stream | Video Stream | LR Video Stream |
|---|---|---|---|
| P1 | Tx = On, Rx From = P2, P3 | Tx = On, Rx From = P2, P3 | Tx = On, Rx From = <empty> |
| P2 | Tx = On, Rx From = P1, P2 | Tx = On, Rx From = P1, P3 | Tx = On, Rx From = <empty> |
| P3 | Tx = On, Rx From = P1, P2 | Tx = On, Rx From = P1, P2 | Tx = On, Rx From = <empty> |

9. Similarly when P4 is added the table looks as in table 6g.

TABLE 6g

| Party | Audio Stream | Video Stream | LR Video Stream |
|---|---|---|---|
| P1 | Tx = On, Rx From = P2, P3, P4 | Tx = On, Rx From = P2, P3, P4 | Tx = On, Rx From = <empty> |
| P2 | Tx = On, Rx From = P1, P2, P4 | Tx = On, Rx From = P1, P3, P4 | Tx = On, Rx From = <empty> |
| P3 | Tx = On, Rx From = P1, P2, P4 | Tx = On, Rx From = P1, P2, P4 | Tx = On, Rx From = <empty> |
| P4 | Tx = On, Rx From = P1, P2, P3 | Tx = On, Rx From = P1, P2, P3 | Tx = On, Rx From = <empty> |

10. When P5 is added to this conference, the host sends table 6g to P5. And it sees there 5 parties in the call and it can flip to the medium scale conference mode. It does that. And now it indicates to parties P1 to P4 that it wants to receive their thumbnail videos and audio streams. And it also indicates to parties P1 to p3 that it wants to receive their big videos too. It does this by modifying table 6g to 6h. It should be noted that the decision taken by P5 is independent of decision of P1 through P4. In fact, P5 could have chosen to not receive thumbnail from P1 through P4 and instead requested to receive large video from all of the parties P1 through P4.

TABLE 6h

| Party | Audio Stream | Video Stream | LR Video Stream |
|---|---|---|---|
| P1 | Tx = On, Rx From = P2, P3, P4 | Tx = On, Rx From = P2, P3, P4 | Tx = On, Rx From = <empty> |
| P2 | Tx = On, Rx From = P1, P2, P4 | Tx = On, Rx From = P1, P3, P4 | Tx = On, Rx From = <empty> |
| P3 | Tx = On, Rx From = P1, P2, P4 | Tx = On, Rx From = P1, P2, P4 | Tx = On, Rx From = <empty> |
| P4 | Tx = On, Rx From = P1, P2, P3 | Tx = On, Rx From = P1, P2, P3 | Tx = On, Rx From = <empty> |
| P5 | Tx = On, Rx From = P1, P2, P3, P4 | Tx = On, Rx From = P1, P2, P3 | Tx = On, Rx From = P1, P2, P3, P4 |

11. Host sends table 6h to all the parties.

TABLE 6h

| Party | Audio Stream | Video Stream | LR Video Stream |
|---|---|---|---|
| P1 | Tx = On, Rx From = P2, P3, P4 | Tx = On, Rx From = P2, P3, P4 | Tx = On, Rx From = <empty> |
| P2 | Tx = On, Rx From = P1, P2, P4 | Tx = On, Rx From = P1, P3, P4 | Tx = On, Rx From = <empty> |
| P3 | Tx = On, Rx From = P1, P2, P4 | Tx = On, Rx From = P1, P2, P4 | Tx = On, Rx From = <empty> |
| P4 | Tx = On, Rx From = P1, P2, P3 | Tx = On, Rx From = P1, P2, P3 | Tx = On, Rx From = <empty> |
| P5 | Tx = On, Rx From = P1, P2, P3, P4 | Tx = On, Rx From = P1, P2, P3 | Tx = On, Rx From = P1, P2, P3, P4 |

12. When P1 through P4 get the updates table they can see that P5 has joined the call and that the number of parties has now gone above 5, and they also decide to move to medium conference model. Let us say P1 decides to view P2, P3 and P4 in big window. P2 decides to view P1, P2, and P4 on big window. And P3 decides to view P1, P2, and P4 on big video. And P4 decides to view P1, P2 and P3 as big parties. Then the resultant stream information table looks as table 6i.

TABLE 6i

| Party | Audio Stream | Video Stream | LR Video Stream |
|---|---|---|---|
| P1 | Tx = On, Rx From = P2, P3, P4, P5 | Tx = On, Rx From = P2, P3, P4 | Tx = On, Rx From = P2, P3, P4, P5 |
| P2 | Tx = On, Rx From = P1, P2, P4, P5 | Tx = On, Rx From = P1, P3, P4 | Tx = On, Rx From = P1, P3, P4, P5 |
| P3 | Tx = On, Rx From = P1, P2, P4, P5 | Tx = On, Rx From = P1, P2, P4 | Tx = On, Rx From = P1, P2, P4, P5 |
| P4 | Tx = On, Rx From = P1, P2, P3, P5 | Tx = On, Rx From = P1, P2, P3 | Tx = On, Rx From = P1, P2, P3, P5 |
| P5 | Tx = On, Rx From = P1, P2, P3, P4 | Tx = On, Rx From = P1, P2, P3 | Tx = On, Rx From = P1, P2, P3, P4 |

Note 1.
From table 6i, it is easy to see that the Audio/LRVideo streams receive party information is the same.
Note 2.
It should be noted that although, each party can take the decision to change from a small conference to medium conference independently. It is important that all the parties take this decision at the same time. This is because currently, we cannot support transmission of multiple video formats. And the video format for small conference and medium conference is different.

Approach 2

In this approach, the decision to change the conference from small to large/medium is dictated by the host. Let us consider the example, in Approach 1. The steps up to step 9 are essentially the same. However, when P5 is added, the Host sees that the conference now has 5 participants on the call. Thus it can insert a field in the table [of stream information] to indicate that the conference is now a medium conference. This attribute is used by the individual parties as a hint that they should display the conference in the medium conference format.

Approach 3

Approach 3 is a combination of 1 and 2. Thus a party could independently decide to change its view format from small to medium. Or it could do so when instructed by the host. In addition, a party could request the host to include this attribute in the table [of stream info] when the conference call is being started.

This decision supports and implements approach 3.

Bandwidth manager 16 controls the Tx bandwidth used by any stream across a link managed by it. The functionality, such as the software, for the bandwidth manager 16 (BWM) can be in the SGP or in the VHost.

When a BWM relays an INVITE going across a slow link, it can indicate to the called ViPr the bandwidth it has reserved for its various streams. It also indicates the bandwidth at which the other streams originated by other users are transmitting. A value of zero in the bandwidth, means that bandwidth manager 16 is not allowing that particular stream across "that" link.

The following section discusses the flow of messages for p2p calls and conference calls, across a bandwidth manager 16.

P2P Call

Consider ViPr A in net N1 [N1A] calling ViPr B, in net N2 [N2B], where ViPr N2 is across a link N1-N2 managed by bandwidth manager 16.

A includes following as offer in the INVITE [SDP]
note 1: Through this document only relevant attribute lines within an m block are shown.
note 2: The attribute lines shown in this document are logical and do not define or follow the SDP syntax]

TABLE 1 m = Audio
b = 64
. . . other information for audio . . .
m = video
b = 4000
. . . other information for audio . . .

The BWM could notice that in N1A to N2B direction it has 3.5 Mbps available and in the N2B to N1A direction it has only 3.0 Mbps available. And accordingly it changes the video b line to 3000 in the SDP shown in Table 1. The modified SDP is as in Table 2. The b=3000 line indicates the maximum value at which N2B could transmit its audio stream.

TABLE 2 m = Audio
b = 64
. . . other information for audio . . .
m = video
b = 3000
. . . other information for audio . . .

When N2B gets this message it interprets it as:
  N1A is allowed to transmit audio at 64 Kbps and video at 3000 kbps.
  N2B [itself] is constrained to pick a value <=64 Kbps for Tx audio and <=3000 kbps for Tx video.
Note: A will transmit streams at whatever value B picks.

Small Conference

BWM links networks N1 and N2. ViPrs N1A, N1B, and N1C [all in Net1] are in a conference. N1C refers N2P into the conference. VHost sends the INVITE to N2P, which is routed to BWM. The content of the INVITE are as follows:

TABLE 3

| a = X_GUID: CONFCALL_A |
| --- |
| m = Audio |
| i = VHost |
| b = 0 |
| m = Video |
| i = VHost |
| b = 0 |
| m = Audio |
| i = N1A |
| b = 64 |
| m = Video |
| i = N1A |
| b = 3000 |
| m = Audio |
| i = N1B |
| b = 64 |
| m = Video |
| i = N1B |
| b = 3000 |
| m = Audio |
| i = N1C |
| b = 64 |
| m = Video |
| i = N1C |
| b = 3000 |

Where, b=3000 means that the corresponding transmitter is set to generate streams at 3000 Kbps. A=X-GUID line identifies a conference call uniquely.

BWM gets the INVITE and sees that it is not part of the conference. It sees that N2P is being invited, which is across link N1-N2. It calculates *using some decision process* that the audio bandwidth for N1A, N1B and N1C can be supported however, the max Video Tx bandwidth it can support from N1 to N2 is 6 Mbps [say] it divides this into 2 Mbps each for N1A, N1B and N1C. Also it can determine and reserve a maximum bandwidth for audio and video transmitter of N2P. [In N2 to N1 direction]. N2P can then choose a suitable bandwidth up to maximum reserved by BWM.

The INVITE Forwarded from BWM to N2P then Looks as Follows:

TABLE 4

| a = X_GUID: CONFCALL_A |
| --- |
| m = Audio |
| i = VHost |
| b = 64 |
| m = Video |
| i = VHost |
| b = 4000 |
| m = Audio |
| i = N1A |
| b = 64 |
| m = Video |
| i = N1A |
| b = 2000 |
| m = Audio |
| i = N1B |
| b = 64 |
| m = Video |
| i = N1B |
| b = 2000 |
| m = Audio |
| i = N1C |
| b = 64 |
| m = Video |
| i = N1C |
| b = 2000 |

The b lines in the VHost media streams are used as placeholders for indicating the bandwidth available for a given stream to N2P. These placeholders are valid for every time a stream is activated. That is if a party turns the camera off and turns it back on again, by sending an INVITE to VHost it must wait to look at values received in VHost's b streams to derive the bandwidth at which it is allowed to transmit. That is, every bandwidth negotiation takes an INVITE-OK pair of messages to complete.

When N2P gets this message, it knows the bandwidth at which A, B and C are transmitting and also has an indication of the maximum bandwidth at which it is allowed to transmit.

Finally, when N2P replies following cases are possible:

Case 1

N2P is an audio/video participant. N2P picks a value of 64 K for audio and 2000 kbps for video. N2P sends following OK to BWM.

TABLE 5

| a = X_GUID: CONFCALL_A |
| --- |
| m = Audio |
| i = VHost |
| b = 64 |
| m = Video |
| i = VHost |
| b = 4000 |
| m = Audio |
| i = N1A |
| b = 64 |
| m = Video |
| i = N1A |
| b = 2000 |
| m = Audio |
| i = N1B |
| b = 64 |
| m = Video |
| i = N1B |
| b = 2000 |
| m = Audio |
| i = N1C |
| b = 64 |
| m = Video |
| i = N1C |
| b = 2000 |
| m = Audio |
| i = N2P |
| b = 64 |
| m = Video |
| i = N2P |
| b = 2000 |

When BWM gets this message, it sees that N2P does do video but at 2000 Kbps where as it had reserved 4000 kbps for this stream. So it frees up the 1000 extra bandwidth allocated for video.

It then passes the following OK to VHost. Please note that the BWM is required to copy all the media lines for in OK received from N2P into the OK sent to VHost.

TABLE 6

| a = X_GUID: CONFCALL_A |
| --- |
| m = Audio |
| i = VHost |
| b = 64 |
| m = Video |
| i = VHost |
| b = 4000 |
| m = Audio |
| i = N1A |
| b = 64 |

TABLE 6-continued

| a = X_GUID: CONFCALL_A |
|---|
| m = Video |
| i = N1A |
| b = 2000 |
| m = Audio |
| i = N1B |
| b = 64 |
| m = Video |
| i = N1B |
| b = 2000 |
| m = Audio |
| i = N1C |
| b = 64 |
| m = Video |
| i = N1C |
| b = 2000 |
| m = Audio |
| i = N2P |
| b = 64 |
| m = Video |
| i = N2P |
| b = 2000 |

VHost relays this message to all the parties. Those parties whose transmit bandwidth has changed would change their video bit rate. All parties also take all the normal medium conference actions that are required on getting a message from VHost.

Case 2

N2P does only audio. In that case all the video bandwidth across the link is freed up [for both the direction]. Thus 6 Mbps reserved for Video in N1 to N2 direction [From N1A, N1B, and N1C] is freed up. The OK sent by N2P to BWM in this case looks as follows:

TABLE 7

| a = X_GUID: CONFCALL_A |
|---|
| m = Audio |
| i = VHost |
| b = 64 |
| m = Video |
| i = VHost |
| b = 4000 |
| m = Audio |
| i = N1A |
| b = 64 |
| m = Video |
| i = N1A |
| b = 2000 |
| m = Audio |
| i = N1B |
| b = 64 |
| m = Video |
| i = N1B |
| b = 2000 |
| m = Audio |
| i = N1C |
| b = 64 |
| m = Video |
| i = N1C |
| b = 2000 |
| m = Audio |
| i = N2P |
| b = 64 |
| m = Video [INACTIVE] |
| i = N2P |
| b = 0 |

In this case, when BWM gets this message, it sees that there is no need to lower the transmit bandwidth of N1A, N2B, and N2C. Since N2P does not need to receive video. Please note this in accordance with ViPr policy of providing and preserving the best video/audio experience.

Accordingly, VHost passes the following OK to VHost.

TABLE 8

| a = X_GUID: CONFCALL_A |
|---|
| m = Audio |
| i = VHost |
| b = 64 |
| m = Video |
| i = VHost |
| b = 4000 |
| m = Audio |
| i = N1A |
| b = 64 |
| m = Video |
| i = N1A |
| b = 3000 |
| m = Audio |
| i = N1B |
| b = 64 |
| m = Video |
| i = N1B |
| b = 3000 |
| m = Audio |
| i = N1C |
| b = 64 |
| m = Video |
| i = N1C |
| b = 3000 |
| m = Audio |
| i = N2P |
| b = 64 |
| m = Video [INACTIVE] |
| i = N2P |
| b = 3000 |

VHost relays this message to all the parties. Those parties whose transmit bandwidth has changed would change their video bit rate. All parties also take all the normal medium conference actions that are required on getting a message from VHost.

Medium Conference

Net N1 and N2, joined together by a link managed by BWM. N1A, N1B, N1C, N1D, N1E are ViPrs in Network N1. N2P is a ViPr in network N2. Also N1A, N1B, N1C, N1D and N1E are already in a medium conference call. One of these parties joins N2P into the call]

The VHost sends the following INVITE, which is routed, to BWM.

TABLE 9

| a = X_GUID: CONFCALL_A |
|---|
| m = Audio |
| a = X-Party_ID: 0 |
| i = VHost |
| b = 0 |
| m = Video |
| i = VHost |
| b = 0 |
| a = x-party_list[1, 2, 3] |
| m = LR-Video |
| i = VHost |
| b = 0 |
| m = Audio |
| i = N1A |
| a = X-Party_ID: 1 |
| b = 64 |
| m = Video |
| i = N1A |
| b = 3000 |
| a = x-party_list = [2, 3, 4] |

TABLE 9-continued a = X_GUID: CONFCALL_A

```
m = LR-Video
i = N1A
b = 350
m = Audio
a = X-Party_ID: 2
i = N1B
b = 64
m = Video
i = N1B
b = 3000
a = x-party_list[1, 3, 4]
m = LR-Video
i = N1B
b = 350
m = Audio
a = X-Party_ID: 3
i = N1C
b = 64
m = Video
i = N1C
b = 3000
a = x-party_list[1, 2, 4]
m = LR-Video
i = N1C
b = 350
m = Audio
a = X-Party_ID: 4
i = N1D
b = 64
m = Video
i = N1D
b = 3000
a = x-party_list[1, 2, 3]
m = LR-Video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
```

In this invite, PartyId associated with m=audio line of each party is the party ID allocated by VHost to identify each party uniquely within this conference. All the other parties refer to a party using its party ID.

The a=x-party_list line associated with a stream refers to the list of parties from which "this" party is interested in receiving the corresponding stream. When no explicit list is given "this" party is interested in receiving the corresponding stream from all other parties.

Also note that there is a x-party-list line associated with VHost's big video media line. This is sent as an indication to BWM and target ViPr [N2P] that these parties must be displayed big when N2P accepts the conference call.

For example the media streams of A indicate following:

It is interested in receiving big video from parties 2[N1B], 3[N1C} and 4[N1D].

It is interested in receiving audio/lrvideo from all the parties.

The BWM sends gets this invite and modifies the bandwidth associated with each of the streams as per the bandwidth associated across the link. Also it knows that the N2P cannot be chosen to be in anybody's big video to begin with.

Accordingly, following will go into BWM decision process:

Audio streams get higher priority than LR video which in turn gets higher priority than big video.

Big video transmitted from N1A, N1B, and N1C will be received by N2P.

All the audio/lrvideo [10 in nu] streams will be received by N2P.

Following table gives the bandwidth requirements in upstream and downstream direction.

| Stream | Up [N1 to N2] | Down [N2 to N1] |
|---|---|---|
| Audio Streams | 5 * 64 = 320 | 1 * 64 = 64 |
| LrVideo Stream | 5 * 350 = 1750 | 1 * 350 = 350 |
| Video | 3 * 2000 = 6000 | 0 * 2000 = 0 |
| Total | 8070 kbps | 414 kbps |

It will take these into account while modifying tx bandwidth associated With each stream going from N1 to N2.

Also since it knows that N2P is constrained to view N1A, N1B and N1C it can modify their Tx bandwidth if required. Also it can reserve the bandwidth for N2P's audio and LRVideo transmitter. Since no one is tuned to Big Video at this time.

The BWM would then forward following INVITE to N2P.

TABLE 10

```
m = Audio
a = X-Party_ID: 0
i = VHost
b = 64
m = Video
i = VHost
b = 0
m = LR-Video
i = VHost
b = 350
m = Audio
i = N1A
a = X-Party_ID: 1
b = 64
m = Video
i = N1A
b = 2000
a = x-party_list = [2, 3, 4]
m = LR-Video
i = N1A
b = 350
m = Audio
a = X-Party_ID: 2
i = N1B
b = 64
m = Video
i = N1B
b = 2000
a = x-party_list[1, 3, 4]
m = LR-Video
i = N1B
b = 350
m = Audio
a = X-Party_ID: 3
i = N1C
b = 64
m = Video
i = N1C
b = 2000
a = x-party_list[1, 2, 4]
m = LR-Video
i = N1C
b = 350
m = Audio
```

TABLE 10-continued

```
a = X-Party_ID: 4
i = N1D
b = 64
m = Video
i = N1D
b = 3000
a = x-party_list[1, 2, 3]
m = LR-Video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
``` where small conference N2P is informed that no bandwidth is allocated for its big video transmit stream. And that 64 and 350 kbits are reserved for audio/lrvideo.

Again, like small conference N2P could reply back with no video in which case, the bandwidth allocated for its lrvideo would be released and the bandwidth for first three parties [N1A, N1B, N1C] is restored to its original value. However, in more likely case, the N2P would accept the call [audio/video] and send following OK to BWM.

TABLE 11

```
m = Audio
a = X-Party_TD: 0
i = VHost
b = 64
m = Video
i = VHost
b = 0
m = LR-Video
i = VHost
b = 350
m = Audio
i = N1A
a = X-Party_ID: 1
b = 64
m = Video
i = N1A
b = 2000
a = x-party_list = [2, 3, 4]
m = LR-Video
i = N1A
b = 350
m = Audio
a = X-Party_ID: 2
i = N1B
b = 64
m = Video
i = N1B
b = 2000
a = x-party_list[1, 3, 4]
m = LR-Video
i = N1B
b = 350
m = Audio
a = X-Party_ID: 3
i = N1C
b = 64
m = Video
i = N1C
b = 2000
a = x-party_list[1, 2, 4]
```

TABLE 11-continued

```
m = LR-Video
i = N1C
b = 350
m = Audio
a = X-Party_ID: 4
i = N1D
b = 64
m = Video
i = N1D
b = 3000
a = x-party_list[1, 2, 3]
m = LR-Video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
m = Audio
a = X-Party_ID: 6
i = N2P
b = 64
m = Video
i = N2P
b = 3000
a = x-party_list[1, 2, 3]
m = LR-Video
i = N2P
b = 350
```

BWM would then forward this OK to VHost [with changed Bandwidth for A, B and C's big Video]. VHost on getting this message would forward this message to all the parties. All the parties who see their transmit bandwidth has changed would reconfigure their video bit rate. In addition all parties would take all the required normal conference actions.

Next few sections we take a few cases of parties trying to change their big window participants.

Case 1

Party N2P decides to view N1D instead of N1C. To indicate this, the party N2P sends a [re]INVITE to BWM with following content.

TABLE 12

```
m = Audio
a = X-Party_ID: 0
i = VHost
b = 64
m = Video
i = VHost
b = 0
m = LR-Video
i = VHost
b = 350
m = Audio
i = N1A
a = X-Party_ID: 1
b = 64
m = Video
i = N1A
b = 2000
a = x-party_list = [2, 3, 4]
m = LR-Video
i = N1A
b = 350
m = Audio
```

TABLE 12-continued

```
a = X-Party_ID: 2
i = N1B
b = 64
m = Video
i = N1B
b = 2000
a = x-party_list[1, 3, 4]
m = LR-Video
i = N1B
b = 350
m = Audio
a = X-Party_ID: 3
i = N1C
b = 64
m = Video
i = N1C
b = 2000
a = x-party_list[1, 2, 4]
m = LR-Video
i = N1C
b = 350
m = Audio
a = X-Party_ID: 4
i = N1D
b = 64
m = Video
i = N1D
b = 3000
a = x-party_list[1, 2, 3]
m = LR-Video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
m = Audio
a = X-Party_ID: 6
i = N2P
b = 64
m = Video
i = N2P
b = 3000
a = x-party_list[1, 2, 4 ]
m = LR-Video
i = N2P
b = 350
```

When BWM gets this message it observes that N2P is not interested in viewing C's big video. The BWM checks if there is another participant in the conference who is on net N2 and is viewing C's big video, if not it frees up the bandwidth associated with C's big video in N1 to N2 direction.

BWM also observes that N2P wishes to view N1D. After consulting the available link[N1-N2] bandwidth, the current bit rate at which N1D is transmitting big video, plus any other factors, the BWM can take either of following decisions:

Case a: BWM can support the bit rate at which N1D is transmitting big video.

Case b: BWM cannot support the bit rate at which N1D is transmitting big video, but can support a lower value.

Case c: BWM cannot support big video from N1D even at a lower bit rate without lowering the bit rate associated with other big videos going from N1 to N2, for this conference. For example, in this N1A and N1B.

Case d: BWM cannot support video from N1D.

Notes
1. Although cases b and c are different in terms of BWM decision process. These are really policy decisions, and the protocol behavior [message flow] would be the same in both the cases.

For the first release of medium conference case 'b' only will be considered by BWM. That is we will not modify the bandwidth associated with the existing big video connection to accommodate a new big video request. However, this is a policy decision and the medium scale protocol mechanism [including interaction with BWM] should not change as a result of that.

2. In case a BWM just passes the re[INVITE] received from N2P to VHost. So we don't discuss that case.

Case c and Case d are Discussed Below:

Case 1c

In this case, the bandwidth manager 16 decides it must lower the Tx bandwidth of N1A and N1B big video stream to support Tx from N2D. The values for Tx bandwidth for N1A, N1B and N1C it chooses are (1500, 1500, 1500 kbps) respectively.

Accordingly, it modifies the INVITE and it looks as follows:

TABLE 13

```
m = Audio
a = X-Party_ID: 0
i = VHost
b = 64
m = Video
i = VHost
b = 0
m = LR-Video
i = VHost
b = 350
m = Audio
i = N1A
a = X-Party_ID: 1
b = 64
m = Video
i = N1A
b = 1500
a = x-party_list = [2, 3, 4]
m = LR-Video
i = N1A
b = 350
m = Audio
a = X-Party_ID: 2
i = N1B
b = 64
m = Video
i = N1B
b = 1500
a = x-party_list[1, 3, 4]
m = LR-Video
i = N1B
b = 350
m = Audio
a = X-Party_ID: 3
i = N1C
b = 64
m = Video
i = N1C
b = 2000
a = x-party_list[1, 2, 4]
m = LR-Video
i = N1C
b = 350
m = Audio
a = X-Party_ID: 4
i = N1D
b = 64
```

TABLE 13-continued

```
m = Video
i = N1D
b = 1500
a = x-party_list[1, 2, 3]
m = LR-Video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
m = Audio
a = X-Party_ID: 6
i = N2P
b = 64
m = Video
i = N2P
b = 3000
a = x-party_list[1, 2, 4]
m = LR-Video
i = N2P
b = 350
```

VHost gets this re-INVITE and sends the information in INVITE to all the parties. All other parties on getting the re-invite take appropriate action. In this case, N1A, N1B and N1D modify their big video bit rate. N1C removes N2P from its list of listeners. And N1D adds the N2P to its list of receivers.

The VHost also sends an OK back to BWM to be relayed to N2P. BWM must copy all the media streams from OK received from VHost into OK sent to N2P.

Case 1d

In this case, the bandwidth manager 16 decides it cannot support big video from N1D to N2P. In this case, BWM modifies the INVITE to indicate to VHost, that N2P is asking for video from N1D, but is being denied this request because of lack of bandwidth. It does so by marking D as –ve in the party list. Thus x-party-list sent by N2P for big video is modified from {1,2,4} to {1,2,–4}. The bandwidth field associated with N1D big vide is left untouched. The re[INVITE] looks as follows:

TABLE 14

```
m = Audio
a = X-Party_ID: 0
i = VHost
b = 64
m = Video
i = VHost
b = 0
m = LR-Video
i = VHost
b = 350
m = Audio
i = N1A
a = X-Party_ID: 1
b = 64
m = Video
i = N1A
b = 1500
a = x-party_List = [2, 3, 4]
m = LR-Video
i = N1A
```

TABLE 14-continued

```
b = 350
m = Audio
a = X-Party_ID: 2
i = N1B
b = 64
m = Video
i = N1B
b = 1500
a = x-party_list[1, 3, 4]
m = LR-Video
i = N1B
b = 350
m = Audio
a = X-Party_ID: 3
i = N1C
b = 64
m = Video
i = N1C
b = 2000
a = x-party_list[1, 2, 4]
m = LR-Video
i = N1C
b = 350
m = Audio
a = X-Party_ID: 4
i = N1D
b = 64
m = Video
i = N1D
b = 1500
a = x-party_list[1, 2, 3]
m = LR-video
i = N1D
b = 350
m = Audio
a = X-Party_ID: 5
i = N1E
b = 64
m = Video
i = N1E
b = 3000
a = x-party_list[1, 2, 3]
m = LR-Video
i = N1E
b = 350
m = Audio
a = X-Party_ID: 6
i = N2P
b = 64
m = Video
i = N2P
b = 3000
a = x-party_list[1, 2, –4]
m = LR-Video
i = N2P
b = 350
```

The VHost thus knows that N2P is asking for video from N1D, and is being denied by BWM. VHost reflects the information in table 14 back to N2P in OK. This OK is relayed by BWM to N2P. N2P must copy all the media stream information present in the OK received from VHost to N2P.

When N2P sees this SDP it recognizes that its request has failed. And can if required try later.

As an additional note, VHost resets the bandwidths back to maximum value under any of the following conditions:

A new party is added

A party is deleted.

Also, whenever a party changes its stream state, that is, it goes from inactive to active or active to inactive, it resets its bandwidth to maximum, so that streams coming off hold can go back to as maximum a value as possible.

1. Ability to enable each participant to choose to receive any stream it wishes from a set of available streams.

Let us say that there are five participants in a conference call, P1 through P5. Let also each of these participants be capable of generating N different types of streams Type-1 to Type-n. Where N could be any number greater 1. If P1 desires to receive Stream of type-1 only from P2 and P3, then it could set the a=X-rx-party-list feature to indicate this.

2. Ability to control the receiver at each participant.

Let us say that there are five participants in a conference call, P1 through P5. Let also each of these participants be capable of generating N different types of streams Type-1 to Type-n. Where N could be any number greater 1. Further let us say that P1 wishes to receive stream of Type-1 from P2 and P3. Also let us assume that for some reasons [which could be as diverse as a security policy to lack of bandwidth] P1 must not be allowed to receive this stream.

In that case, the a=x-rxparty-list feature could again be used to indicate that P1 is not allowed to receive stream from P2.

3. Ability to indicate special stream attributes.

Each stream, which is part of a conference, could be tagged with additional attributes to indicate any special handling. In particular, the rx-party-list can be used to indicate whether a stream is:
  a. Moderator recommended
     Moderator mandatory
  If a stream is made moderator mandatory than each participant is required to receive that stream.
  These attributes could be added either by VHost, bandwidth manager 16 or a SIP proxy in the network.

4. Ability to control the bandwidth rate each participant may use for transmitting any given stream.

As per the protocol each participant indicates what is the bandwidth at which it may wish to transmit a stream, the bandwidth management protocol function, than decides based on policy how much bandwidth may be allowed to each participant [actually to each stream from a participant].

5. Ability to increase the quality of a conference call, by renegotiating the bandwidth whenever an significant change happens to a conference.

When any significant change event occurs, the bandwidth protocol function tries to maximize the bandwidth available for each stream. The significant change events can be of following types:
  A stream is added or deleted
  A stream is enabled or disabled
  A party is added or deleted
  Administrative policy based event Bandwidth Manager 16 Policy Schemes This description is by no accounts complete, as the bandwidth manager 16 can be configured in a variety of ways. Bandwidth manager 16 policy algorithm is fairly flexible. And can be tailored by end users to effectively construct a whole variety of policies. By default it supports following policy models.

1. Audio Only. When a call is made from network (net-1) to network (net-2), across a link (l1) which is managed by a bandwidth manager 16, then the call is always dropped to be audio only, regardless of whether each participant can support or desired video or not.

2. Lowbandwidth model. When a call is made from network (net-1) to network (net-2), across a link (l1) which is managed by a bandwidth manager 16, then the bandwidth for all the video streams in the call is dropped to 1 Mbps. This value is configurable.

3. Mediumbandwidthmodel. When a call is made from network (net-1) to network (net-2), across a link (l1) which is managed by a bandwidth manager 16, then the bandwidth for all the video streams in the call is dropped to 2 Mbps. This model is similar to 2.

4. Step bandwidth model. In this model when a conference call is made across a link managed by bandwidth manager 16, the following constraints are taken into account while deciding how much bandwidth should be allocated to each stream
  a. Currently available bandwidth. If more than 50% of link bandwidth is available than each stream is given as much bandwidth as they request.
  b. If the currently available bandwidths is less than 50% but more than 25% than each stream is given 50% of value that they ask for.
  c. If the currently available bandwidth is less than 25% but more than 5% than each participant is given only ¼th of the bandwidth they requested.
  d. If the currently available bandwidth is less than 5% than only audio streams are allowed.

5. Priority based step model. In this model there is a priority associated with each user. Thus higher priority users may be given more bandwidth for receiving and transmitting streams.

Background/Nomenclature:

Vx: ViPr where user 'X' is logged in. Only one user can be logged at a given ViPr at one time. A ViPr conference can be of two types: Type A: Standard mode. Each participant transmits two streams [audio, video] to all other participant in the call. Each participant receives audio and video streams from all other parties. Type B: Enhanced mode, Where each participant can transmit three streams [Audio, Video and Thumbnail Video] to all other participants. In this mode, all participants receive [Audio, Thumbnail] from all other participants. Each participant chooses to receive Video from a subset of participants on the conference call.

Claim Points:

Related to Enhanced Conferencing Mode

1. Protocol extensions are generalized to allow selectively receiving any subset of streams from all the streams available in the conference. For example, If Va, Vb, Vc, Vd, and Ve are present in a conference. Than a participant Va could choose to receive following streams:
From Vb: Only Video
From Vc: Only Audio
From Vd: Only Thumbnail Video
From Ve: Video, Audio and Thumbnail Related to Bandwidth Management Mode 2. Protocol extension to provide following bandwidth control features:
  control the transmit bandwidth associated bandwidth of any stream being transmitted by a ViPr.
  To indicate to a ViPr that it cannot receive streams from certain participants in a call because there is no bandwidth available in the network.
This control is available for both standard conference as well as enhanced conferences. The bandwidth control for p2p calls is covered by current standards.
For example, in a conference with participants Va, Vb, Vc, Vd, Ve. Where Va-Vd are on the same LAN A and Ve is in a LAN B across a WAN with a limited bandwidth. Then any of following can be achieved using bandwidth management control:

Any or all or any combination of participants Va, Vb, Vc, Vd could be asked to lower their Video bandwidths to allow sum of Va+Vb+Vc+Vd to be within bandwidth available between LAN A and LAN B, across WAN.

Ve could be informed that it can not receive or send video because it is across a slow link.

Ve could informed it could receive video only from say 2 participants rather than all the participants.

The protocol also allows for changing bandwidths dynamically during the duration of a conference call.

4. In enhanced conference, with participants Va, Vb, Vc, Vd, and Ve, if no participant is interested in viewing video stream from Va. Than Va does not transmit its video stream. This is in contrast to standard mode, where everyone must transmit and receive video stream. This results in significant bandwidth savings.

Figure 8:
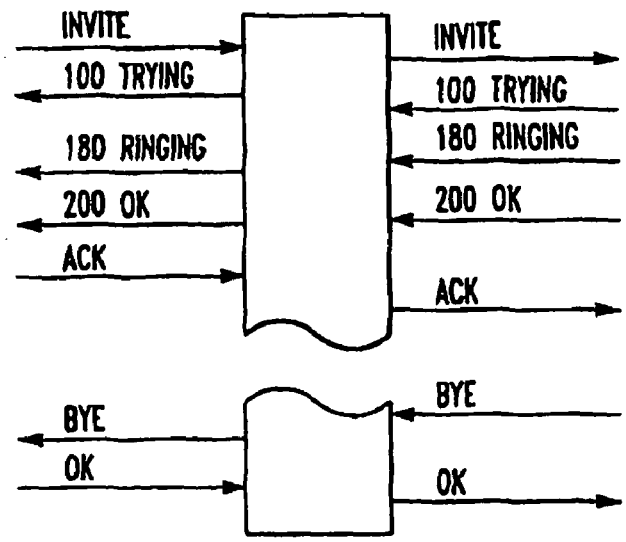
FIG. 8: B2BUA request/response processing.

Referring to FIGS. 8, 9 and 10, an imaging device 30, such as a conventional analog camera 32 provided by Sony with S video, converts the images of a scene from the imaging device 30 to electrical signals which are sent along a wire to a video decoder 34, such as a Philips SAA7114 NTSC/PAL/decoder. The video decoder 34 converts the electrical signals to digital signals and sends them out as a stream of pixels of the scene, such as under BT 656 format. The stream of pixels are sent out from the video decoder 34 and split into a first stream and a second stream identical with the first stream. An encoder 36, preferably an IBM eNV 420 encoder, receives the first stream of pixels, operates on the first stream and produces a data stream in MPEG-2 format. The data stream produced by the video encoder 36 is compressed by about 1/50 the size as compared to the data as it was produced at the camera. The MPEG-2 stream is an encoded digital stream and is not subject to frame buffering before it is subsequently packetized so as to minimize any delay. The encoded MPEG-2 digital stream is packetized using RTP by a Field Programmable Gate Array (FPGA) 38 and software to which the MPEG-2 stream is provided, and transmitted onto a network 40, such as an Ethernet 802.p or ATM at 155 megabits per second, using a network interface 42 through a PLX 9054 PCI interface 44. If desired, a video stream associated with a VCR or a television show, such as CNN or a movie, can be received by the decoder 34 and provided directly to the display controller 52 for display. A decoder controller 46 located in the FPGA 38 and connected to the decoder 34, controls the operation of the decoder 34.

Alternatively, if a digital camera 47 is used, the resulting stream that is produced by the camera is already in a digital format and does not need to be provided to a decoder 34. The digital stream from the digital camera 47, which is in a BT 656 format, is split into the first and second streams directly from the camera, without passing through any video decoder 34.

In another alternative, a fire wire camera 48, such as a 1394 interface fire wire camera 48, can be used to provide a digital signal directly to the FPGA 38. The fire wire camera 48 provides the advantage that if the production of the data stream is to be at any more than a very short distance from the FPGA 38, then the digital signals can be supported over this longer distance by, for instance, cabling, from the fire wire camera 48. The FPGA 38 provides the digital signal from the fire wire camera 48 to the encoder 36 for processing as described above, and also creates a low fame rate stream, as described below.

The second stream is provided to the FPGA 38 where the FPGA 38 and software produce a low frame rate stream, such as a motion JPEG stream, which requires low bandwidth as compared to the first stream. The FPGA 38 and a main controller 50 with software perform encoding, compression and packetization on this low frame rate stream and provide it to the PCI interface 44, which in turn transfers it to the network interface 42 through a network interface card 56 for transmission onto the network 40. The encoded MPEG-2 digital stream and the low frame rate stream are two essentially identical but independent data streams, except the low frame rate data stream is scaled down compared to the MPEG-2 data stream to provide a smaller view of the same scene relative to the MPEG-2 stream and require less resources of the network 40.

On the network 40, each digital stream is carried to a desired receiver videophone 15, or receiver videophones 15 if a conference of more than two parties is involved. The data is routed using SIP. The network interface card 56 of the receive videophone 15 receives the packets associated with first and second data streams and provides the data from the packets and the video stream (first or second) chosen by the main controller to a receive memory. A main controller 50 of the receive videophone 15 with software decodes and expands the chosen received data stream and transfers it to a display controller 52. The display controller 52 displays the recreated images on a VGA digital flat panel display using standard scaling hardware. The user at the receive videophone 15 can choose which stream of the two data streams to view with a touch screen 74, or if desired, chooses both so both large and small images of the scene are displayed, although the display of both streams from the transmitting videophone 15 would normally not happen. A discussion of the protocols for display is discussed below. By having the option to choose either the larger view of the scene or the smaller view of the scene, the user has the ability to allocate the resources of the system 10 so the individuals at the moment who are more important for the viewer to see in a larger, clearer picture, can be chosen; while those which the user still would like to see, but are not as important at that moment, can still be seen.

The display controller 52 causes each distinct video stream, if there is more than one (if a conference call is occurring) to appear side by side on the display 54. The images that are formed side by side on the display 54 are clipped and not scaled down so the dimensions themselves of the objects in the scene are not changed, just the outer ranges on each side of the scene associated with each data stream are removed. If desired, the images from streams associated with smaller images of scenes can be displayed side by side in the lower right corner of the display 54 screen. The display controller 52 provides standard digital video to the LCD controller 72, as shown in FIG. 9. The display controller 52 produced by ATI or Nvidia, is a standard VGA controller. The LCD controller 72 takes the standardized digital video from the display controller 52 and makes the image proper for the particular panel used, such as a Philips for Fujistu panel.

To further enhance the clipping of the image, instead of simply removing portions of the image starting from the outside edge and moving toward the center, the portion of the image which shows no relevant information is clipped. If the person who is talking appears in the left or right side of the image, then it is desired to clip from the left side in if the person is on the right side of the image, or right side in if the person is on the left side of the image, instead of just clipping from each outside edge in, which could cause a portion of the person to be lost. The use of video tracking looks at the image that is formed and analyzes where changes are occurring in the image to identify where a person is in the image. It is assumed that the person will be moving more relative to the other areas of the image, and by identifying the relative movement, the location of the person in the image can be determined. From this video tracking, the clipping can be caused to occur at the edge or edges where there is the least amount of change. Alternatively, or in combination with video tracking, audio tracking can also be used to guide the clipping of the image which occurs. Since the videophone 15 has microphone arrays, standard triangulation techniques based on the different times it takes for a given sound to reach the different elements of the microphone array are used to determine where the person is located relative to the microphone array, and since the location of a microphone array is known relative to the scene that is being imaged, the location of the person in the image is thus known.

The functionalities of the videophone 15 are controlled with a touch screen 74 on the monitor. The touch screen 74, which is a standard glass touchscreen, provides raw signals to the touch screen controller 76. The raw signals are sensed by the ultrasonic waves that are created on the glass when the user touches the glass at a given location, as is well known in the art. The touch screen controller 76 then takes the raw signals and converts them into meaningful information in regard to an X and Y position on the display and passes this information to the main controller 50.

If a television or VCR connection is available, the feed for the television or movie is provided to the decoder 34 where the feed is controlled as any other video signal received by the videophone 15. The television or movie can appear aside a scene from the video connection with another videophone 15 on the display 54.

The audio stream of the scene essentially follows a parallel and similar path with the audio video stream, except the audio stream is provided from an audio receiver 58, such as a microphone, sound card, headset or hand set to a CS crystal 4201 audio interface 60 or such as a Codec which performs analog to digital and digital analog conversion of the signals, as well as controls volume and mixing, which digitizes the audio signal and provides it to a TCI 320C6711 or 6205 DSP 62. The DSP 62 then packetizes the digitized audio stream and transfers the digitized audio stream to the FPGA 38. The FPGA 38 in turn provides it to the PCI interface 44, where it is then passed on to the network interface card 56 for transmission on the network 40. The audio stream that is received by the receive videophone 15, is passed to the FPGA 38 and on to the DSP 62 and then to the audio interface 60 which converts the digital signal to an analog signal for playback on speakers 64.

The network interface card 56 time stamps each audio packet and video packet that is transmitted to the network 40. The speed at which the audio and video that is received by the videophone 15 is processed is quick enough that the human eye and ear, upon listening to it, cannot discern any misalignment of the audio with the associated in time video of the scene. The constraint of less than 20-30 milliseconds is placed on the processing of the audio and video information of the scene to maintain this association of the video and audio of the scene. To insure that the audio and video of the scene is in synchronization when it is received at a receive videophone 15, the time stamp of each packet is reviewed, and corresponding audio based packets and video based packets are aligned by the receiving videophone 15 and correspondingly played at essentially the same time so there is no misalignment that is discernible to the user at the receiver videophone 15 of the video and audio of the scene.

An ENC-DSP board contains the IBM eNV 420 MPEG-2 encoder and support circuitry, the DSP 62 for audio encoding and decoding, and the PCI interface 44. It contains the hardware that is necessary for full videophone 15 terminal functionality given a high performance PC 68 platform and display 54 system 10. It is a full size PCI 2.2 compliant design. The camera, microphone(s), and speakers 64 interface to this board. The DSP 62 will perform audio encode, decode, mixing, stereo placement, level control, gap filling, packetization, and other audio functions, such as stereo AEC, beam steering, noise cancellation, keyboard click cancellation, or de-reverberation. The FPGA 38 is developed using the Celoxia (Handel-C) tools, and is fully reconfigurable. Layout supports parts in the 1-3 million gate range.

This board includes a digital camera 47 chip interface, hardware or "video DSP" based multi-channel video decoder 34 interface, video overlay using the DVI in and out connectors, up to full dumb frame buffer capability with video overlay.

Using an NTSC or PAL video signal, the encoder 36 should produce a 640×480, and preferably a 720×480 or better resolution, high-quality video stream. Bitrate should be controlled such that the maximum bits per frame is limited in order to prevent transmission delay over the network 40. The decoder 34 must start decoding a slice upon receiving the first macroblock of data. Some buffering may be required to accommodate minor jitter and thus improve picture.

MPEG-2 is widely used and deployed, being the basis for DVD and VCD encoding, digital VCR's and time shift devices such as TiVo, as well as DSS and other digital TV distribution. It is normally considered to be the choice for 4 to 50 Mbit/sec video transmission. Because of its wide use, relatively low cost, highly integrated solutions for decoding, and more recently, encoding, are commercially available now.

MPEG-2 should be thought of as a syntax for encoded video rather than a standard method of compression. While the specification defines the syntax and encoding methods, there is very wide latitude in the use of the methods as long as the defined syntax is followed. For this reason, generalizations about MPEG-2 are frequently misleading or inaccurate. It is necessary to get to lower levels of detail about specific encoding methods and intended application in order to evaluate the performance of MPEG-2 for a specific application.

Of interest to the videophone 15 project are the issues of low delay encode and decode, as well as network 40 related issues. There are three primary issues in the MPEG-2 algorithm that need to be understood to achieve low delay high quality video over a network 40:

The GOP (Group Of Pictures) structure and its effect on delay

The effect of bit rate, encoded frame size variation, and the VBV buffer on delay and network 40 requirements The GOP structure's effect on quality with packet loss The GOP Structure and Delay:

MPEG-2 defines 3 kinds of encoded frames: I, P, and B. The most common GOP structure in use is 16 frames long: IPBBPBBPBBPBBPBB. The problem with this structure is that each consecutive B frame, since a B frame is motion estimated from the previous and following frame, requires that the following frames are captured before encoding of the B frame can begin. As each frame is 33 msec, this adds a minimum of 66 msec additional delay for this GOP structure over one with no B frames. This leads to a low delay GOP structure that contains only I and/or P frames, defined in the MPEG-2 spec as SP@ML (Simple Profile) encoding.

Bit Rate, Encoded Frame Size, and the VBV

Once B frames are eliminated to minimize encoding delay, the GOP is made up of I frames and P frames that are relative to the I frames. Because an I frame is completely intraframe coded, it takes a lot of bits to do this, and fewer bits for the following P frames.

Note that an I frame may be 8 times as large as a P frame, and 5 times the nominal bit rate. This has direct impact on network 40 requirements and delay: if there is a bandwidth limit, the I frame will be buffered at the network 40 restriction, resulting in added delay of multiple frame times to transfer over the restricted segment. This buffer must be matched at the receiver because the play-out rate is set by the video, not the network 40 bandwidth. The sample used for the above data was a low motion office scene; in high motion content with scene changes, frames will be allocated more or less bits depending on content, with some large P frames occurring at scene changes.

To control this behavior, MPEG-2 implements the VBV buffer (Video Buffering Verifier), which allows a degree of control over the ratio between the maximum encoded frame size and the nominal bit rate. By tightly constraining the VBV so that the I frames are limited to less than 2× the size indicated by the nominal bit rate, the added buffering delay can be limited to 1 additional frame time. The cost of constraining the VBV size is picture quality: the reason for large I frames is to provide a good basis for the following P frames, and quality is seriously degraded at lower bit rates (<4 Mbit) when the size of the I frames is constrained. Consider that at 2 Mbit, the average frame size is 8 Kbytes, and even twice this size is not enough to encode a 320×240 JPEG image with good quality, which is DCT compressed similar to an I frame.

Going to I frame only encoding allows a more consistent encoded frame size, but with the further degradation of quality. Low bit rate I frame only encoding does not take advantage of the bulk of the compression capability of the MPEG-2 algorithm.

The MPEG-2 specification defines CBR (Constant Bit Rate) and VBR (Variable Bit Rate) modes, and allows for variable GOP structure within a stream. CBR mode is defined to generate a consistent number of bits for each GOP, using padding as necessary. VBR is intended to allow consistent quality, by allowing variation in encoding bandwidth, permitting the stream to allocate more bits to difficult to encode areas as long as this is compensated for by lower bit rates in simpler sections. VBR can be implemented with two pass or single pass techniques. Variable GOP structure allows, for example, the placement of I frames at scene transition boundaries to eliminate visible compression artifacts. Due to the low delay requirement and the need to look ahead a little bit in order to implement VBR or variable GOP, these modes are of little interest for the videophone 15 application.

Because P and B frames in a typical GOP structure are dependent on the I frame and the preceding P and B frames, data loss affects all of the frames following the error until the next I frame. This also affects startup latency, such as when flipping channels on a DSS system 10, where the decoder 34 waits for an I frame before it can start displaying an image. For this reason, GOP length, structure, and bit rate need to be tuned to the application and delivery system 10. In the case of real time collaboration using IP, an unreliable transport protocol such as RTP or UDP is used because a late packet must be treated as lost, since you can't afford the delay required to deal with reliable protocol handshaking and retransmission. Various analysis has been done on the effect of packet loss on video quality, with results showing that for typical IPB GOP structures, a 1% packet loss results in 30% frame loss. Shorter GOP structures, and ultimately I frame only streams (with loss of quality), help this some, and FEC (Forward Error Correction) techniques can help a little when loss occurs, but certainly one of the problems with MPEG-2 is that it is not very tolerant of data loss.

A GOP structure called Continuous P frame encoding addresses all of the aforementioned issues and provides excellent video quality at relatively low bit rates for the videophone 15. Continuous P encoding makes use of the ability to intra-frame encode macro-blocks of a frame within a P frame. By encoding a pseudo-random set of 16×16 pixel macro-blocks in each frame, and motion-coding the others, the equivalent of I-frame bits are distributed in each frame. By implementing the pseudo-random macro-block selection to ensure that all blocks are updated on a frequent time scale, startup and scene change are handled in a reasonable manner.

IBM has implemented this algorithm for the S420 encoder, setting the full frame DCT update rate to 8 frames (3.75 times per second). The results for typical office and conference content is quite impressive. The encoding delay, encoded frame size variation, and packet loss behavior is nearly ideal for the videophone 15. Review of the encoded samples shows that for scene changes and highly dynamic content that encoder 36 artifacts are apparent, but for the typical talking heads content of collaboration, the quality is very good.

High-quality audio is essential prerequisite for effective communications. High-quality is defined as full-duplex, a 7 kHz bandwidth, (telephone is 3.2 kHz), >30 dB signal-to-noise ratio, no perceivable echo, clipping or distortion. Installation will be very simple involving as few cables as possible. On board diagnostics will indicate the problem and how to fix it. Sound from the speakers 64 will be free of loud pops and booms and sound levels either too high or too low.

An audio signal from missing or late packets can be "filled" in based on the preceding audio signal. The audio buffer should be about 50 ms as a balance between network 40 jitter and adding delay to the audio. The current packet size of 320 samples or 20 ms could be decreased to decrease the encode and decode latency. However, 20 ms is a standard data length for RTP packets.

Some of the processes described below are available in commercial products. However, for cost and integration reasons, they will be implemented on a DSP 62. In another embodiment, a second DSP 62 can perform acoustic echo cancellation instead of just one DSP 62 performing this function also.

The audio system 10 has a transmit and a receive section. The transmit section is comprised of the following:

Microphones

One of the principal complaints of the speaker phone is the hollow sound that is heard at the remote end. This hollow sound is due to the room reverberation and is best thought of as the ratio of the reflected (reverberant) sound power over the direct sound power. Presently, the best method to improve pickup is to locate microphones close to the talker and thus increase the direct sound power. In an office environment, microphones could be located at the PC 68 monitor, on the videophone 15 terminal and at a white board.

Automatic Gain Control

The gain for the preamplifier for each microphone is adjusted automatically such that the ADC range is fully used. The preamp gain will have to be sent to other audio processes such as AEC and noise reduction.

CODEC

In its simplest form, this is an ADC device. However, several companies such as Texas Instruments and Analog Devices Inc have CODECS with analog amplifiers and analog multiplexers. Also, resident on the chip is a DAC with similar controls. The automatic gain control described in the previous section is implemented in the CODEC and controlled by the DSP 62.

Noise Reduction

Two methods of noise reduction can be used to improve the SNR. The first method is commonly called noise gating that turns on and off the channel depending on the level of signal present. The second method is adaptive noise cancellation (ANC) and subtracts out unwanted noise from the microphone signal. In office environment, it would be possible use ANC to remove PA announcements, fan noise and in some cases, even keyboard clicks.

Noise reduction or gating algorithms are available in commercial audio editing packages such as Cool Edit and Goldwave that can apply special effects, remove scratch and pop noise from records and also remove hiss from tape recordings.

Acoustic Echo Cancellation

Echo is heard when the talker's voice returns to the talker after more than 50 ms. The echo is very distracting and thus needs to be removed. The two sources of echo are line echo and acoustic echo. The line echo is due to characteristics of a two-line telephone system 10. The PSTN removes this echo using a line echo canceller (LEC). When using a speaker phone system 10, acoustic echo occurs between the telephone speaker and the microphone. The sound from the remote speaker is picked by the remote microphone and returned to talker. Acoustic echo cancellation (AEC) is more difficult than LEC since the room acoustics are more complicated to model and can change suddenly with movement of people. There are many AEC products ranging from the stand-alone devices such as ASPI EF1210 to Signal Works object modules optimized to run on DSP 62 platforms.

Automixing

Automixing is selecting which microphone signals to mix together and send the monaural output of the mixer to the encoder 36. The selection criteria is based on using the microphone near the loudest source or using microphones that are receiving sound that is above a threshold level. Automixers are commercially available from various vendors and are used in teleconferencing and tele-education systems.

Encoding

To reduce data transmission bandwidth, the audio signal is compressed to a lower bit rate by taking advantage of the typical signal characteristics and our perception of speech. Presently, the G.722 codec offers the best audio quality (7 kHz bandwidth @ 14 bits) at a reasonable bit rate of 64 kbits/sec.

RTP Transmission

The encoded audio data is segmented into 20 msec segments and sent as RealTime Protocol (RTP) packets. RTP was specifically designed for realtime data exchange required for VoIP and teleconference applications.

The receive section is:

RTP Reception

RTP packets containing audio streams from one or more remote locations are placed in their respective buffers. Missing or late packets are detected and that information is passed to the Gap Handler. Out of order packets are a special case of late packets and like late packets are likely to be discarded. The alternative is to have a buffer to delay playing out the audio signal for at least one packet length. The size of the buffer will have to be constrained such that the end-to-end delay is no longer than 100 ms.

Decoding

The G.722 audio stream is decoded to PCM samples for the CODEC.

Gap Handling

Over any network, RTP packets will be lost or corrupted. Therefore, the Gap Handler will "fill in" the missing data based on the spectrum and statistics of the previous packets. As a minimum, zeros should be padded in the data stream to make up data but a spectral interpolation or extrapolation algorithm to fill in the data can be used.

Buffering

Network jitter will require buffering to allow a continuous audio playback. This buffer will likely adjust its size (and hence latency) based on a compromise between the short-term jitter statistics and the effect of latency.

Rate Control

The nominal sample rate for a videophone 15 terminal is 16 kHz. However, slight differences will exist and need to be handled. For example, suppose that videophone 15 North samples at precisely 16,001 Hz while videophone 15 South samples at 15,999 Hz. Thus, the South terminal will accumulate 1 more samples per second than it outputs to the speaker and the North terminal will run a deficit of equal amount. Long-term statistics on the receiving buffer will be able to determine what the sample rate differential is and the appropriate interpolation (for videophone 15 North) or decimation (for videophone 15 South) factor can be computed.

Volume Control

Adjusting the volume coming from the speakers 64 is typically done by the remote listeners. A better way might be to automatically adjust the sound from the speakers 64 based on how loud it sounds to the microphones in the room. Other factors such as the background noise and the listener's own preference can be taken into account.

Stereo Placement

Remote talkers from different locations can be placed in the auditory field. Thus, a person from location A would consistently come from the left, the person from location B from the middle and the person from location C from the right. This placement makes it easier to keep track of who is talking.

Speakers

The quality of the sound to some extent is determined by the quality of the speakers 64 and the enclosure. In any case, self-amplified speakers 64 are used for the videophone 15 terminal.

Differentiation

Present conferencing systems such as the PolyCom Soundstation offer satisfactory but bandlimited full-duplex audio quality. However, the bandwidth is limited to 3500 Hz and the resulting sound quality strains the ear and especially in distinguishing fricative sounds.

Videophone 15 extends the bandwidth to 7 kHz and auto-mixes multiple microphones to minimize room reverberation. When three or more people are talking, each of the remote participants will be placed in a unique location in the stereo sound field. Combined with the high-quality audio pick-up and increased bandwidth, a conference over the network 40 will quickly approach that of being there in person.

The audio system 10 uses multiple microphones for better sound pick-up and a wideband encoder (G.722) for better fidelity than is currently offered by tollgrade systems. Additionally, for multiple party conferences, stereo placement of remote talkers will be implemented and an acoustic echo cancellation system 10 to allow hands free operation. Adjustment of volume in the room will be controlled automatically with a single control for the end user to adjust the overall sound level.

In the videophone 15 network 40, a gateway 70 connects something non-SIP to the SIP environment. Often there are electrical as well as protocol differences. Most of the gateways 70 connect other telephone or video conference devices to the videophone 15 system 10.

Gateways 70 are distinguished by interfaces; one side is a network 40, for videophone 15 this is Ethernet or ATM. The external side may be an analog telephone line or RS-232 port. The type, number and characteristics of the ports distinguishes one gateway 70 from another. On the network 40 side, there are transport protocols such as RTP or AAL2, and signaling protocols such as SIP, Megaco or MGCP.

On the external side, there may be a wide variety of protocols depending on the interfaces provided. Some examples would be ISDN (Q.931) or POTS signaling. PSTN gateways 70 connect PSTN lines into the videophone 15 system 10 on site. PBX gateways 70 allow a videophone 15 system 10 to emulate a proprietary telephone to provide compatibility to existing on-site PBX. POTS gateways 70 connect dumb analog phones to a videophone 15 system 10. H.323 gateways 70 connect an H.323 system 10 to the SIP based videophone 15 system 10. This is a signaling-only gateway 70—the media server 66 does the H.261 to MPEG conversion.

Three enabling technologies for the videophone 15 are the Session Initiation Protocol (SIP), the Session Description Protocol (SDP) and the Real-time Transport Protocol (RTP), all of which are incorporated by reference herein.

SIP is a signaling protocol for initiating, managing and termination voice and video sessions across packet networks.

SDP is intended for describing multimedia sessions for the purposes of session announcement, session invitation, and other forms of multimedia session initiation. SIP uses SDP to describe media sessions.

RTP provides end-to-end network 40 transport functions suitable for applications transmitting real-time data, such as audio, video or simulation data, over multicast or unicast network 40 services. SIP uses RTP for media session transport.

The videophone 15 can perform conferences with three or more parties without the use of any conferencing bridge or MCU. This is accomplished by using ATM point to multipoint streams as established by SIP. More specifically, when the MPEG-2 stream and the low frame rate stream is packetized for transmission onto the network 40, the header information for each of the packets identifies the addresses of all the receive videophones 15 of the conference, as is well known in the art. From this information, when the packets are transmitted to the network 40, SIP establishes the necessary connectivity for the different packets to reach their desired videophone 15 destinations.

As an example of a conference that does not use any conferencing bridge, let there be 10 videophones 15 at discreet locations who are parties to a conference. Each videophone 15 produces an audio based stream, and an MPEG-2 based stream and a low frame rate based stream. However, each videophone 15 will not send any of these streams back to itself, so effectively, in a 10 party conference of videophones 15, each communicate with the nine other videophones 15. While it could be the case that the videophone 15 communicates with itself, to maximize the bandwidth utilization, the video produced by any videophone 15 and, if desired, the audio produced by a videophone 15 can be shown or heard as it essentially appears to the other videophones 15, but through an internal channel, which will be described below, that does not require any bandwidth utilization of the network 40.

In the conference, each videophone 15 receives nine audio based streams of data. Three MPEG-2 based streams of data and six low frame rate based streams of data. If desired, the receiver could choose up to nine streams of low frame rate based streams so the display 54 only shows the smaller images of each videophone 15, or up to four of the MPEG-2 based streams of data where the display 54 is filled with four images from four of the videophones 15 of the conference with no low frame rate based streams having their image shown, since there is no room on the display 54 for them if four MPEG-2 based streams are displayed. By having three MPEG-2 based streams shown, this allows for six of the low frame rate based streams to be shown. Each of the streams are formed as explained above, and received as explained above at the various videophones 15.

If more than four large images are desired to be shown of a conference, then the way that this is accomplished is additional videophones 15 are connected together so that the displays of the different videophones 15 are lined up side by side, as shown in FIG. 7. One videophone 15 can be the master, and as each additional videophone is added, it becomes a slave to the master videophone 15, which controls the display 54 of the large and small images across the different videophones 15.

In terms of the protocols to determine who is shown as a large image and who is shown as a small image on the displays of the videophones 15 of the conference, one preferred protocol is that the three most recent talkers are displayed as large, and the other parties are shown as small. That is, the party who is currently talking and the two previous talkers are shown as large. Since each videophone 15 of the conference receives all the audio based streams of the conference, each videophone 15 with its main controller 50 can determine where the talking is occurring at a given moment and cause the network interface card 56 to accept the MPEG-2 stream associated with the videophone 15 from which talking is occurring, and not accept the associated low frame rate stream. In another protocol, one videophone 15 is established as the lead or moderator videophone 15, and the lead videophone 15 picks what every other videophone 15 sees in terms of the large and small images. In yet another protocol, the choice of images as to who is large and who is small is fixed and remains the same throughout the conference. The protocol can be that each videophone 15 can pick how they want the images they receive displayed. Both the MPEG-2 based stream and the low frame rate stream are transmitted onto the network 40 to the receive videophones of the conference. Accordingly, both video based streams are available to each receive videophone 15 to be shown depending on the protocol for display 54 that is chosen.

In regard to the audio based streams that are transmitted by each videophone 15, to further effectively use the bandwidth, and to assist in the processing of the audio by decreasing the demands of processing placed on any transmit videophone 15 or receive videophone 15, an audio based stream can only the transmitted by a videophone 15 when there is audio above a predetermined decibel threshold at the transmit videophone 15. By only transmitting audio based streams that have a loud enough sound, with the assumption that the threshold would be calibrated to be met or exceeded when talking is occurring, this not only eliminates extraneous background noise from having to be sent and received, which essentially contributes nothing but uses bandwidth, but assists in choosing the MPEG-2 stream associated with the talking since only the audio streams that have talking are being received.

As mentioned above, if a given videophone 15 desires to see its own image that is being sent out to the other videophones 15, then the low frame rate stream that is formed by the FPGA 38 is sent to a local memory in the videophone 15, but without any compression, as would be the case for the low frame rate stream that is to be packetized and sent onto the network 40 from the videophone 15. From this local memory, the main processor with software will operate on it and cause it to be displayed as a small image on the display 54.

Furthermore, the videophone 15 provides for the control of which audio or video streams that it receives from the network 40 are to be heard or seen. In situations where the conference has more parties than a user of the videophone 15 wishes to see or hear, the user of the videophone 15 can choose to see only or hear only a subset of the video or audio streams that comprise the total conference. For instance, in a 100 party conference, the user chooses to see three of the video streams as large pictures on the screen, and 20 of the video streams as a small images on the screen, for a total of 23 pictures out of the possible 100 pictures that could be shown. The user of the videophone 15 chooses to have the three loudest talkers appear as the large pictures, and then chooses through the touch screen 20 of the parties in the conference, which are listed on a page of the touch screen, to also be displayed as the small pictures. Other protocols can be chosen, such as the 20 pictures that are shown as small pictures can be the last 20 talkers in the conference starting from the time the conference began and each party made his introductions. By controlling the number of video streams shown, organization is applied to the conference and utilization of the resources of the videophone 15 are better allocated.

In regard to the different pictures that are shown on the screen, a choice can be associated with each picture. For example, one picture can be selected by a moderator of the conference call, two of the pictures can be based on the last/loudest talkers at a current time of the conference, and the other picture can be associated with a person the user selects from all the other participants of the conference. In this way, every participant or user of the conference could potentially see a different selection of pictures from the total number of participants in the conference. The maximum bandwidth that is then needed is for one video stream being sent to the network, and four video streams being received from the network, regardless of the number of participants of the conference.

In regard to the audio streams, the limitation can be placed on the videophone 15 that only the audio streams associated with the three loudest talkers are chosen to be heard, while their respective picture is shown on the screen. The DSP 62 can analyze the audio streams that are received, and allow only the three audio streams associated with the loudest speakers to be played, and at the same time, directing the network interface 42 to only receive the first video streams of the large pictures associated with the three audio streams having the loudest talkers. Generally speaking, the more people that are talking at the same time, the more confusion and less understanding occurs. Thus, controls by the user are exercised over the audio streams to place some level of organization to them.

As part of the controls in regard to the audio streams, as mentioned above, each videophone 15 will only send out an audio stream if noise about the videophone 15 is above a threshold. Preferably, the threshold is dynamic and is based on the noise level of the three loudest audio streams associated with the three loudest talkers at a given time. This follows, since for the audio stream to be considered as one of the audio streams with the three loudest talkers, the noise level of other audio streams must be monitored and identified in regard to their noise level. The DSP 62 upon receiving the audio streams from the network interface 42 through the network 40, reviews the audio stream and identifies the three streams having the loudest noise, and also compares the noise level of the three received audio streams which have been identified with the three loudest talkers with the noise level of the scene about the videophone 15. If the noise level from the scene about the videophone 15 is greater than any one of the audio streams received, then the videophone 15 sends its audio stream to the network 40. This type of independent analysis by the DSP 62 occurs at each of the videophones in the conference, and is thus a distributive analysis throughout the conference. Each videophone, independent of all the other videophones, makes its own analysis in regard to the audio streams it receives, which by definition have only been sent out by the respective videophone 15 after the respective videophone 15 has determined that the noise about its scene is loud enough to warrant that at a given time it is one of the three loudest. Each videophone 15 than takes this received audio stream information and uses it as a basis for comparison of its own noise level. Each videophone 15 is thus making its own determination of threshold.

An alternative way of performing this distributed analysis is that each videophone, after determining what it believes the threshold should be with its DSP 62, can send this threshold to all the other videophones of the conference, so all of the videophones can review what all the other videophones consider the threshold to be, and can, for instance, average the thresholds, to identify a threshold that it will apply to its scene.

By using the technique of choosing the video streams of the three loudest talkers, there may be moments when parties start talking loudly all at once, and creating confusion and inability for understanding, but by doing so it raises the noise in the threshold level, resulting in very shortly the elimination of the audio streams that are not producing as much noise as others, so that only the audio streams of the three largest talkers will once again be chosen and heard, with the others not being chosen, and thus removing some of the noise that the other audio streams might be contributing. This implies that there may be times when more than three audio streams are received by the videophone 15 since more than three videophones may have a noise level above the threshold at a given moment, allowing each of such videophones to produce an audio stream at that time and to send it to the network 40. However, as just explained, once the threshold is changed, the situation will stop. This distributed analysis in regard to audio streams, is not limited to the videophone 15 described here but is also applicable to any type of an audio conference, whether there is also present video streams or not.

Consistent with the emphasis on conserving the use of bandwidth, and to send only what is necessary to conserve the bandwidth, clipping of an image occurs at the encoder 36 rather than at the receive videophone 15. In the instances where the transmit videophone 15 is aware of how its image will appear at the receive videophones 15, the encoder 36 clips the large image of the scene before it is transmitted, so there is that much less of the image to transmit and utilize bandwidth. If clipping is to occur at the receiver videophone 15, then the main processor with software will operate on the received image before it is provided to the display controller 52.

A second camera can be connected to the videophone 15 to provide an alternative view of the scene. For instance, in a room, the first camera, or primary camera, can be disposed to focus on the face of the viewer or talker. However, there may be additional individuals in the room which the person controlling the videophone 15 in the room wishes to show to the other viewers at the receive videophones 15. The second camera, for instance, can be disposed in an upper corner of the room so that the second camera can view essentially a much larger portion of the room than the primary camera. The second camera feed can be provided to the decoder 34. The decoder 34 has several ports to receive video feeds. Alternatively, if the stream from the second camera is already digitized, it can be provided to the processing elements of the videophone 15 through similar channels as the primary camera. Preferably, each videophone 15 controls whatever is sent out of it, so the choice of which camera feed is to be transmitted is decided by the viewer controlling the videophone 15. Alternatively, it is possible to provide a remote receive videophone 15 the ability to control and choose which stream from which camera at a given videophone 15 is to be transmitted. The control signals from the control videophone 15 would be transmitted over the network 40 and received by the respective videophone 15 which will then provide the chosen stream for transmission. Besides a second camera, any other type of video feed can also be provided through the videophone 15, such as the video feed from a DVD, VCR or whiteboard camera.

In a preferred embodiment, the videophone 15 operates in a peak mode. In the peak mode, the videophone 15 camera takes a still image of the scene before it and transmits this image to other videophones 15 that have been previously identified to receive it, such as on a list of those videophones 15 on its speed dial menu. Alternatively, in the peak-mode, the still image that is taken is maintained at the videophone 15 and is provided upon request to anyone who is looking to call that videophone 15. Ideally, as is consistent with the preferred usage of the videophone 15, each videophone 15 user controls whatever is sent out of the videophone 15, and can simply choose to turn off the peak mode, or control what image is sent out. When an active call occurs, the peak mode is turned off so there is no conflict between the peak mode and the active call in which a continuous image stream is taken by the camera. The peak mode can have the still image of the scene be taken at predetermined time intervals, say at one-minute increments, five-minute increments, 30-minute increments, etc. In the peak mode, at a predetermined time before the still image is taken, such as five or ten seconds before the image is taken, an audible queue can be presented to alert anyone before the camera that a picture is about to be taken and that they should look presentable. The audible queue can be a beep, a ping or other recorded noise or message. In this way, when the peak mode is used, a peak into the scene before the camera of the videophone 15 is made available to other videophones 15 and provides an indication of presence of people in regard to the camera to the other videophones 15.

As another example of a presence sensor, the location of the automatic lens of the camera in regard to the field before it can act as a presence sensor. When no one is before the camera, then the automatic lens of the camera will focus on an object or wall that is in its field. When a person is before the camera, the automatic lens will focus on that person, which will cause the lens to be in a different position than when the person is not before the lens. A signal from the camera indicative of the focus of the lens can be sent from the camera to the FPGA 38 which then causes the focus information to be sent to a predetermined list of videophone 15 receivers, such as those on the speed dial list of the transmit videophone 15, to inform the receive videophones 15 whether the viewer is before the videophone 15 to indicate that someone is present.

A full description of a videophone, a system with videophones and a method for a video call can be found in U.S. patent application Ser. No. 10/114,402, incorporated by reference herein, and a copy of which is attached. Additionally, U.S. Provisional Patent Application 60/483,217 for a Gateway and Method, and U.S. Provisional Patent Application 60/483,137 for an Audio Mixer and Method are both incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system for conferencing comprising:
    a network;
    N nodes in communication with each other through the network, where N is greater than or equal to three and is an integer, each node of the N nodes able to produce a unique corresponding video stream having a bandwidth and a unique corresponding audio stream having a bandwidth for transmission over the network to other nodes of the N nodes, with each stream's bandwidth from each node being dynamically controlled and set at predetermined levels;
    wherein each node packetizes the corresponding video stream and the corresponding audio stream by adding header information to each packet which identifies addresses of the other nodes so that each node uses point to multipoint streams to transmit the corresponding video stream and the corresponding audio stream through the network to the other nodes;
    wherein there is a first node, a second node, and, at least a third node of the N nodes in communication with each other through the network, the first node sending a first video stream of a scene at the first node, a second video stream of the scene at the first node and an audio stream of the scene at the first node to the second and third nodes, the second and third nodes playing the audio stream and either the first video stream or the second video stream;
    wherein the second node sends a first video stream of a scene at the second node, a second video stream of the scene at the second node and an audio stream of the scene at the second node to the third node, where the third node has a display controller which controls the image that appears on the screen and which plays each first video stream from each node alongside each other on the screen of a third node; and
    wherein the first and second video streams and the audio streams of the first and second nodes are sent over the network for a video conference call, with no conferencing bridge or multipoint control unit, MCU, used for the video conference call.

2. A system as described in claim 1 including a bandwidth manager in communication with the N nodes through the network which controls the bandwidth of each stream from each node.

3. A telecommunication system as described in claim 2, wherein the bandwidth manager is implemented as a part of a Session Initiation Protocol, SIP, proxy.

4. A telecommunication system as described in claim 2, wherein the bandwidth manager is implemented as a back-to-back Session Initiation Protocol, SIP, user agent.

5. A system as described in claim 1 wherein the first video stream from the first node has a frame rate greater than or equal to 25 frames per second and the second video stream from the first node has a frame rate less than 25 frames per second.

6. A system as described in claim 5 wherein the second and third nodes have a display screen and when the second or third nodes display the first video stream from the first node, they display the first video stream as a large image across an area of greater than or equal to 20% of the screen, and when the second and third nodes display the second video stream from the first node, they display the second video stream as a small image across an area of less than 20% of the screen.

7. A system as described in claim 6 including a fourth node in communication with the first, second and third nodes through the network, which sends a television video stream of a television channel to the first, second and third nodes; the first, second and third nodes able to display the television video stream on the screen along side the first video stream from the first node.

8. A system as described in claim 1 wherein the network is an Ethernet or ATM network.

9. A system as described in claim 1 wherein each node uses ATM point to multipoint streams for the video conference call.

10. A system as described in claim 9 wherein the third node predetermines which of the first or second video streams from the first or second nodes to display.

11. A system as described in claim 10 wherein the third node chooses to display the first video stream from the first or second nodes if a user in the respective scene at the first or second nodes is talking, or the third node has predetermined to display the first video stream of the first or second nodes.

12. A system as described in claim 11 wherein the first video stream of the first and second nodes is in MPEG-2 format when it is sent over the network.

13. A system as described in claim 12 wherein the first and second nodes use continuous P to place the first video stream of the first and second nodes in the MPEG-2 format.

14. A system as described in claim 13 wherein the first and second nodes clip the first video streams of the scene of the first and second nodes, respectively.

15. A system as described in claim 14 wherein the first and second nodes clip the first video stream of their respective scenes by removing a portion of the first video stream that is associated with a location of the respective scene that has no user.

16. A system as described in claim 15 wherein the first and second nodes only send an audio stream of the scene of the first and second nodes, respectively, if there is a noise above a predetermined threshold at the respective scene.

17. A system as described in claim 16 wherein the first node has an automatic presence sensor which determines whether a user is present at the scene at the first node, and produces a presence indicator of whether the user is at the first node, the first node sends the presence indicator to the second and third nodes.

18. A system as described in claim 17 wherein the first node produces an alert signal to alert any user in the scene at the first node that the presence indicator is going to be formed in a predetermined time.

19. A system as described in claim 18 wherein the first node includes an imaging means for taking a video picture of the first scene and producing the first video stream.

20. A system as described in claim 19 including an encoder in communication with the imaging means which compresses and encodes the first video stream into a desired format without frame buffering.

21. A system as described in claim 20 wherein the first node includes a Field Programmable Gate Array in communication with the encoder, which packetizes the first video stream, and also receives the first video stream from the imaging means and produces the second video stream of the first node and packetizes the second video stream.

22. A system as described in claim 21 wherein the first node includes a network interface in communication with the Field Programmable Gate Array and the network and transfers the first video stream of the first node to the network, and receives the first video stream from the second node and sends it to the Field Programmable Gate Array.

23. A system as described in claim 22 wherein the first node includes microphone means for receiving sound from the first scene and producing the audio stream of the first node.

24. A system as described in claim 23 wherein the first node includes speaker means in communication with the network interface for playing the audio stream from the second node.

25. A system as described in claim 24 wherein the first node includes a DSP which packetizes the audio stream of the first node and provides the audio stream to the Field Programmable Gate Array which transfers the audio stream of the first node to the network interface which transfers the audio stream of the first node to the network, and receives the audio stream of the second node from the Field Programmable Gate Array.

26. A system as described in claim 25 wherein the first node includes an audio interface which receives the audio stream of the first node from the microphone means and digitizes it and provides it to the DSP, and converts the audio stream from the second node that it receives from the DSP to an analog form for the speaker means to play.

27. A system as described in claim 26 wherein the network interface time stamps packets of the audio stream and the video stream of the first node before they are sent to the network, and aligns the packets of the video stream and audio stream of the second node that the first node receives by time stamp so when the video stream and audio stream of the second node are played by the first node, the associated sound with the image of the scene of the second node is played.

28. A system as described in claim 27 wherein the first node includes a receive memory in which the first video stream from the second node is received and stored, and a main controller connected to the network interface, the encoder, the Field Programmable Gate Array and the DSP to control them, the main controller instructing the network interface to choose the first video stream of the second node and send it to the receive memory, the main controller decodes and expands the first video stream of the second node stored in the receive memory and sends it to the display controller.

29. A system as described in claim 28 wherein the first node includes an LCD controller connected to the display controller, and the display screen includes a panel display connected to the LCD controller, the LCD controller receives the first video stream of the second node from the display controller and prepares the first video stream of the second node for display on the panel.

30. A system as described in claim 29 including a touch screen on which buttons associated with functions appear, and a touch screen controller connected to the touch screen and the main controller for transferring information regarding buttons which have been touched on the touch screen by a user to the main controller.

31. A system as described in claim 30 wherein the first node includes a decoder for converting the first video stream from the imaging means of the scene of the first node to digital form and providing it to the encoder and the Field Programmable Gate Array, the decoder connected to the Field Programmable Gate Array and the encoder, the decoder also receiving the television video stream and other analog form video streams and converting them to digital form.

32. A system as described in claim 31 wherein the imaging means includes an analog video camera which is in communication with the decoder, a digital video camera which is in communication with the encoder and the Field Programmable Gate Array, or a fire wire camera in communication with the Field Programmable Gate Array, the Field Programmable Gate Array providing any video stream it receives from the fire wire camera to the encoder.

33. A system as described in claim 32 wherein the DSP provides for stereo echo cancellation of the audio stream of the scene of the first node, the encoder provides for the first video stream of the first node to have a resolution of at least 720 by 640 pixels, and the microphone means and the speaker means are full duplex.

34. A system as described in claim 33 wherein the DSP monitors the microphone means for the noise level produced by the speaker means and adjusts the speaker means to maintain a desired noise level.

35. A system as described in claim 34 wherein the main controller recognizes a command by the user to automatically call another user for a video conference, and use the command to announce to the other users that the other user is being requested for the video conference.

36. A system as described in claim 35 wherein the first node has video mail when the first node is not able to accept a video call.

37. A system as described in claim 36 including a server that is in communication with the network and the first node, which receives the video call for the first node when the first node does not receive the video call, stores a video message associated with the video call that the first node does not receive, and sends a video call waiting message to the first node that there is a video message waiting to be shown to the first node.

38. A system as described in claim 37 wherein the first node has a plurality of display panels connected to the display controller, with the images of the first video streams from different nodes being displayed on the panels alongside each other as though the plurality of panels is one continuous panel.

39. A system as described in claim 38 wherein the first node includes a second imaging means for producing the first video stream of the first node having a different view of the scene at the first node than the imaging means.

40. A system as described in claim 39 wherein the main controller sends the second video stream of the first node from the Field Programmable Gate Array to the display controller to be displayed on the panel so the user of the first node can see the scene of the first node on the display panel.

41. A method for conferencing in a telecommunications system comprising the steps of:
producing a unique corresponding video stream having a bandwidth and a unique corresponding audio stream having a bandwidth for transmission over a network by each of N nodes in communication with each other through the network, where N is greater than or equal to three and is an integer, to other nodes of the N nodes;
controlling and setting dynamically at predetermined levels each stream's bandwidth from each node; and
packetizing at each node the corresponding video stream and the corresponding audio stream by adding header information to each packet which identifies addresses of the other nodes so that each node uses point to multipoint streams to transmit the corresponding video stream and the corresponding audio stream from each node through the network to the other nodes
wherein there is a first node, a second node, and, at least a third node of the N nodes in communication with each other through the network, the first node sending a first video stream of a scene at the first node, a second video stream of the scene at the first node and an audio stream of the scene at the first node to the second and third nodes, the second and third nodes playing the audio stream and either the first video stream or the second video stream;
wherein the second node sends a first video stream of a scene at the second node, a second video stream of the scene at the second node and an audio stream of the scene at the second node to the third node, where the third node has a display controller which controls the image that appears on the screen and which plays each first video stream from each node alongside each other on the screen of a third node; and
wherein the first and second video streams and the audio streams of the first and second nodes are sent over the network for a video conference call, with no conferencing bridge or multipoint control unit, MCU, used for the video conference call.

* * * * *

UNITED STATES PATENT AND TRADEMARK OFFICE
CERTIFICATE OF CORRECTION

PATENT NO. : 7,773,581 B2  
APPLICATION NO. : 11/078738  
DATED : August 10, 2010  
INVENTOR(S) : Punj et al.

Page 1 of 2

It is certified that error appears in the above-identified patent and that said Letters Patent is hereby corrected as shown below:

IN THE DRAWINGS:

In Fig. 7, Sheet 6 of 24, delete "MEDIN STREAM." and insert -- MEDIA STREAM, --, therefor.

In Fig. 9, Sheet 8 of 24, Line 1, delete "1P" and insert -- IP --, therefor.

In Fig. 9, Sheet 8 of 24, Line 13, delete "Lenght" and insert -- Length --, therefor.

In Fig. 9, Sheet 8 of 24, Line 14, delete "1Ps" and insert -- IPs --, therefor.

In Fig. 11, Sheet 9 of 24, delete "ViPe 1 STREAMS" and insert -- ViPr 1 STREAMS --, therefor.

In Fig. 11, Sheet 9 of 24, delete "ViPe 2 STREAMS" and insert -- ViPr 2 STREAMS --, therefor.

In Fig. 11, Sheet 9 of 24, delete "ViPe 3 STREAMS" and insert -- ViPr 3 STREAMS --, therefor.

In Fig. 16, Sheet 13 of 24, delete "SHOWING RELEVANTS" and insert -- SHOWING RELEVANT --, therefor.

In Fig. 18, Sheet 15 of 24, above "FIG. 18", Line 1, delete "AMSWER" and insert -- ANSWER --, therefor.

Figure 24A:
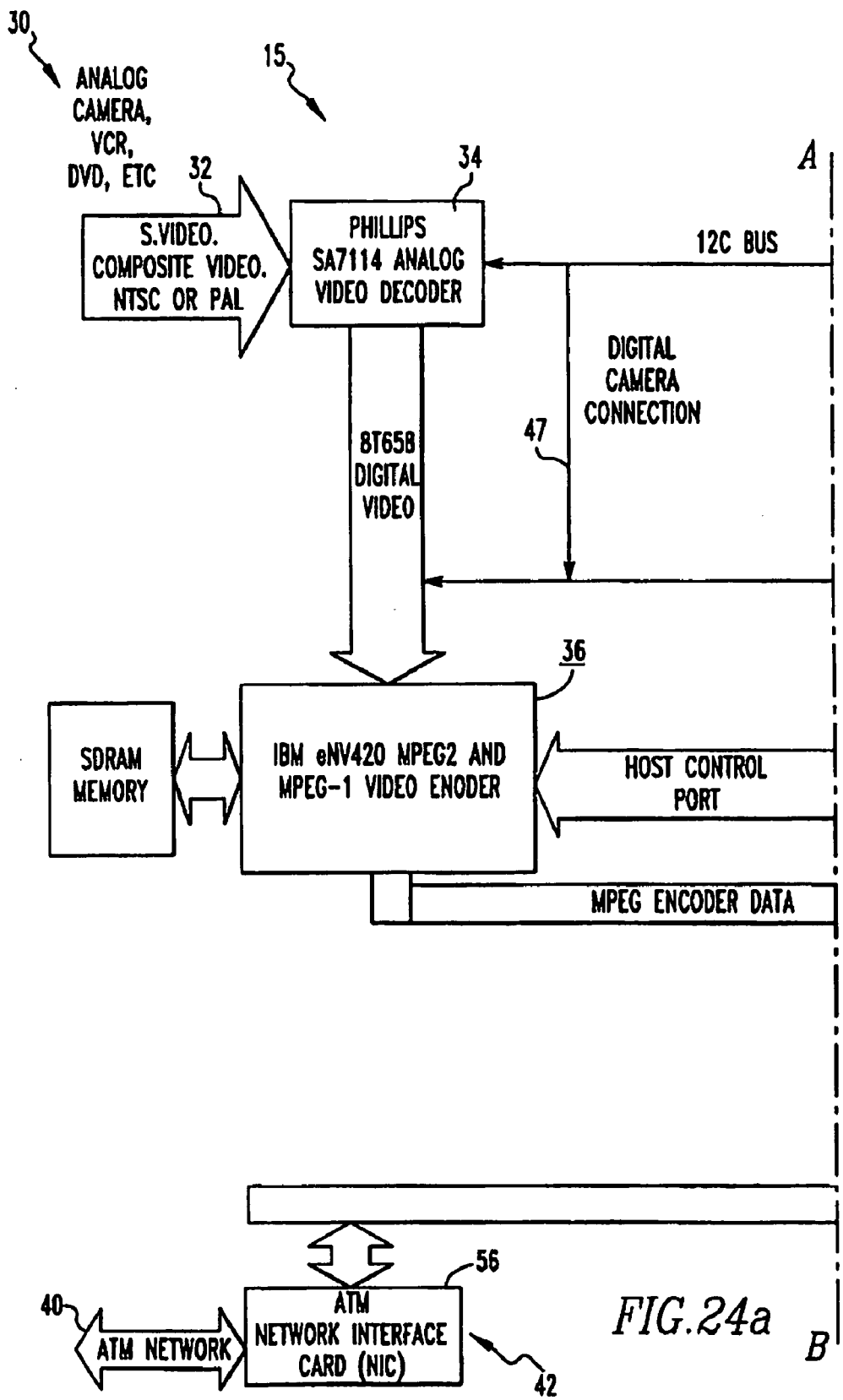
FIG. 24 is a block diagram of the videophone.

In Fig. 24a, Sheet 20 of 24, for Tag "34", Line 1, delete "PHILLIPS" and insert -- PHILIPS --, therefor.

Figure 24B:
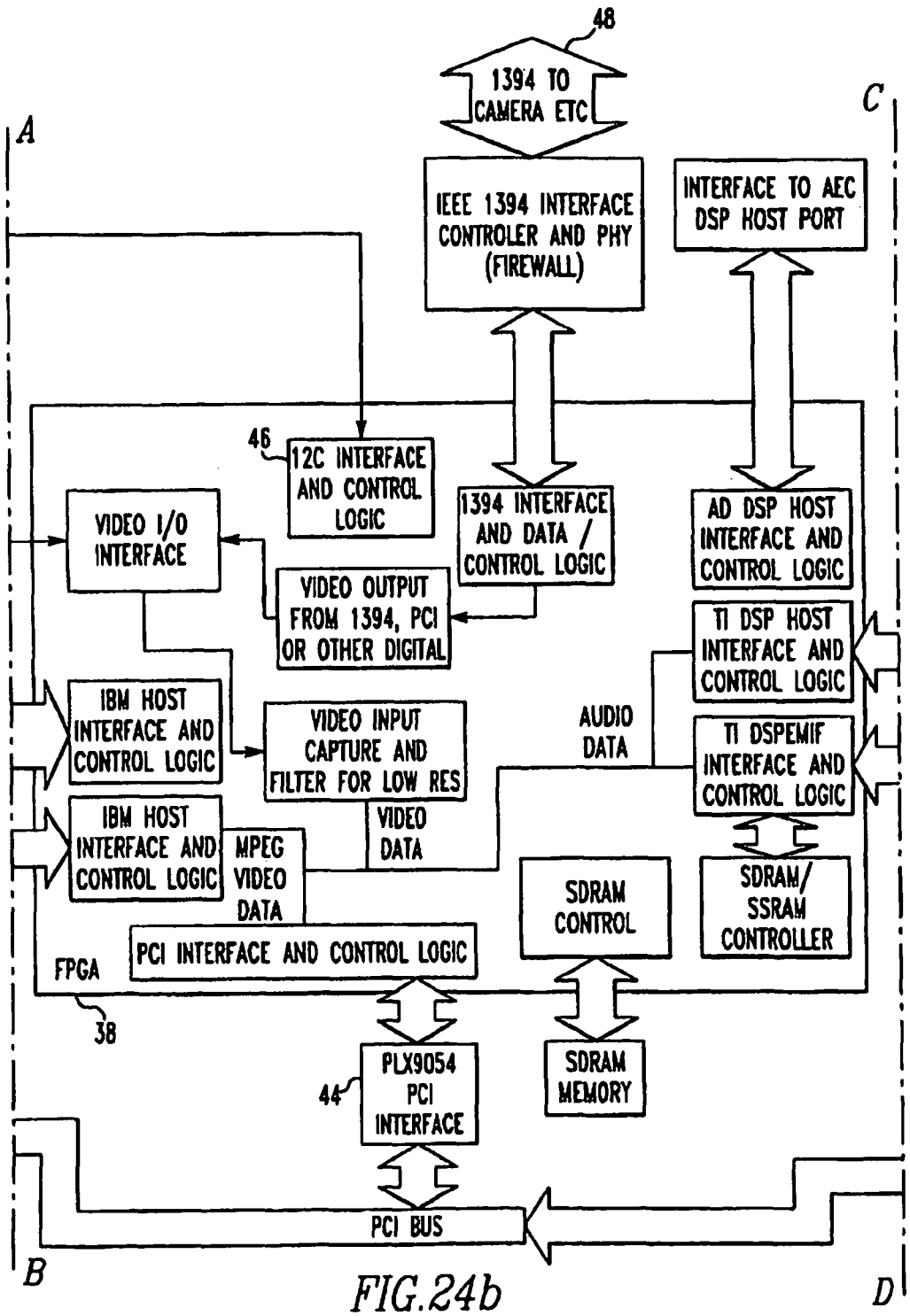

In Fig. 24b, Sheet 21 of 24, below Box "48", Line 2, delete "CONTROLER" and insert -- CONTROLLER --, therefor.

Signed and Sealed this  
Fifteenth Day of March, 2011

David J. Kappos  
*Director of the United States Patent and Trademark Office*

CERTIFICATE OF CORRECTION (continued)
U.S. Pat. No. 7,773,581 B2

Figure 24C:
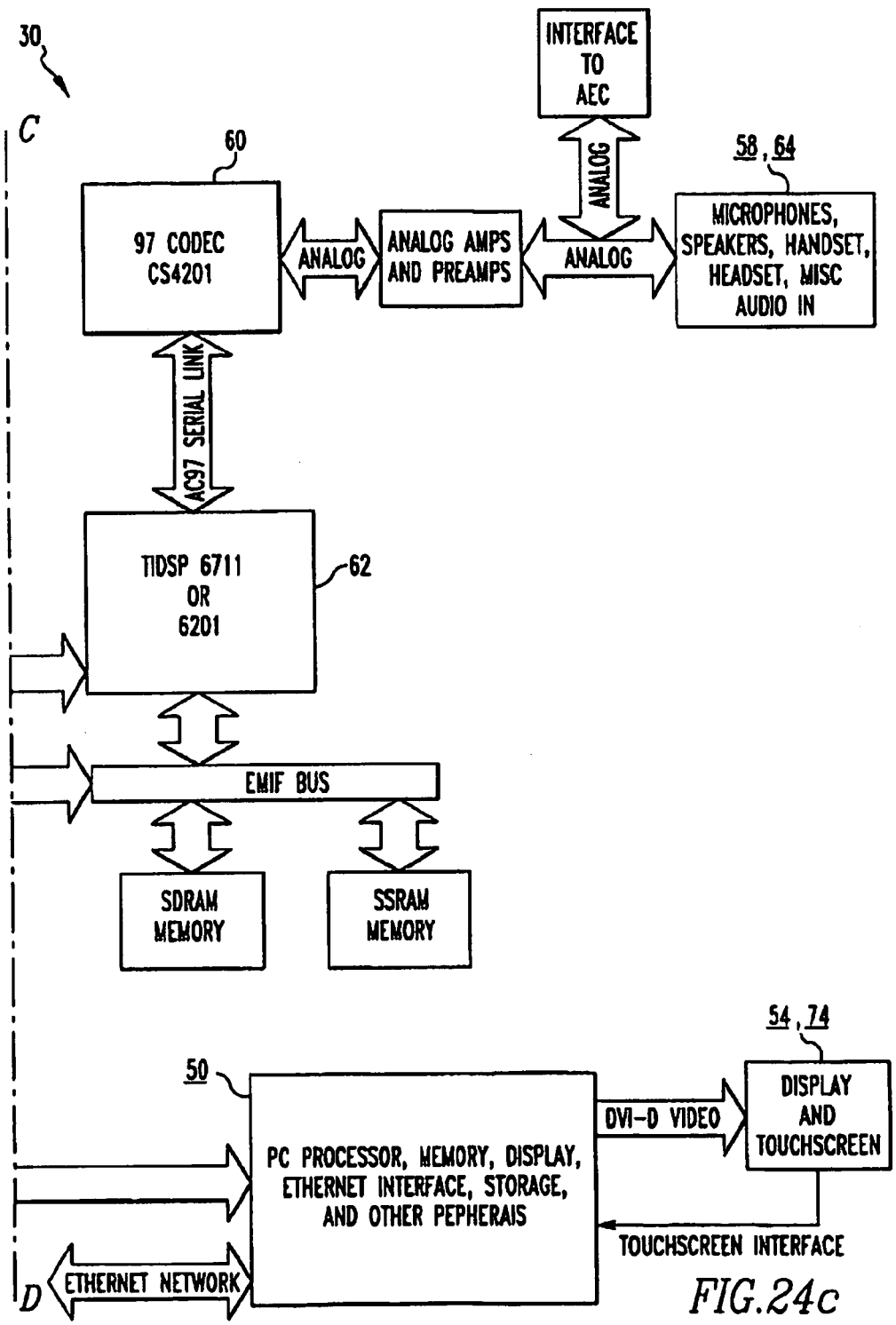
Figure 25:
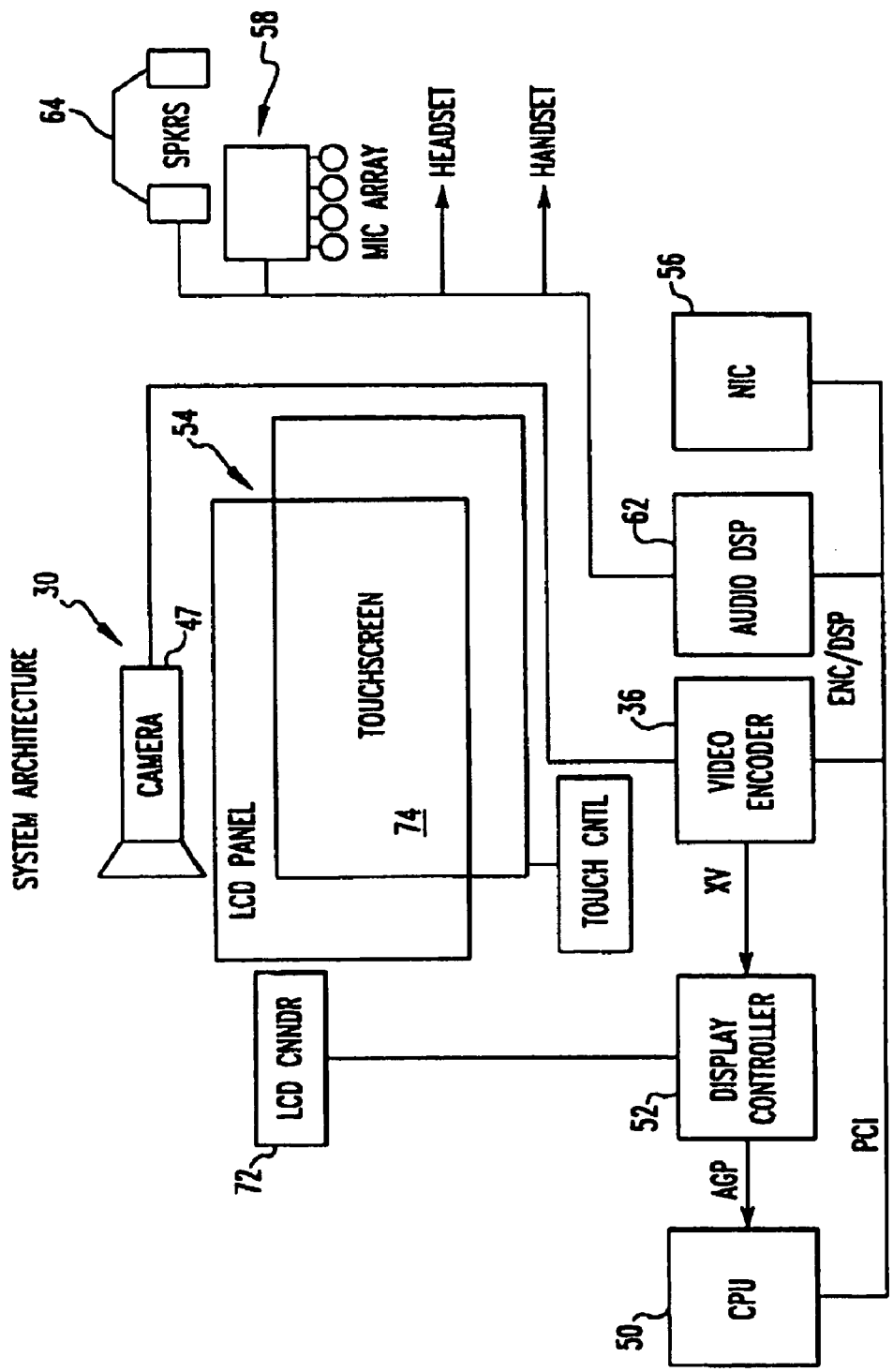
FIG. 25 is a block diagram of the videophone architecture.
Figure 26:
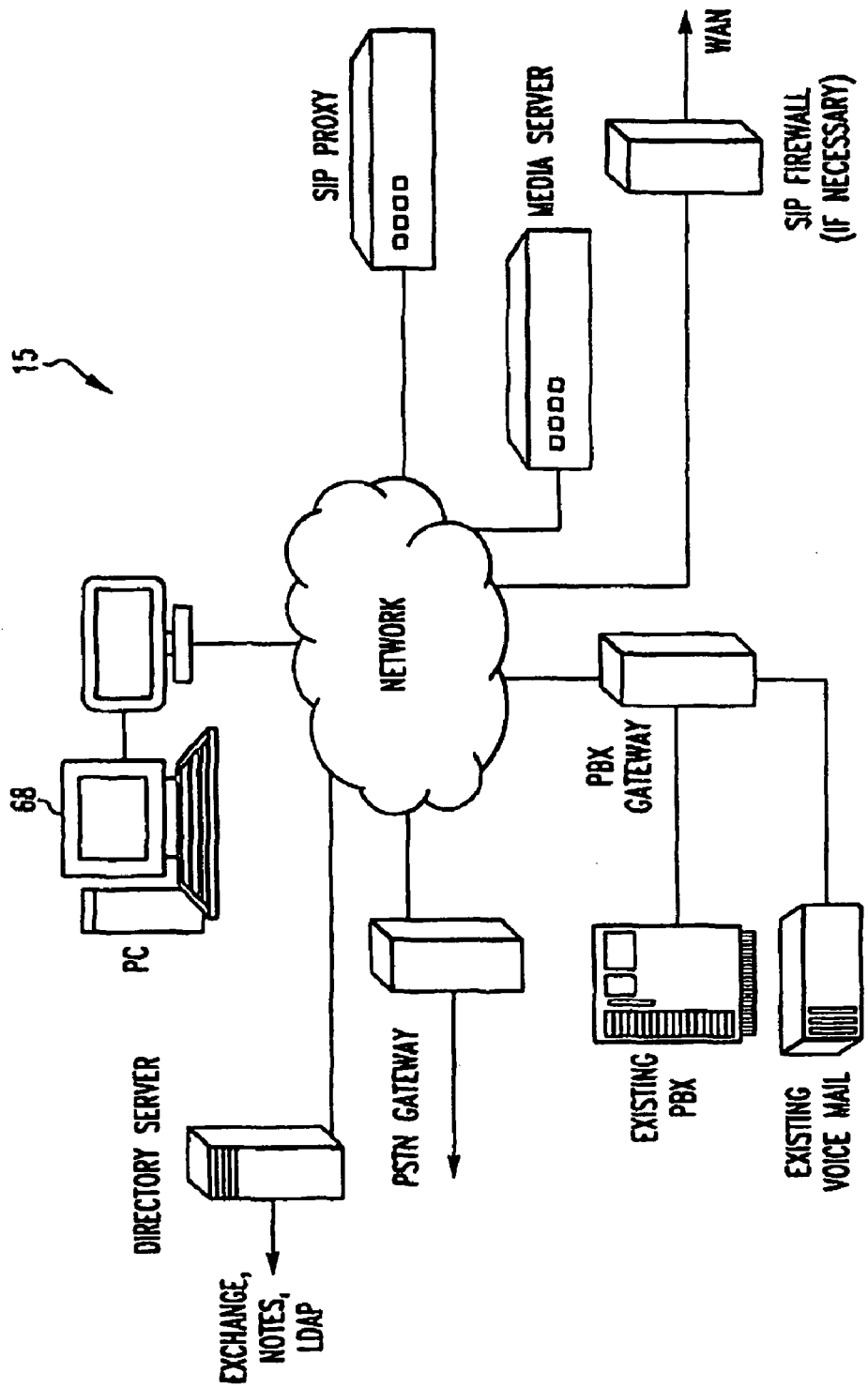
FIG. 26 is a schematic representation of the system.

In Fig. 24c, Sheet 22 of 24, for Tag "50", Line 3, delete "PEPHERAIS" and insert -- PERIPHERALS --, therefor.

IN THE SPECIFICATIONS:

In Column 3, Line 19, delete "videoph9one" and insert -- videophone --, therefor.

In Column 8, Line 8, delete "UAs" and insert -- UAS --, therefor.

In Column 19, in TABLE "1", Line 4, delete "Ooff," and insert -- Off, --, therefor.

In Column 33, Line 61, delete "3[N1C}" and insert -- 3[N1C] --, therefor.

In Column 35, in TABLE "11", Line 2, delete "TD: 0" and insert -- ID: 0 --, therefor.

IN THE CLAIMS:

In Column 60, Line 26, in Claim 41, delete "nodes" and insert -- nodes; --, therefor.